(12) United States Patent
Kuehn et al.

(10) Patent No.: US 11,401,779 B2
(45) Date of Patent: Aug. 2, 2022

(54) HYDRAULIC FRACTURING PLAN AND EXECUTION OF SAME

(71) Applicant: Downing Wellhead Equipment, LLC, Oklahoma City, OK (US)

(72) Inventors: Jordan Kuehn, Forest Park, IL (US); Austin Johnson, Edmond, OK (US); Ronnie B. Beason, Lexington, OK (US); Nicholas J. Cannon, Washington, OK (US)

(73) Assignee: DOWNING WELLHEAD EQUIPMENT, LLC, Oklahoma City, OK (US)

( * ) Notice: Subject to any disclaimer, the term of this patent is extended or adjusted under 35 U.S.C. 154(b) by 0 days.

(21) Appl. No.: 17/388,716

(22) Filed: Jul. 29, 2021

(65) Prior Publication Data

US 2021/0355784 A1    Nov. 18, 2021

Related U.S. Application Data

(63) Continuation-in-part of application No. 17/319,854, filed on May 13, 2021, which is a continuation-in-part of application No. 16/855,749, filed on Apr. 22, 2020, which is a continuation-in-part of application No. 16/803,156, filed on Feb. 27, 2020, now Pat. No. 11,242,724, which is a continuation-in-part of application No. 16/436,623, filed on Jun. 10, 2019, now Pat. No. 11,208,856, and a continuation-in-part of application No. 16/248,633, filed on Jan. 15, 2019, now Pat. No. 10,584,552, and a continuation-in-part of application No. 16/248,648, filed on Jan. 15, 2019, now Pat. No. 10,724,682, and a continuation-in-part of application No. 16/100,741, filed on Aug. 10, 2018, now Pat. No. 10,689,938.

(60) Provisional application No. 63/189,663, filed on May 17, 2021, provisional application No. 62/836,761, filed on Apr. 22, 2019, provisional application No.
(Continued)

(51) Int. Cl.
| | |
|---|---|
| *E21B 43/26* | (2006.01) |
| *E21B 34/02* | (2006.01) |
| *E21B 33/068* | (2006.01) |
| *E21B 41/00* | (2006.01) |
| *E21B 43/11* | (2006.01) |
| *F16K 3/36* | (2006.01) |
| *F16N 11/00* | (2006.01) |
| *F16N 29/02* | (2006.01) |

(52) U.S. Cl.
CPC ............ *E21B 34/02* (2013.01); *E21B 33/068* (2013.01); *E21B 41/00* (2013.01); *E21B 43/11* (2013.01); *E21B 43/26* (2013.01); *E21B 43/2607* (2020.05); *F16K 3/36* (2013.01); *F16N 11/00* (2013.01); *F16N 29/02* (2013.01); *F16N 2210/00* (2013.01)

(58) Field of Classification Search
CPC ............................ E21B 43/2607; E21B 43/26
See application file for complete search history.

(56) References Cited

U.S. PATENT DOCUMENTS

| | | | | |
|---|---|---|---|---|
| 2014/0352968 A1* | 12/2014 | Pitcher | ................... | E21B 43/26 166/308.1 |
| 2017/0123437 A1* | 5/2017 | Boyd | ................... | G05D 7/0641 |

(Continued)

*Primary Examiner* — Giovanna Wright
(74) *Attorney, Agent, or Firm* — Haynes and Boone, LLP

(57) ABSTRACT

A hydraulic fracturing plan executable by a hydraulic fracturing system to hydraulically fracture a plurality of oil and gas wells.

36 Claims, 50 Drawing Sheets

Related U.S. Application Data

62/755,170, filed on Nov. 2, 2018, provisional application No. 62/638,688, filed on Mar. 5, 2018, provisional application No. 62/638,681, filed on Mar. 5, 2018, provisional application No. 62/637,220, filed on Mar. 1, 2018, provisional application No. 62/637,215, filed on Mar. 1, 2018, provisional application No. 62/617,438, filed on Jan. 15, 2018, provisional application No. 62/617,443, filed on Jan. 15, 2018, provisional application No. 62/598,914, filed on Dec. 14, 2017.

(56) References Cited

U.S. PATENT DOCUMENTS

| | | | |
|---|---|---|---|
| 2017/0275980 A1* | 9/2017 | Kajaria | F16L 55/07 |
| 2018/0179848 A1* | 6/2018 | Cherewyk | E21B 21/02 |

* cited by examiner

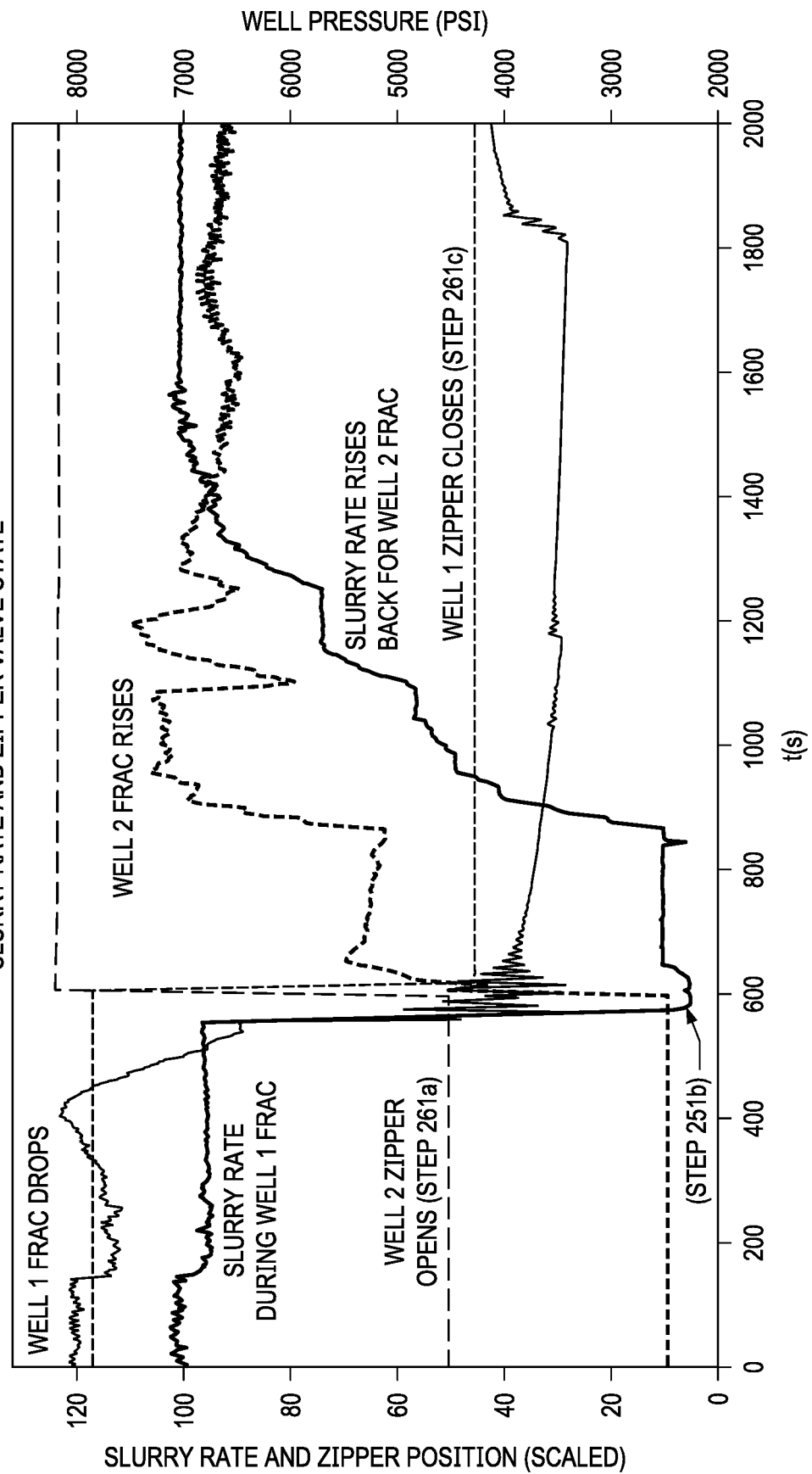

HYDRAULIC FRACTURING PLAN AND EXECUTION OF SAME

CROSS-REFERENCE TO RELATED APPLICATIONS

This application claims the benefit of the filing date of, and priority to, U.S. application No. 63/189,663, filed May 17, 2021, the entire disclosure of which is hereby incorporated herein by reference.

This application is also a continuation-in-part (CIP) of U.S. patent application Ser. No. 17/319,854 (the "'854 application"), filed May 13, 2021, the entire disclosure of which is hereby incorporated herein by reference.

The '854 application is a continuation-in-part (CIP) of U.S. patent application Ser. No. 16/855,749 (the "'749 application"), filed Apr. 22, 2020, the entire disclosure of which is hereby incorporated herein by reference. The '749 application claims the benefit of the filing date of, and priority to, U.S. Patent Application No. 62/836,761, filed Apr. 22, 2019, the entire disclosure of which is hereby incorporated herein by reference.

The '749 application is a continuation-in-part (CIP) of U.S. patent application Ser. No. 16/248,648 (the "'648 application"), filed Jan. 15, 2019, now issued as U.S. Pat. No. 10,724,682, the entire disclosure of which is hereby incorporated herein by reference. The '648 application claims the benefit of the filing date of, and priority to, U.S. Application No. 62/617,443, filed Jan. 15, 2018, the entire disclosure of which is hereby incorporated herein by reference.

The '749 application is also a CIP of U.S. patent application Ser. No. 16/803,156 (the "'156 application"), filed Feb. 27, 2020, the entire disclosure of which is hereby incorporated herein by reference. The '156 application is a CIP of U.S. patent application Ser. No. 16/248,633 (the "'633 application"), filed Jan. 15, 2019, now issued as U.S. Pat. No. 10,584,552, the entire disclosure of which is hereby incorporated herein by reference. The '633 application claims the benefit of the filing date of, and priority to, U.S. Patent Application No. 62/617,438 (the "'438 application"), filed Jan. 15, 2018, the entire disclosure of which is hereby incorporated herein by reference.

The '156 application is also a CIP of U.S. patent application Ser. No. 16/436,623 (the "'623 application"), filed Jun. 10, 2019, the entire disclosure of which is hereby incorporated herein by reference. The '623 application claims the benefit of the filing date of, and priority to, U.S. Patent Application No. 62/755,170, filed Nov. 2, 2018, the entire disclosure of which is hereby incorporated herein by reference.

The '156 application is also a CIP of U.S. patent application Ser. No. 16/100,741 (the "'741 application"), filed Aug. 10, 2018, now issued as U.S. Pat. No. 10,689,938, the entire disclosure of which is hereby incorporated herein by reference. The '741 Application claims the benefit of the filing date of, and priority to, U.S. Patent Application No. 62/638,688, filed Mar. 5, 2018, U.S. Patent Application No. 62/638,681, filed Mar. 5, 2018, U.S. Patent Application No. 62/637,220, filed Mar. 1, 2018, U.S. Patent Application No. 62/637,215, filed Mar. 1, 2018, and U.S. Patent Application No. 62/598,914, filed Dec. 14, 2017, the entire disclosures of which are hereby incorporated herein by reference.

The '749 application is related to U.S. patent application Ser. No. 16/801,911, filed Feb. 26, 2020, the entire disclosure of which is hereby incorporated herein by reference.

This application is also related to U.S. patent application Ser. No. 17/360,336, filed Jun. 28, 2021, the entire disclosure of which is hereby incorporated herein by reference.

BACKGROUND

This application relates generally to oil and gas hydraulic fracturing operations and, more particularly, to a hydraulic fracturing plan executable by a hydraulic fracturing system to hydraulically fracture a plurality of oil and gas wells.

BRIEF DESCRIPTION OF THE DRAWINGS

FIG. 16E is another chart illustrating execution of one or more of the various sub-steps, schematically illustrated in FIGS. 16A through 16C, of the eighth step of the method illustrated in FIG. 1B, according to one or more embodiments.

DETAILED DESCRIPTION

Figure 1A:
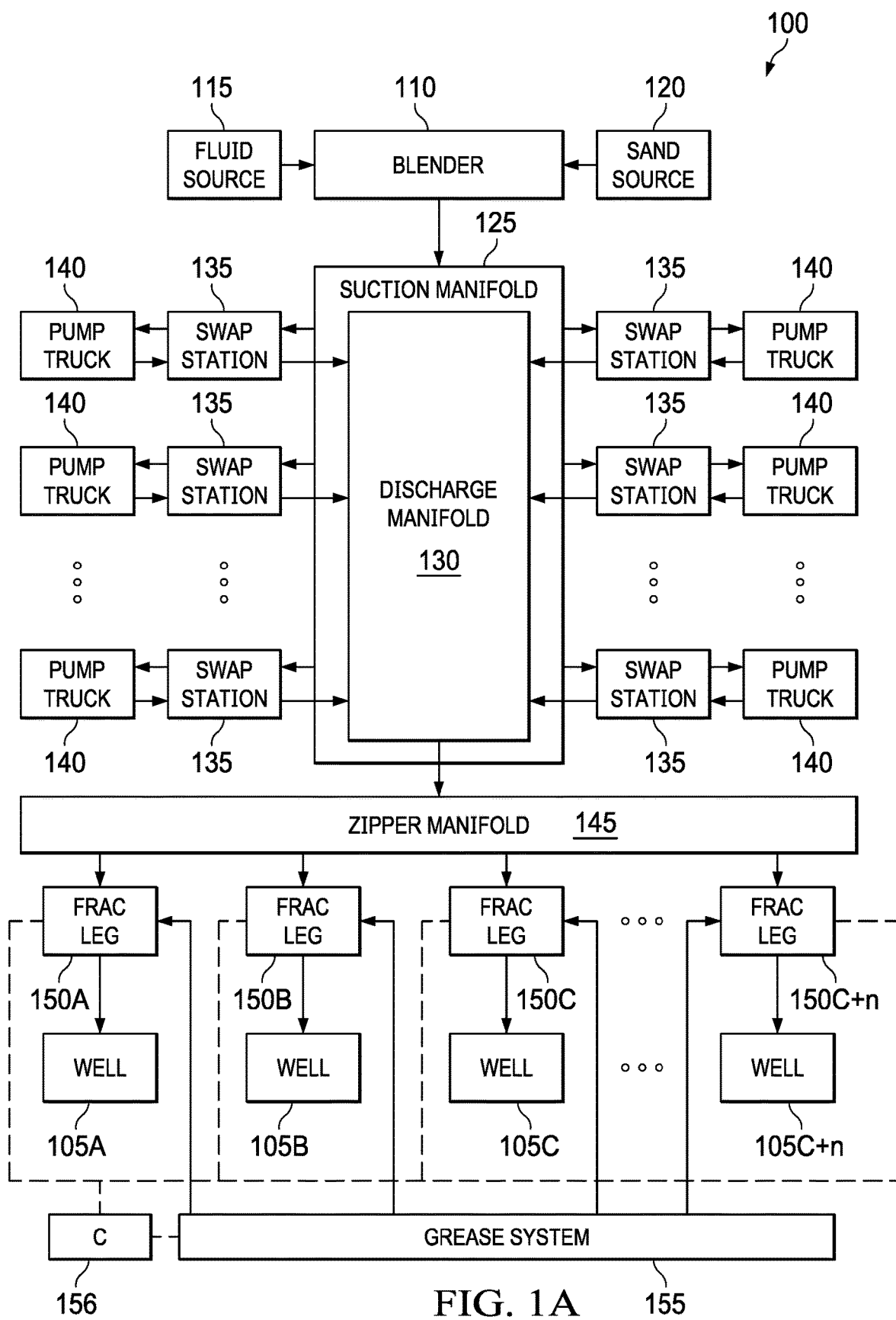
FIG. 1A is a diagrammatic illustration of a hydraulic fracturing system operably to execute a hydraulic fracturing plan to hydraulically fracture a plurality of oil and gas wells, according to one or more embodiments.

Referring to FIG. 1A, in an embodiment, a hydraulic fracturing system 100 for executing a hydraulic fracturing plan to hydraulically fracture wells 105A through 105C+n is illustrated, which hydraulic fracturing system 100 includes: a blender 110 adapted to mix fluid from a fluid source 115 with sand from a sand source 120 to produce hydraulic fracturing fluid; a suction manifold 125 adapted to receive the hydraulic fracturing fluid from the blender 110; a discharge manifold 130; a plurality of swap stations 135, each adapted to communicate the hydraulic fracturing fluid from the suction manifold 125 to a corresponding pump truck 140, and, after pressurization by the corresponding pump truck 140, to communicate the pressurized hydraulic fracturing fluid from the corresponding pump truck 140 to the discharge manifold 130; and a zipper manifold 145 adapted to communicate the pressurized hydraulic fracturing fluid from the discharge manifold 130 to a plurality of hydraulic fracturing legs (or "frac legs") 150A through 150C+n, each of which is adapted to communicate the pressurized hydraulic fracturing fluid from the zipper manifold 145 to a corresponding one of the wells 105A through 105C+n. In one or more embodiments, each of the swap stations 135 is or includes one or more components shown and described in U.S. patent application Ser. No. 16/436,189, filed Jun. 10, 2019, now published as U.S. Patent Application Publication No. 2020/0386359, the entire disclosure of which is hereby incorporated herein by reference.

A grease system 155 is adapted to communicate lubricating grease to various components of the frac legs 150A through 150C+n, including, for example, pump-down valves 160a-b, master valves 165a-b, and zipper valves 170a-b associated with each of the frac legs 150A through 150C+n (which components are shown in FIGS. 2A-G, 5A-C, 7A-I, 9A-G, 11, 14A-B, 16A-C, and 18A-G). In one or more embodiments, the grease system 155 is or includes one or more components shown and described in U.S. patent application Ser. No. 16/248,648, filed Jan. 15, 2019, now issued as U.S. Pat. No. 10,724,682, the entire disclosure of which is hereby incorporated herein by reference. In addition, or instead, in one or more embodiments, the grease system 155 is or includes one or more components shown and described in U.S. patent application Ser. No. 16/938,341, filed Jul. 24, 2020, now published as U.S. Patent Application Publication No. 2020/0355322, the entire disclosure of which is hereby incorporated herein by reference in its entirety. In addition, or instead, in one or more embodiments, the grease system 155 is or includes one or more components shown and described in the '749 application, filed Apr. 22, 2020, now published as U.S. Patent Application Publication No. 2020/0248529, the entire disclosure of which is hereby incorporated herein by reference in its entirety. In addition, or instead, in one or more embodiments, the grease system 155 is or includes one or more components shown and described in the '854 application, filed May 13, 2021, the entire disclosure of which is hereby incorporated herein by reference in its entirety.

A controller 156 is adapted to control the grease system 155, the frac legs 150A through 150C+n, or both. In one or more embodiments, the controller 156 is or includes a non-transitory computer readable medium and one or more processors adapted to execute instructions stored on the non-transitory computer readable medium. In one or more embodiments, the controller 156 is located on-site at the well site. Alternatively, the controller 156 may be located remotely from the well site. In one or more embodiments, the controller 156 includes a plurality of controllers. In one or more embodiments, the controller 156 includes a plurality of controllers, with one or more controllers located on-site at the well site and/or one or more other controllers located remotely from the well site.

Figure 1B:
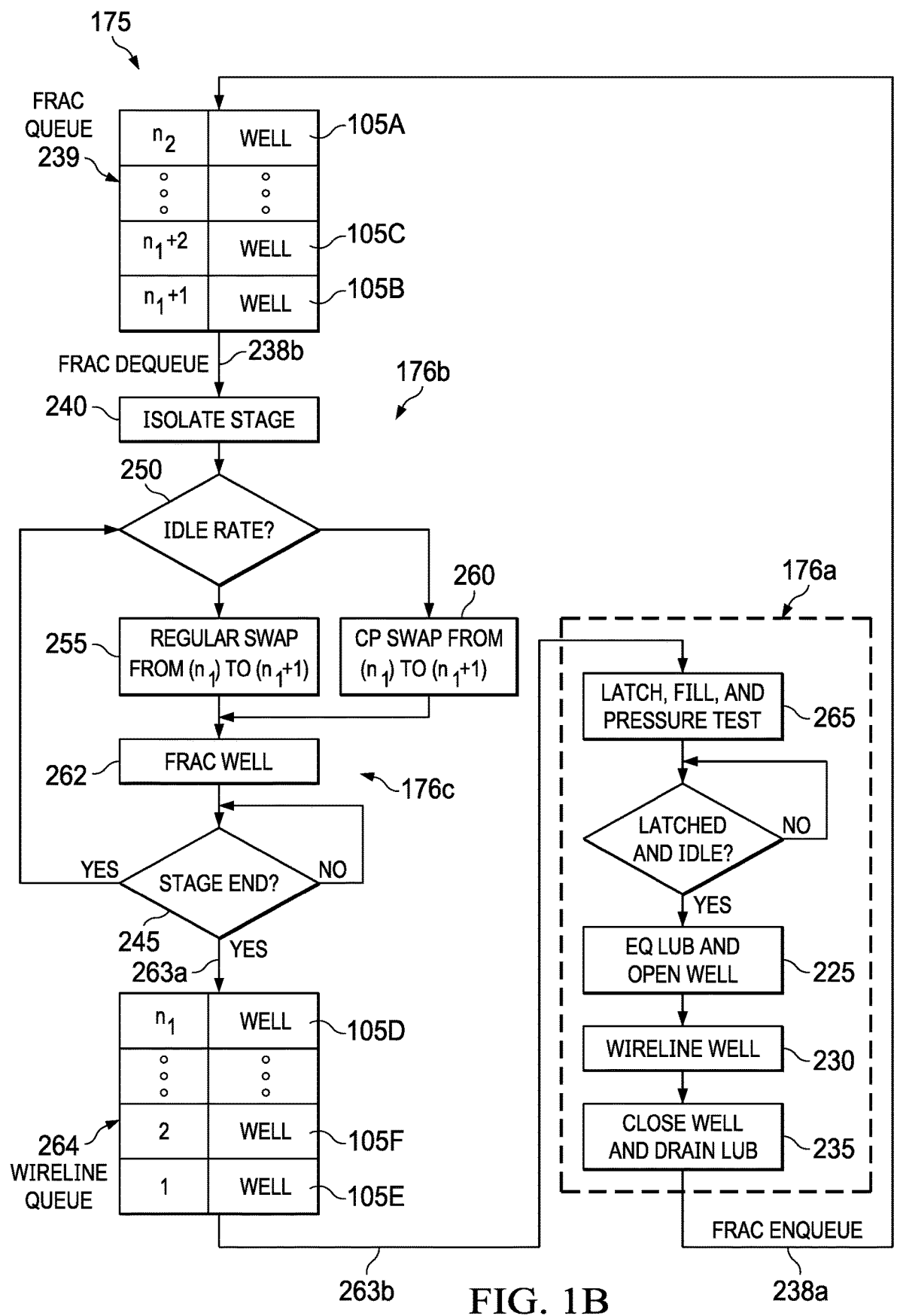
FIG. 1B is a flow diagram illustrating a method for hydraulically fracturing a plurality of wells by executing a hydraulic fracturing plan using the hydraulic fracturing system of FIG. 1A, according to one or more embodiments.

Referring to FIG. 1B, in an embodiment, a method 175 for hydraulically fracturing the wells 105A through 105C+n by executing a hydraulic fracturing plan using the hydraulic fracturing system 100 of FIG. 1A is illustrated. The method 175 generally includes: at step(s) 176a, perforating a stage of each well using, for example, a wireline perforating system 177; at step(s) 176b, isolating the perforated stage of each well using an object dropped, for example, from a launcher 178 of the wireline perforating system 177; and, at step(s) 176c, hydraulically fracturing the isolated/perforated stage of each well. More particularly, as will be described in further detail below, the method 175 includes: at a step 225, equalizing a lubricator 220 of the frac leg 150A associated with the well 105A, and opening the well 105A; at a step 230, perforating a stage of the well 105A using the wireline perforating system 177; at a step 235, closing the well 105A using the valve apparatus 210 and draining the lubricator 220; at a step 238a, queuing the well 105A (as indicated at queue position $n_2$) in a frac queue 239 in preparation for a hydraulic fracturing operation; at a step 238b, dequeuing the well 105B (as indicated at queue position $n_1+1$) from the frac queue 239 in preparation for the hydraulic fracturing operation; at a step 240, isolating a stage of the well 105B in preparation for the hydraulic fracturing operation; at a step 245, detecting or otherwise determining that a fracturing stage of the well 105D has ended; at a step 250, determining whether to permit a regular swap or a CP swap from hydraulically fracturing (at a step 262) the well 105D to hydraulically fracturing (at the step 262) the well 105B; at a step 255, executing the regular swap from hydraulically fracturing (at the step 262) the well 105D to hydraulically fracturing (at the step 262) the well 105B, or, at a step 260, executing the CP swap from hydraulically fracturing (at the step 262) the well 105D to hydraulically fracturing (at the step 262) the well 105B; at the step 262, hydraulically fracturing the well 105B; optionally, at a step 263a, queuing the well 105D (as indicated at queue position $n_1$) in a wireline queue 264 in preparation for perforating a next stage of the well 105D; optionally, at a step 238b, dequeuing the well 105E (as indicated at queue position 1) from the wireline queue 264 in preparation for perforating a next stage of the well 105E; and, at a step 265, latching, filling, and pressure testing the frac leg 150E associated with the well 105E.

In one or more embodiments, the controller 156 is adapted to control the grease system 155, the frac legs 150A through 150C+n, or both, in order to execute the method 175 described herein. In one or more embodiments, the frac queue 239 and the wireline queue 264 are stored on a non-transitory computer readable medium that includes or is part of, for example, the controller 156. In one or more embodiments, the frac queue 239 is or includes a list of data items, commands, etc., stored on the computer readable medium so as to be retrievable by one or more processors in a definite order (but not necessarily in the order stored), and the frac queue 239 is associated with the wells 105A through 105C+n, as shown in FIG. 1B. In addition, or instead, the frac queue 239 can be at least partially populated by an external source, such as, for example, the frac operator. Likewise, in one or more embodiments, the wireline queue 264 is or includes a list of data items, commands, etc., stored on the computer readable medium so as to be retrievable by one or more processors in a definite order (but not necessarily in the order stored), and the wireline queue 264 is associated with the wells 105A through 105C+n, as shown in FIG. 1B. In addition, or instead, the wireline queue 264 can be at least partially populated by an external source, such as, for example, the wireline operator.

Referring to FIGS. 2A through 2G, in an embodiment, the frac leg 150A associated with the well 105A is illustrated, which frac leg 150A includes: a wellhead including the master valves 165a-b (such as, for example, gate valves) operably coupled to, and adapted to be in fluid communication with, the well 105A, each of the master valves 165a-b including associated grease ports (or "GPs") 185a-b; the pump-down valves 160a-b (such as, for example, gate valves) operably coupled to, and adapted communicate fluid between, a pump-down truck 190 and the well 105A, via the master valves 165a-b, each of the pump-down valves 160a-b including an associated GP 195; and the zipper valves 170a-b (such as, for example, gate valves) operably coupled to, and adapted communicate fluid between, the zipper manifold 145 and the well 105A, via the master valves 165a-b, each of the zipper valves 170a-b including associated GPs 200a-b. In one or more embodiments, one or both of the zipper valves 170a-b of each of the frac legs 150A through 150C+n include(s), or is/are part of, the zipper manifold 145. In one or more embodiments, as in FIGS. 2A through 2G, the frac leg 150A associated with the well 105A also includes a flow block 205 to which the pump-down valves 160a-b and the zipper valves 170a-b are operably coupled.

The frac leg 150A associated with the well 105A further includes a valve apparatus 210 via which both the wireline perforating system 177 and the object launched from, for example, the launcher 178, are permitted entry to the well 105A. The valve apparatus 210 includes: a containment area 215a (labeled "WELL") adapted to be in fluid communication with the well 105A via the master valves 165a-b; a containment area 215b (labeled "LUB") adapted to be in fluid communication with the lubricator 220 of the wireline perforating system 177; and a containment area 215c (labeled "LL") adapted to be in fluid communication with the containment area 215a via a flow control device 221a (e.g., a flapper-type flow control device), and adapted to be in fluid communication with the containment area 215b via a flow control device 221b (e.g., a flapper-type flow control device).

An equalization ("EQ") valve 222a is connected between the containment areas 215a and 215c, which EQ valve 222a is openable to permit pressure equalization between the containment areas 215a and 215c when the flow control device 221a is closed. Likewise, an equalization valve 222b is connected between the containment areas 215b and 215c, which EQ valve 222b is openable to permit pressure equalization between the containment areas 215b and 215c when the flow control device 221b is closed. Additionally, an EQ valve 222c is connected between the lubricator 220 and atmosphere (labeled "ATM"), which EQ valve 222c permits pressure equalization between the lubricator 220 and atmosphere. A drain 223 is connected between a latch 234 (via which the lubricator 220 is detachably couplable to the valve apparatus 210) and a pump station 224a, via which drain 223 fluid is communicable to and/or from the lubricator 220, using, for example, an auto-fill/auto-drain pump of the pump station 224a, when the lubricator 220 is connected to the valve apparatus 210 via the latch 234. Finally, when the lubricator 220 is connected to the valve apparatus 210 via the latch 234, fluid can also be communicated to the lubricator 220 (via, for example, the containment area 215c and the EQ valve 222b) using one or more boost pump(s) 224b in order to increase a fluid pressure in the lubricator 220, aiding in pressure equalization between the lubricator 220 and the associated wellhead. For example, the boost pump(s) 224b may include: a first boost pump capable of pumping at relatively higher volumes and relatively lower pressures; and a second boost pump capable of pumping at relatively lower volumes and relatively higher pressures. The first and second boost pumps are used in combination to achieve combined pumping at relatively higher volumes and relatively higher pressures. In addition, or instead, a third boost pump capable of pumping at relatively higher volumes and relatively higher pressures may be used. Moreover, although shown as being connected to, and in fluid communication with, the containment area 215c, one or more of the boost pump(s) 224b may instead be, include, or be part of the pump station 224a.

In one or more embodiments, the valve apparatus 210 is or includes one or more components shown and described in U.S. patent application Ser. No. 15/487,785, filed Apr. 14, 2017, now issued as U.S. Pat. No. 10,662,740, the entire disclosure of which is hereby incorporated herein by reference. In addition, or instead, in one or more embodiments, the valve apparatus 210 is or includes one or more components shown and described in U.S. patent application Ser. No. 16/721,203, filed Dec. 19, 2019, now published as U.S.

Patent Application Publication No. 2020/0123876, the entire disclosure of which is hereby incorporated herein by reference.

In one or more embodiments, the launcher 178 is or includes one or more components shown and described in U.S. patent application Ser. No. 16/248,633, filed Jan. 15, 2019, now issued as U.S. Pat. No. 10,584,552, the entire disclosure of which is hereby incorporated herein by reference. In addition, or instead, in one or more embodiments, the launcher 178 is or includes one or more components shown and described in U.S. patent application Ser. No. 16/801,911, filed Feb. 26, 2020, now published as U.S. Patent Application Publication No. 2020/0190933, the entire disclosure of which is hereby incorporated herein by reference. In addition, or instead, in one or more embodiments, the launcher 178 is or includes one or more components shown and described in U.S. patent application Ser. No. 16/803,156, filed Feb. 27, 2020, now published as U.S. Patent Application Publication No. 2020/0190934, the entire disclosure of which is hereby incorporated herein by reference.

In one or more embodiments, the frac legs 150B through 150C+n associated with each of the wells 105B through 105C+n, respectively, are substantially identical to the frac leg 150A associated with the well 105A; therefore, the frac legs 150B through 150C+n associated with each of the wells 105B through 105C+n will not be described in further detail. Accordingly, each of the frac legs 150B through 150C+n associated with the wells 105B through 105C+n includes features/components substantially identical to corresponding features/components of the frac leg 150A associated with the well 105A, which substantially identical features/components are given the same reference numerals and will also not be described in further detail.

Figure 2A:
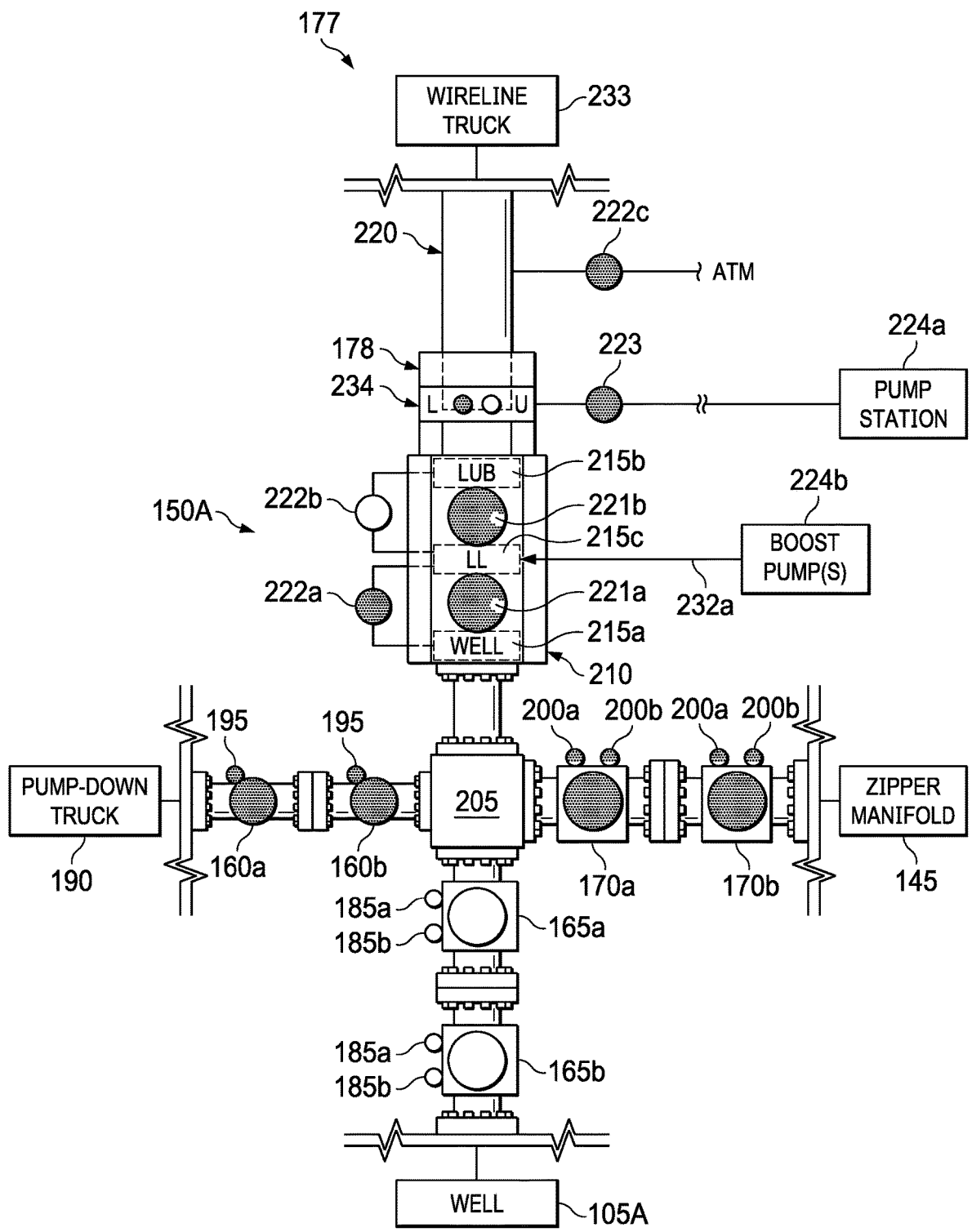
FIG. 2A schematically illustrates execution of one or more sub-step(s) of a first step of the method illustrated in FIG. 1B, which first step is or includes equalizing a lubricator of a frac leg associated with a first well, and opening the first well, according to one or more embodiments.
Figure 2B:
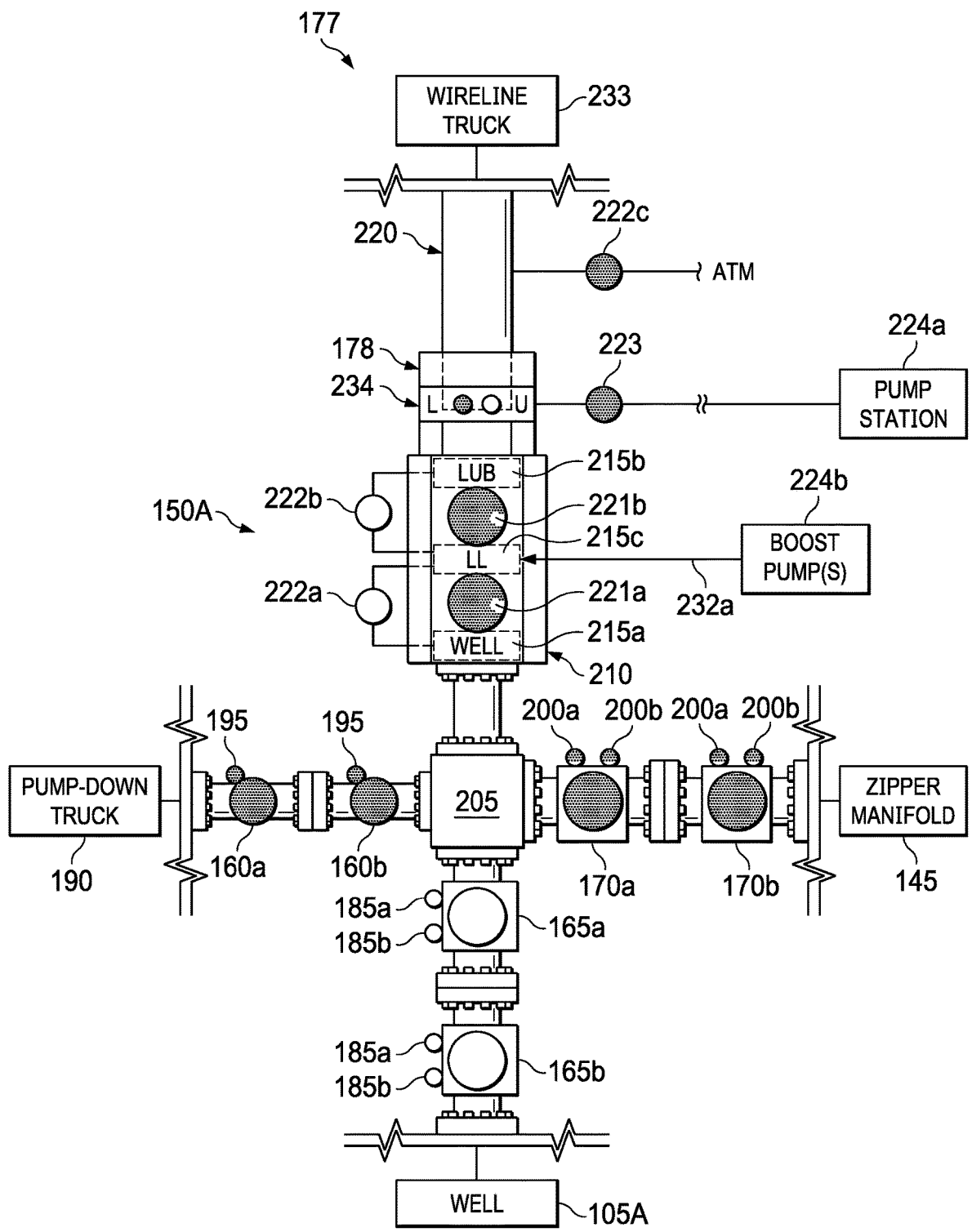
FIG. 2B schematically illustrates execution of one or more additional sub-step(s) of the first step of the method illustrated in FIG. 1B, according to one or more embodiments.
Figure 2C:
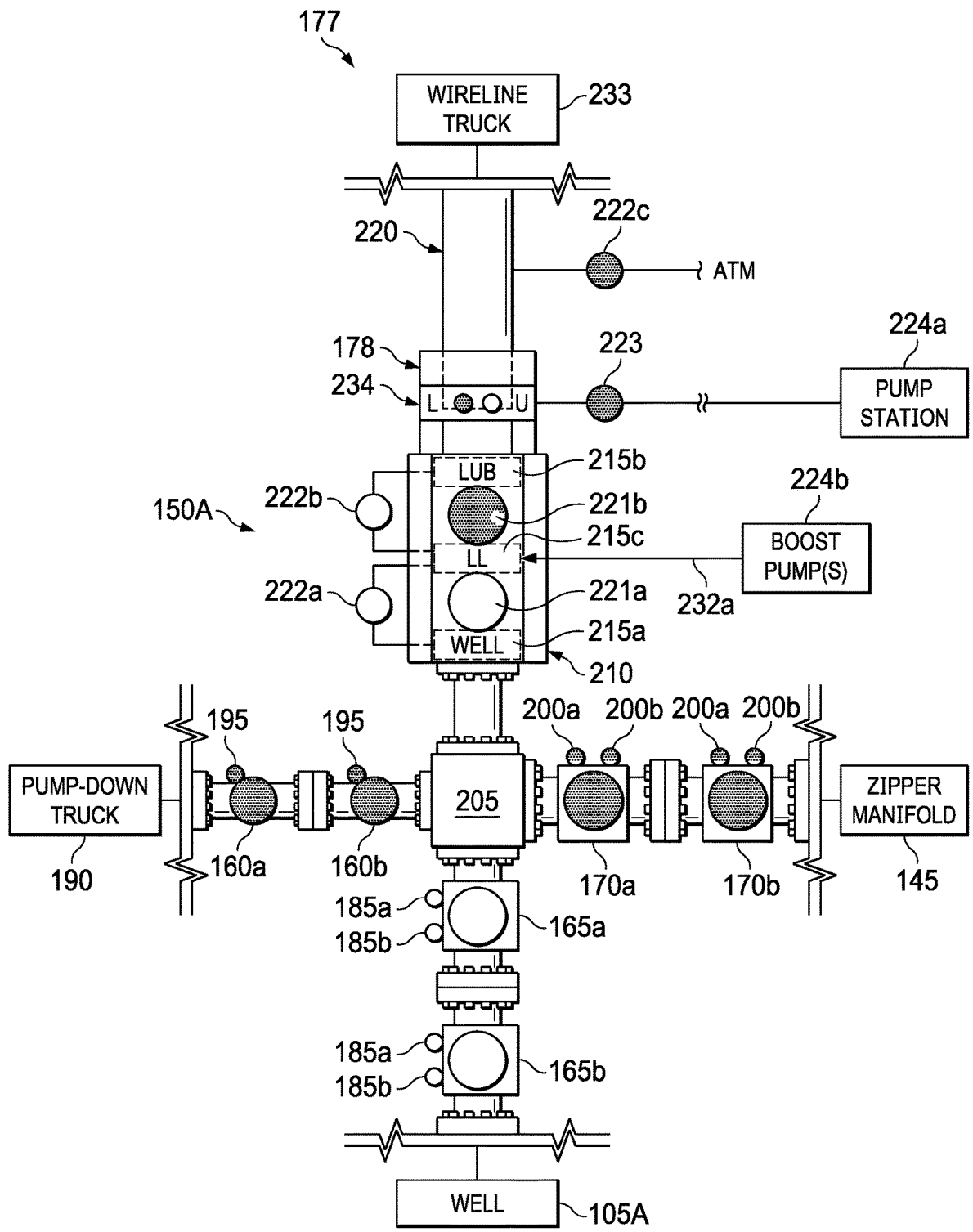
FIG. 2C schematically illustrates execution of one or more additional sub-step(s) of the first step of the method illustrated in FIG. 1B, according to one or more embodiments.
Figure 2D:
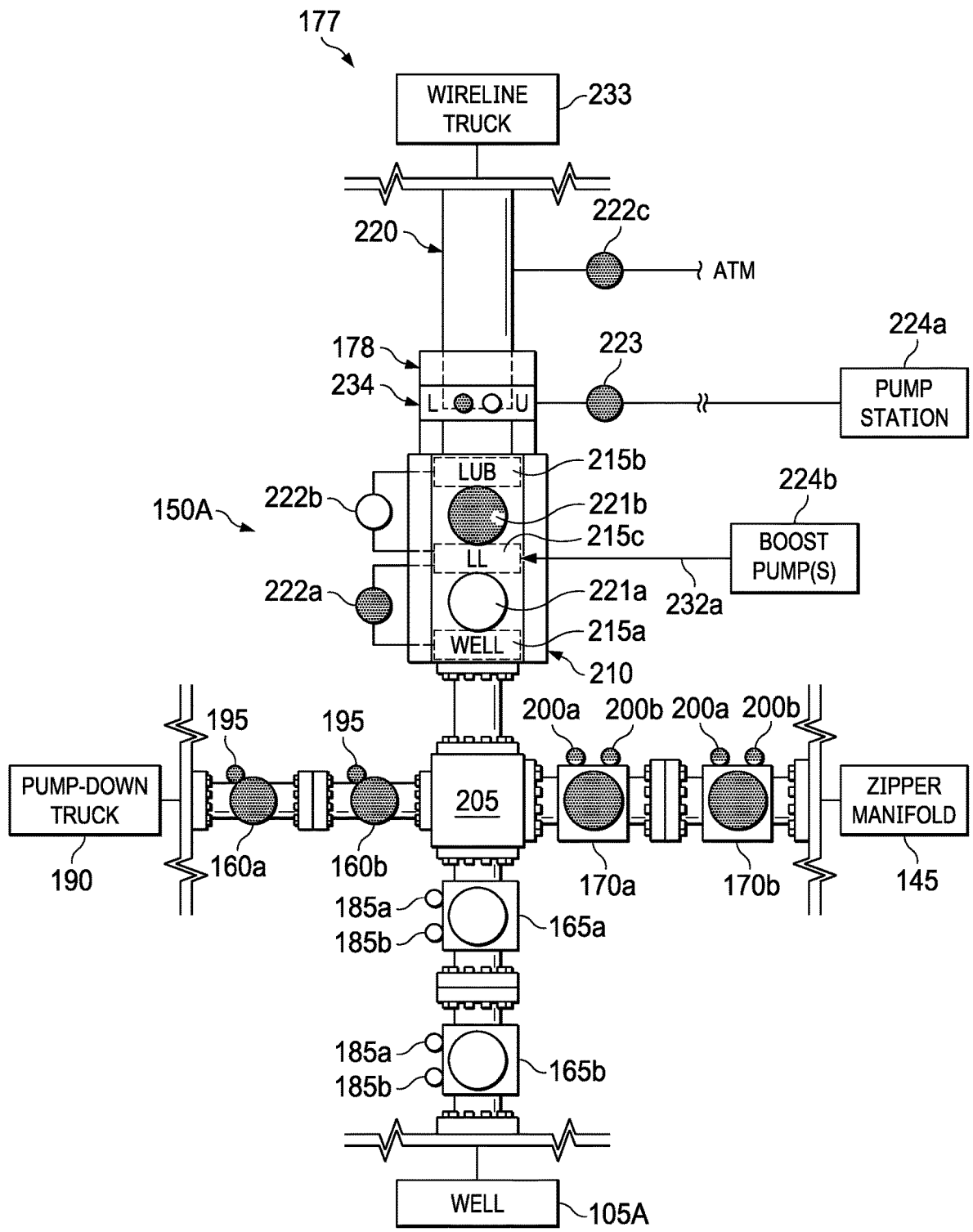
FIG. 2D schematically illustrates execution of one or more additional sub-step(s) of the first step of the method illustrated in FIG. 1B, according to one or more embodiments.
Figure 2E:
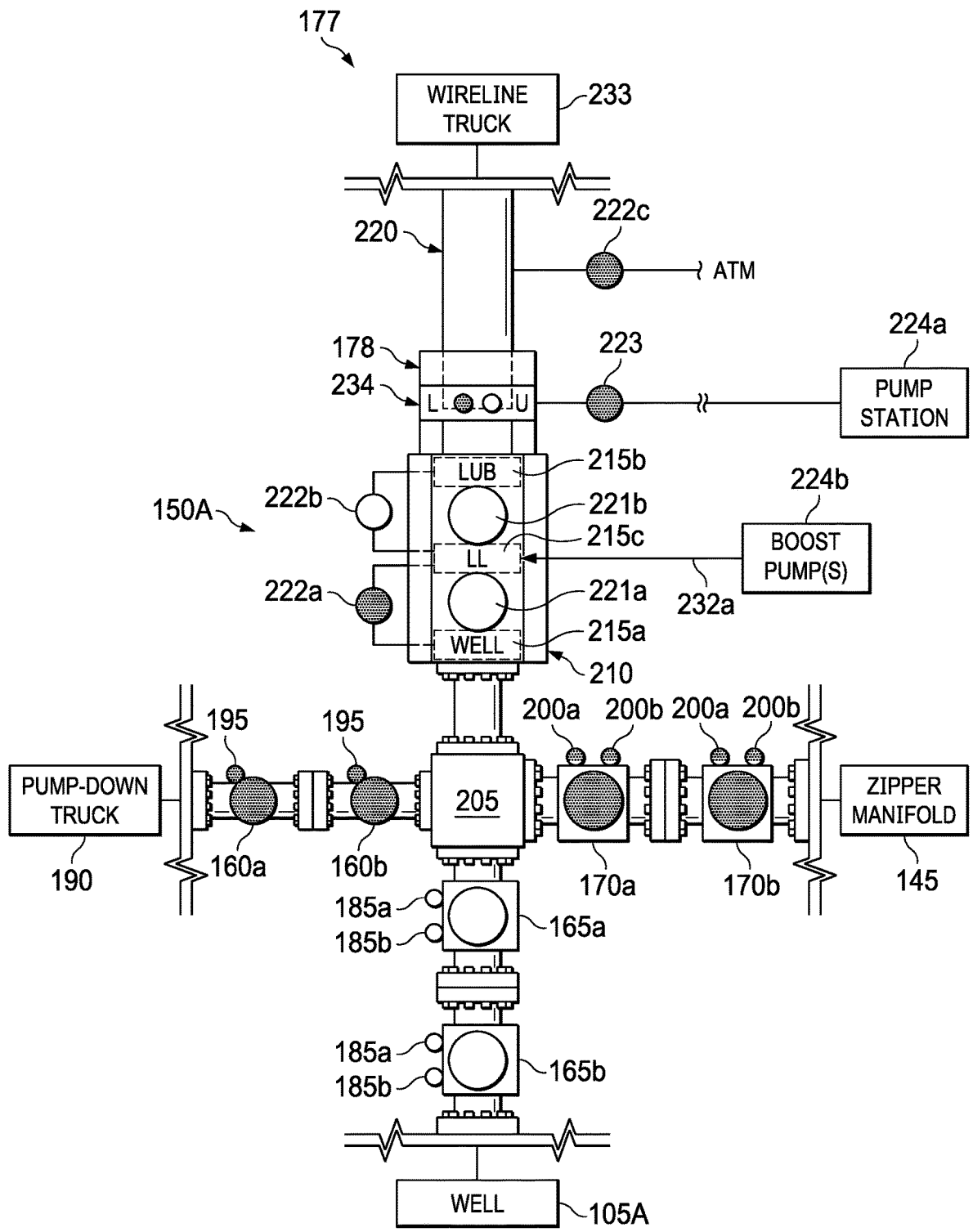
FIG. 2E schematically illustrates execution of one or more additional sub-step(s) of the first step of the method illustrated in FIG. 1B, according to one or more embodiments.
Figure 2F:
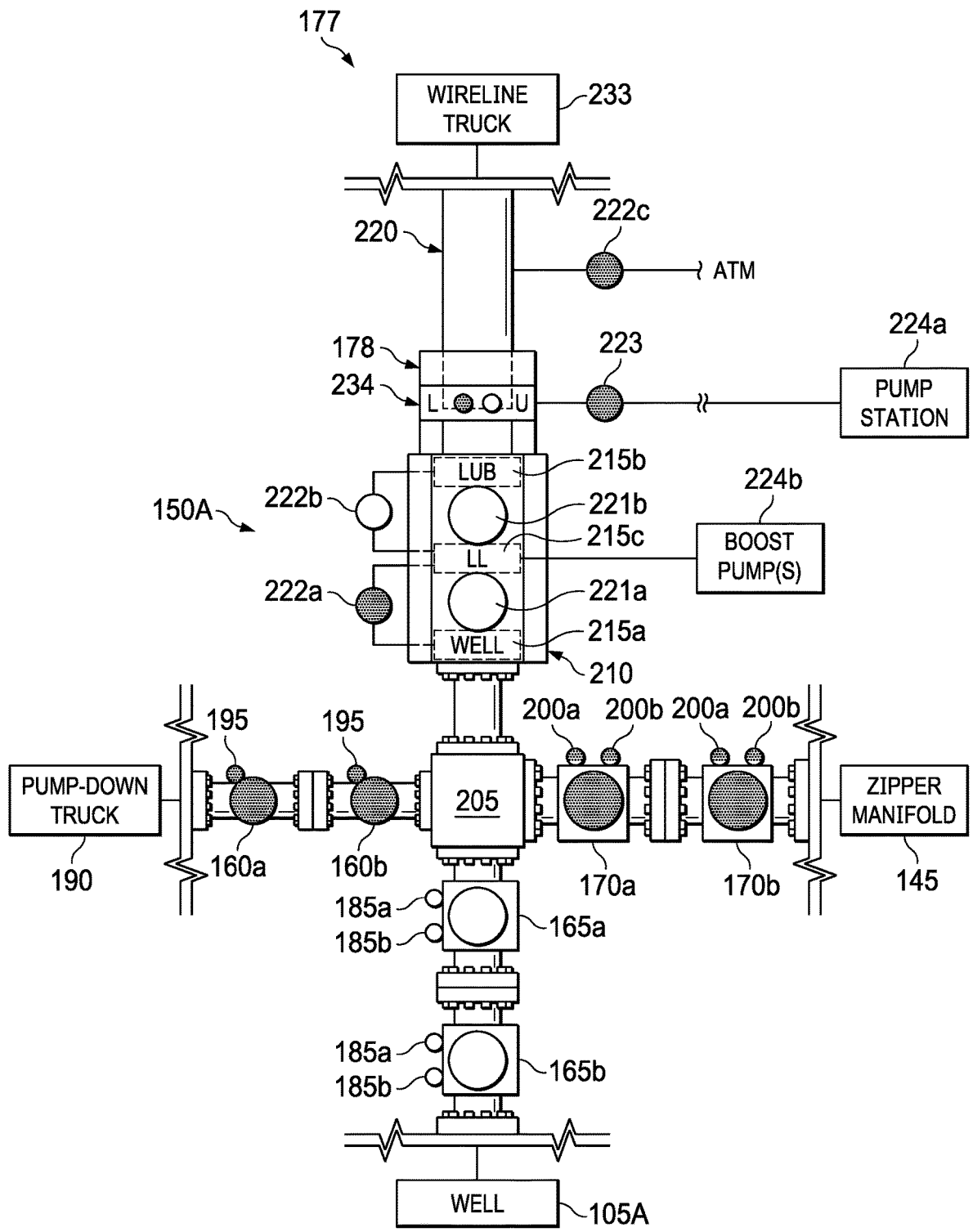
FIG. 2F schematically illustrates execution of one or more additional sub-step(s) of the first step of the method illustrated in FIG. 1B, according to one or more embodiments.
Figure 2G:
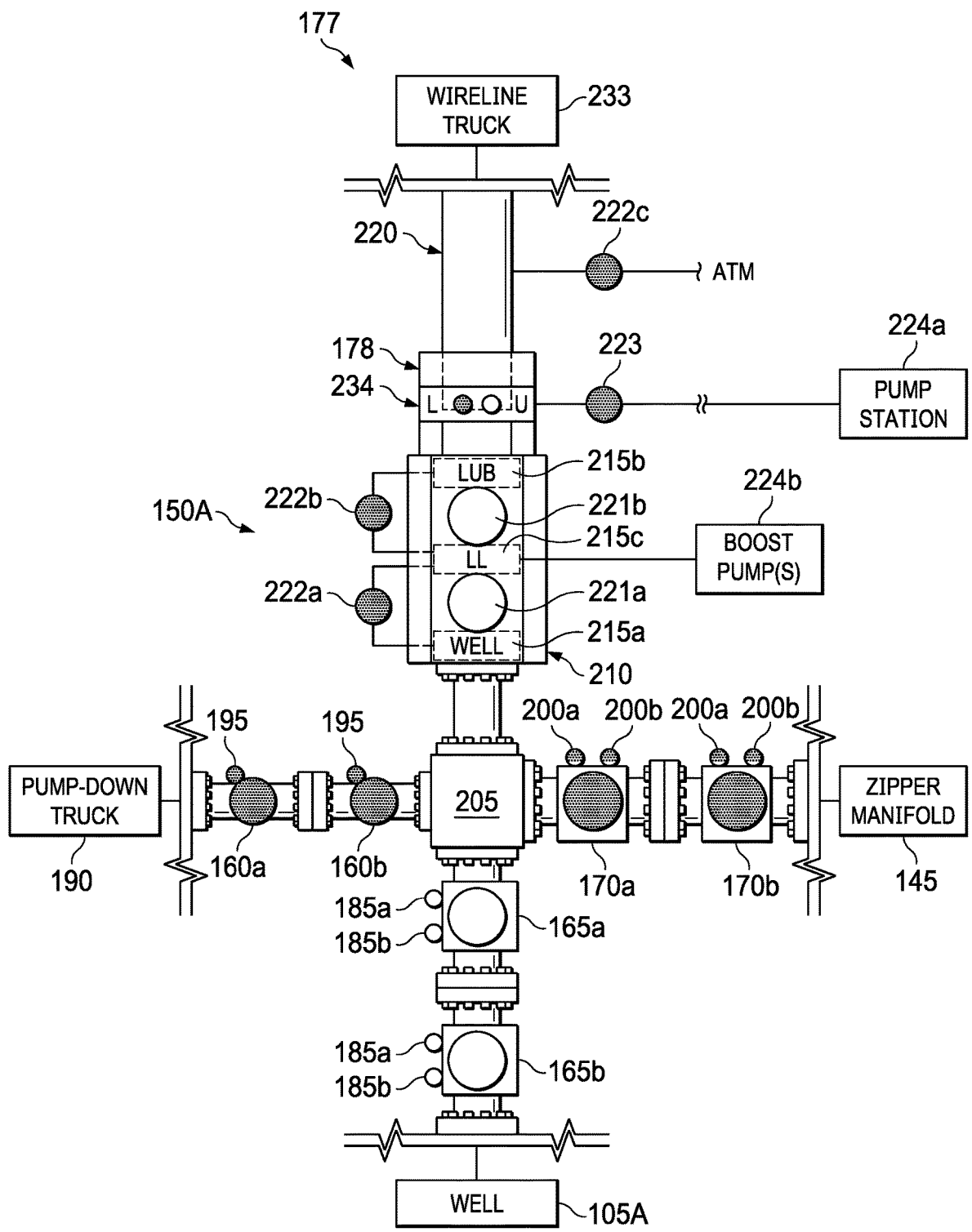
FIG. 2G schematically illustrates execution of one or more additional sub-step(s) of the first step of the method illustrated in FIG. 1B, according to one or more embodiments.
Figure 3:
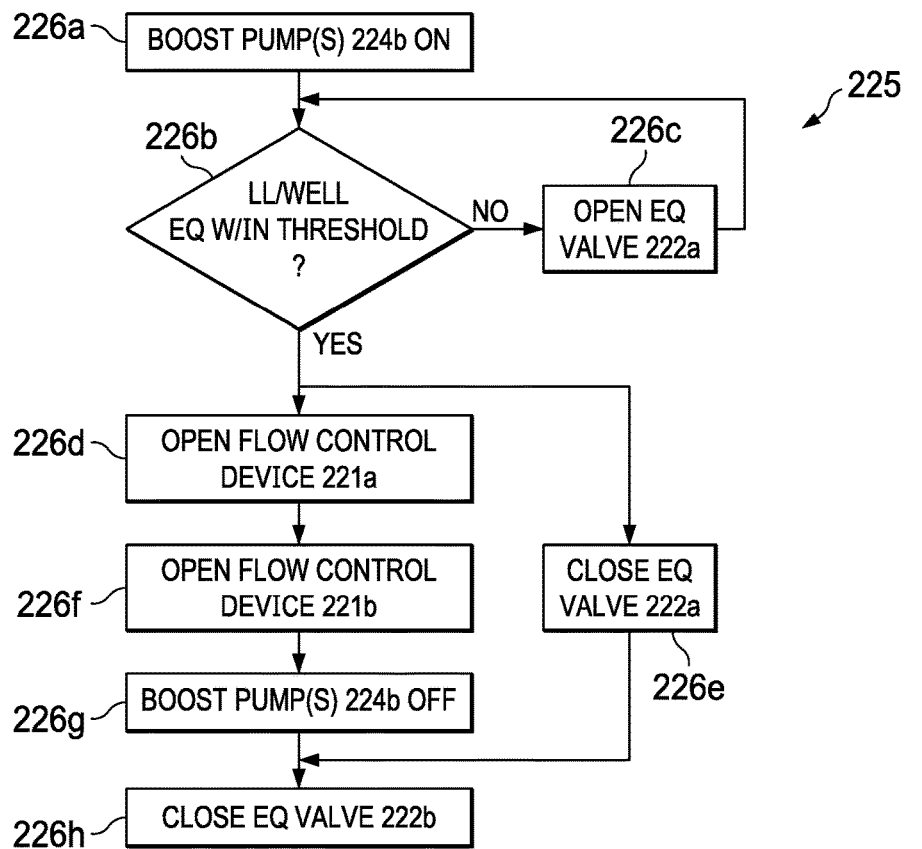
FIG. 3 is a flow diagram illustrating the various sub-steps, illustrated schematically in FIGS. 2A and 2G, of the first step of the method illustrated in FIG. 1B, according to one or more embodiments.

Referring to FIG. 3, with continuing reference to FIGS. 2A through 2G, in an embodiment, various sub-steps 226a-h of the step 225 of the method 175 illustrated in FIG. 1B are shown in detail, which step 225 is or includes equalizing the lubricator 220 of the frac leg 150A associated with the well 105A, and opening the well 105A. In one or more embodiments, the lubricator 220 is or includes one or more components shown and described in the '749 application. In addition, or instead, in one or more embodiments, the lubricator 220 is or includes one or more components shown and described in the '854 application.

At the sub-step 226a, the boost pump(s) 224b is/are turned on to increase a fluid pressure in the lubricator 220 of the frac leg 150A, thereby aiding in pressure equalization between said lubricator 220 and the well 105A, as shown in FIGS. 2A and 3 (indicated by arrow 232a in FIG. 2A). As shown in FIG. 1B, the step 265 of latching, filling, and pressure testing the frac leg 150A associated with the well 105A is executed on the frac leg 150A just prior to the execution of the sub-step 226a on the frac leg 150A. The step 265 will be described in further detail below as executed on the frac leg 150E; however, the description below also applies to the execution of the step 265 on the frac leg 150A. As a result, in one or more embodiments, just prior to execution of the sub-step 226a on the frac leg 150A: the EQ valve 222c is closed; the drain 223 is closed; the lubricator 220 extends within, and is latched to, the latch 234; the flow control device 221b is closed; the EQ valve 222b is open; the flow control device 221a is closed; the EQ valve 222a is closed; the pump-down valves 160a-b closed, and grease from the grease system 155 is withheld from the corresponding GPs 195; the zipper valves 170a-b are closed, and grease from the grease system 155 is withheld from the corresponding GPs 200a-b; and the master valves 165a-b are open, and grease from the grease system 155 is communicated to the corresponding GPs 185a-b. The communication of grease from the grease system 155 to the corresponding GPs 185a-b is not indicated by arrows in FIG. 2A but is instead indicated by a lack of shading of the GPs 185a-b as shown in FIG. 2A; the same lack of shading indication applies to the GPs 185a-b as shown in FIGS. 2B-G, 5A-C, 7A-I, 9A-G, 11, 14A-B, 16A-C, and 18A-G.

At the sub-step 226b, respective fluid pressures within the containment areas 215a and 215c are compared to determine whether the fluid pressure in the lubricator 220 of the frac leg 150A has been equalized to within a threshold amount of the fluid pressure in the well 105A. If it is determined that the fluid pressure in the lubricator 220 of the frac leg 150A has not been equalized to within the threshold amount of the fluid pressure in the well 105A, the EQ valve 222a is opened at the sub-step 226c to further encourage such pressure equalization between said lubricator 220 and the well 105A, as shown in FIGS. 2B and 3. Alternatively, the order in which the sub-steps 226a and 226c are executed may be reversed, or one of the sub-steps 226a and 226c may be omitted altogether.

At the sub-step 226d, once it is determined that the fluid pressure in the lubricator 220 of the frac leg 150A has been equalized to within the threshold amount of the fluid pressure in the well 105A, the flow control device 221a is opened, as shown in FIGS. 2C and 3. At the sub-step 226e, the EQ valve 222a is closed, as shown in FIGS. 2D and 3. However, in those embodiments in which the sub-step 226c of opening the EQ valve 222a is omitted, the sub-step 226e of closing the EQ valve 222a is also omitted. Additionally, the sub-step 226e may be executed to close the EQ valve 222a at any time before, during, or after, execution of the sub-steps 226d, 226f, or 226g. At the sub-step 226f, the flow control device 221b is opened, as shown in FIGS. 2E and 3. At the sub-step 226g, the boost pump(s) 224b is/are turned off, as shown in FIGS. 2F and 3. At the sub-step 226h, the EQ valve 222b is closed, as shown in FIGS. 2G and 3. Once the sub-steps 226a-h are executed, the well 105A is ready for execution of the step 230, namely perforating a stage of the well 105A using the wireline perforating system 177, as will be described in detail below in connection with FIGS. 4 and 5A through 5C.

Referring to FIGS. 4 and 5A through 5C, in an embodiment, various sub-steps 231a-h of the step 230 of the method 175 illustrated in FIG. 1B are shown in detail, which step 230 is or includes perforating a stage of the well 105A using the wireline perforating system 177. In one or more embodiments, the wireline perforating system 177 is or includes the pump-down truck 190, a wireline truck 233, the lubricator 220, the launcher 178, the latch 234 (via which the lubricator 220 is detachably couplable to the valve apparatus 210), or any combination thereof. In addition, or instead, the wireline perforating system 177 may be or include one or more components shown and described in the '749 application. In addition, or instead, in one or more embodiments, the wireline perforating system 177 may be or include one or more components shown and described in the '854 application.

Figure 4:
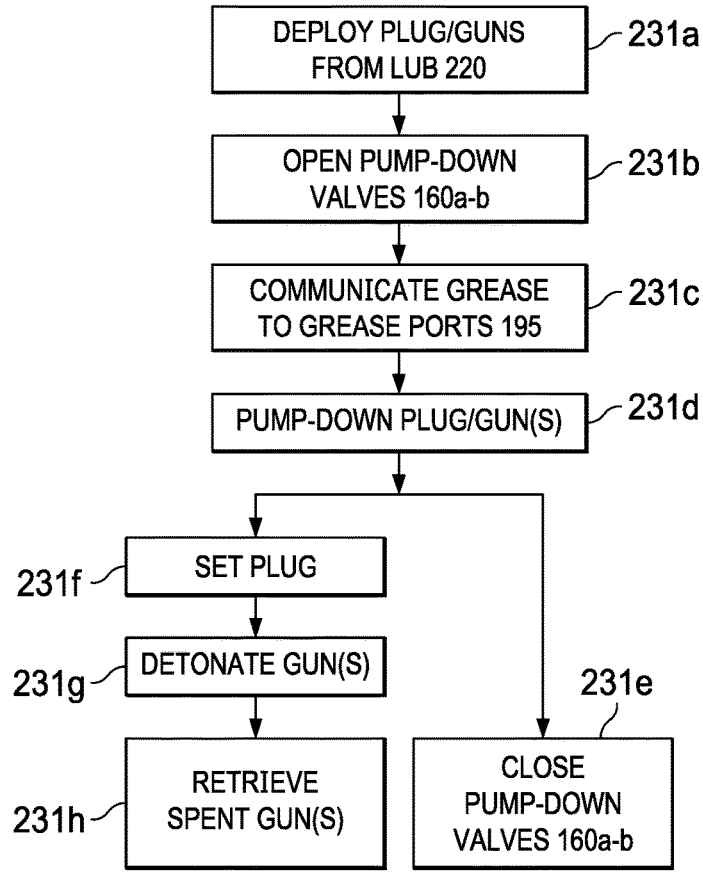
FIG. 4 is a flow diagram illustrating various sub-steps of a second step of the method illustrated in FIG. 1B, which second step is or includes perforating a stage of the first well using a wireline perforating system, according to one or more embodiments.
Figure 5A:
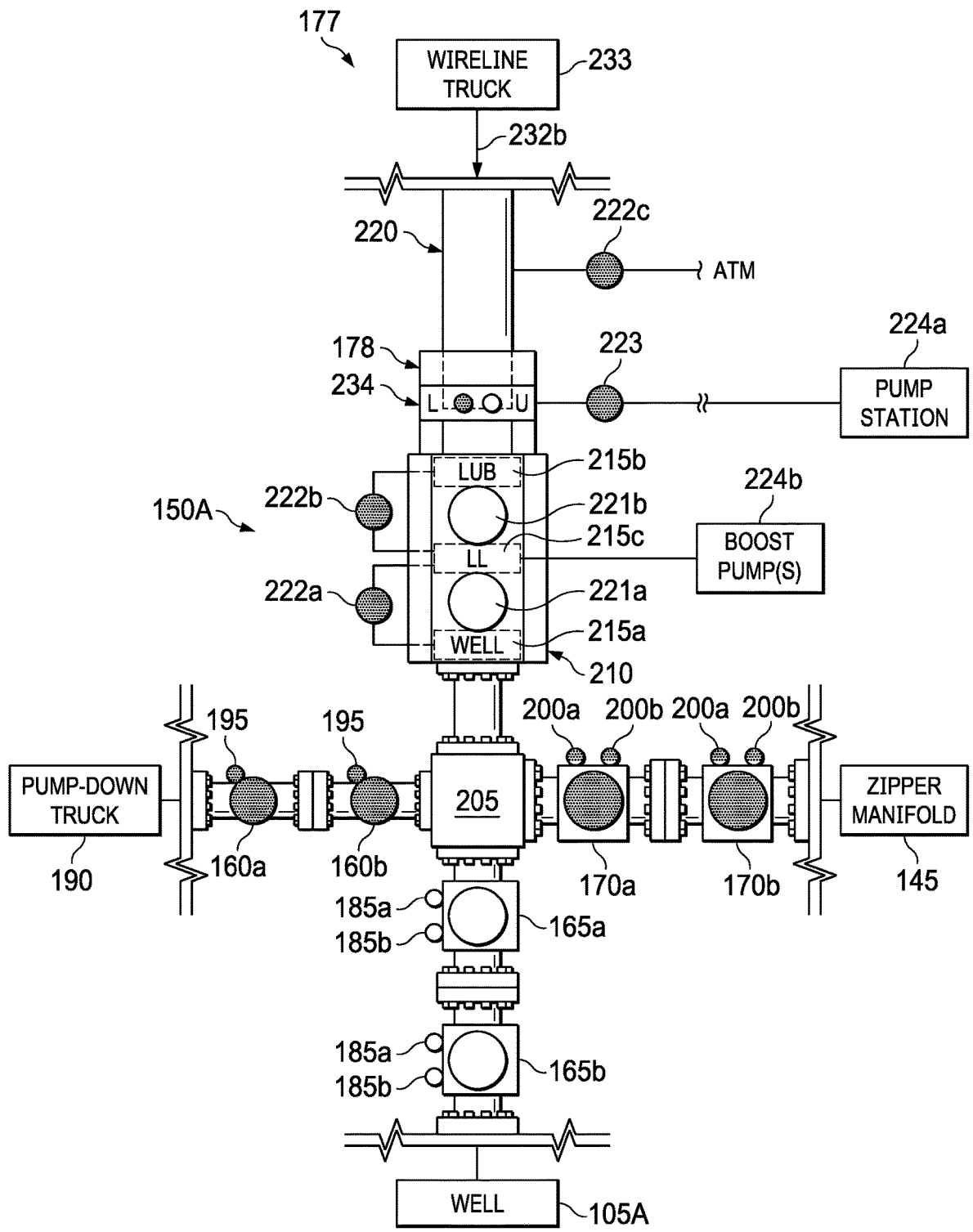
FIG. 5A schematically illustrates execution of one or more sub-step(s) of the second step of the method illustrated in FIG. 1B, according to one or more embodiments.
Figure 5B:
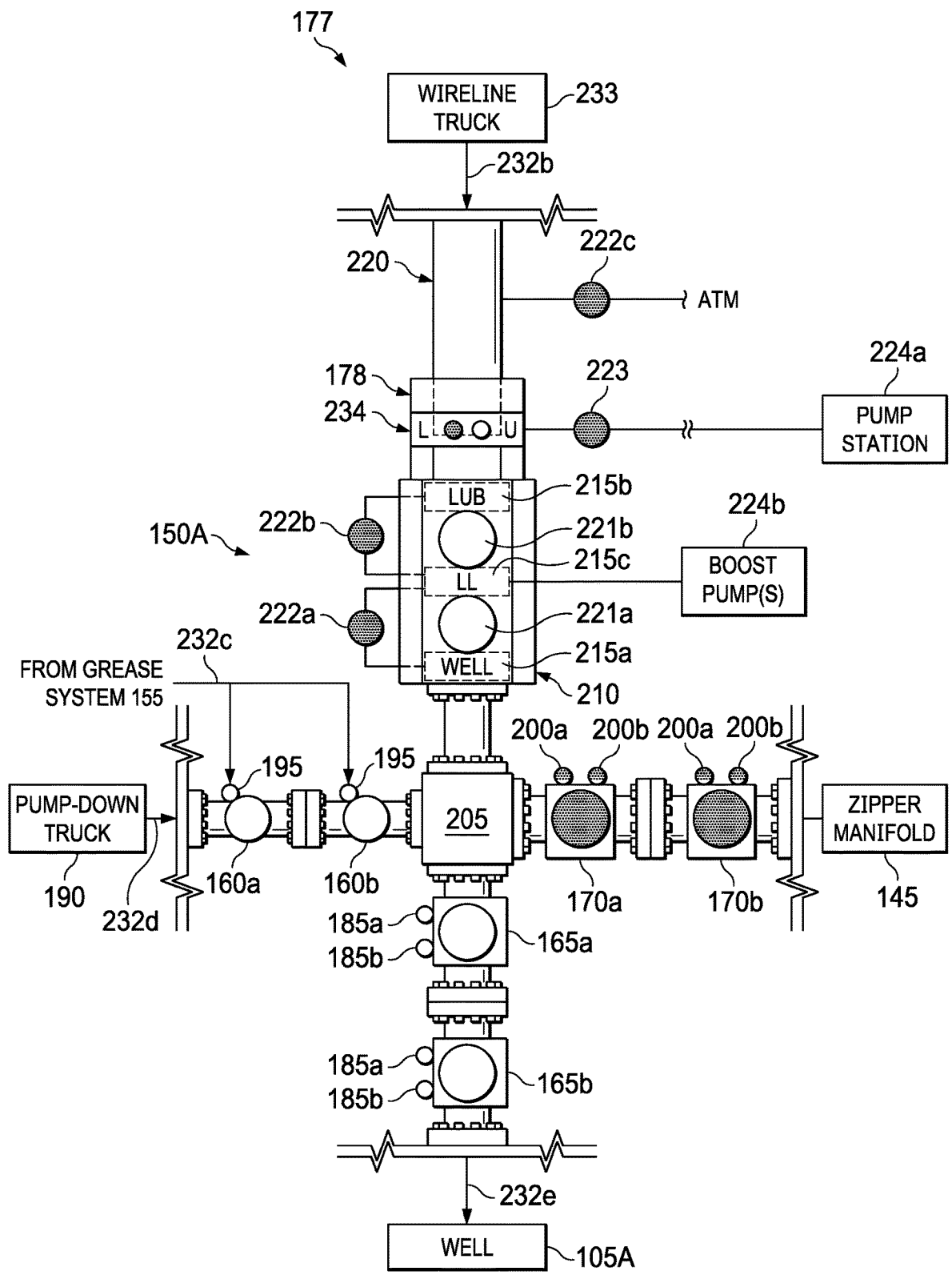
FIG. 5B schematically illustrates execution of one or more additional sub-step(s) of the second step of the method illustrated in FIG. 1B, according to one or more embodiments.
Figure 5C:
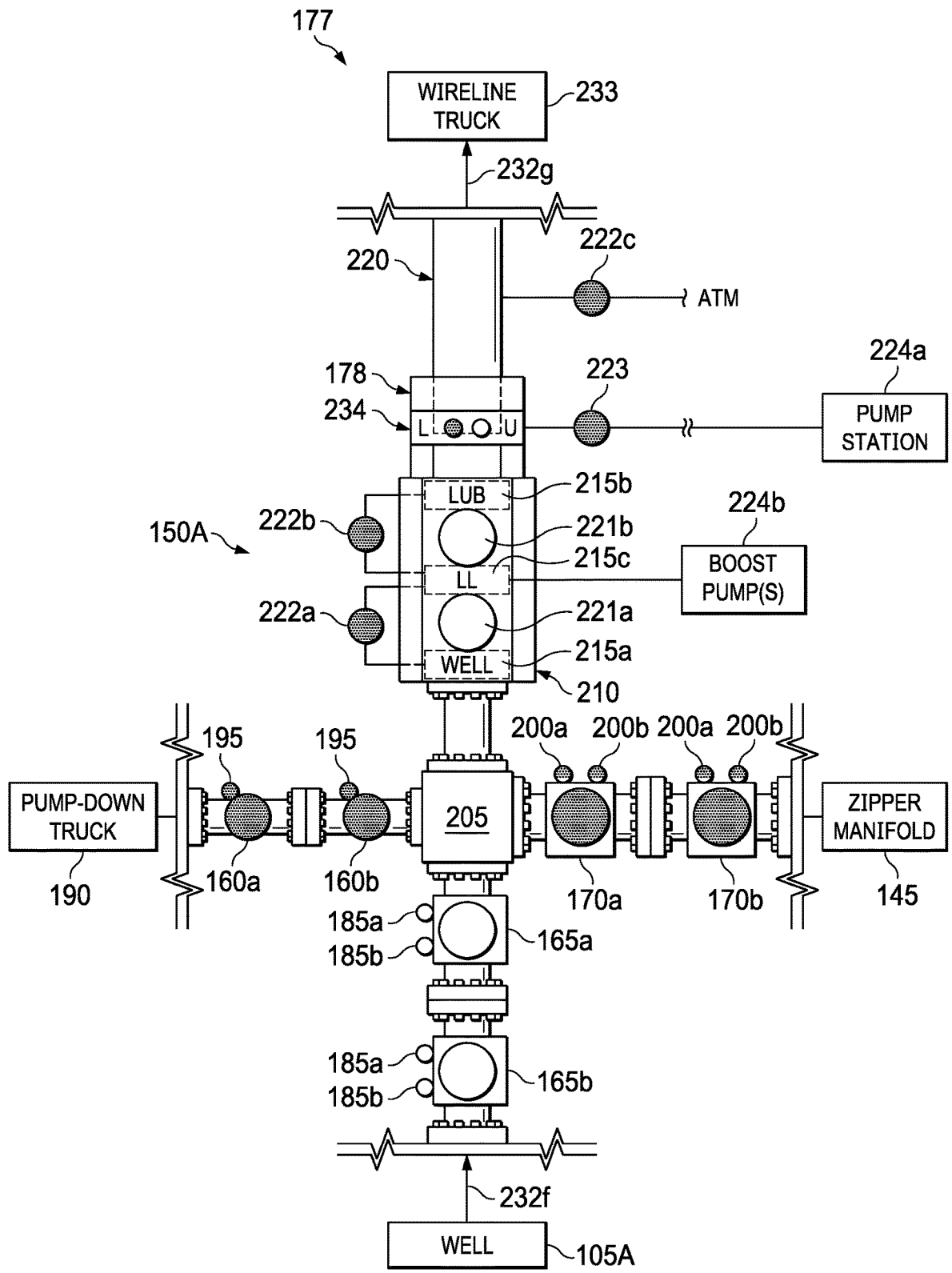
FIG. 5C schematically illustrates execution of one or more additional sub-step(s) of the second step of the method illustrated in FIG. 1B, according to one or more embodiments.

At the sub-step 231a, a plug and perforating gun(s) are deployed from the lubricator 220, as shown in FIGS. 4 and 5A (indicated by arrow 232b in FIG. 5A). At the sub-step 231b, the pump-down valves 160a-b are opened, as shown in FIGS. 4 and 5B. At the sub-step 231c, grease from the grease system 155 is communicated to the corresponding GPs 195 of the pump-down valves 160a-b, respectively, as shown in FIGS. 4 and 5B (indicated by arrows 232c in FIG. 5B). At the sub-step 231d, the plug and perforating gun(s) are pumped down into the well 105A using the pump-down truck 190, as shown in FIGS. 4 and 5B (indicated by arrows 232d and 232e in FIG. 5B). At the sub-step 231e, the pump-down valves 160a-b are closed, and grease from the grease system 155 is withheld from the corresponding GPs 195, as shown in FIGS. 4 and 5C. Additionally, the sub-step 231e may be executed to close the pump-down valves 160a-b at any time before, during, or after, execution of the sub-steps 231f, 231g, or 231h. At the sub-step 231f, the plug is set in the well 105A, as shown in FIG. 4. At the sub-step 231g, the perforating gun(s) are detonated in the well 105A, as shown in FIG. 4. Finally, at the sub-step 231h, the spent perforating gun(s) are retrieved from the well 105A, as shown in FIGS. 4 and 5C (indicated by arrows 232f and 232g in FIG. 5C). Once the sub-steps 231a-h are executed, the well 105A is ready for execution of the step 235, namely closing the well 105A using the valve apparatus 210 and draining the lubricator 220, as will be described in detail below in connection with FIGS. 6 and 7A through 7I.

Referring to FIGS. 6 and 7A through 7I, in an embodiment, various sub-steps 236a-n of the step 235 of the method 175 illustrated in FIG. 1B are shown in detail, which step 235 is or includes closing the well 105A using the valve apparatus 210 and draining the lubricator 220. At the sub-step 236a, bump up of the retrieved spent perforating gun(s) within the lubricator 220 is determined and/or confirmed. The sub-step 236a can be achieved in several ways, including, but not limited to: prompting the wireline operation for bump up; checking with the wireline operator to determine whether bump up has occurred; detecting bump up using a switch (e.g., a proximity switch) and/or another sensor (e.g., an accelerometer, a wireline speed sensor, a wireline tension sensor, a wireline length sensor, a wireline direction sensor, the like, or any combination thereof) associated with the lubricator 220; receiving verbal confirmation that bump up has occurred; or any combination thereof.

Figure 6:
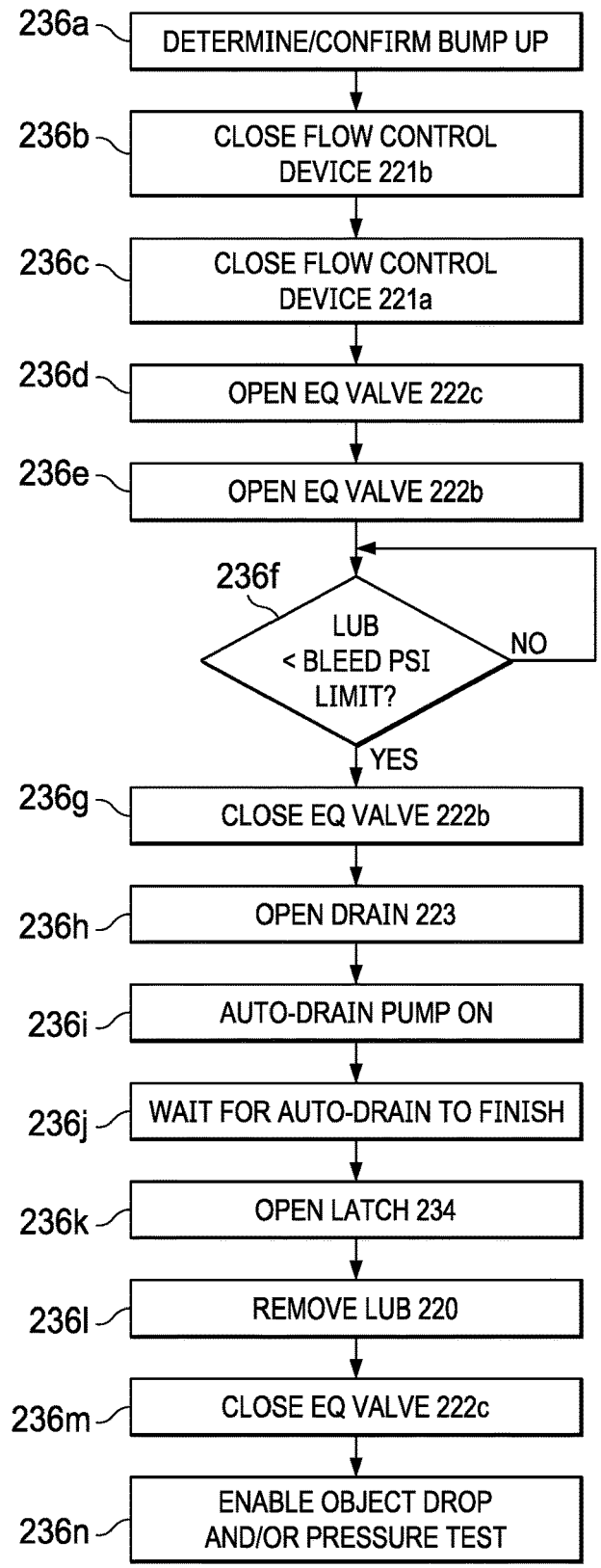
FIG. 6 is a flow diagram illustrating various sub-steps of a third step of the method illustrated in FIG. 1B, which third step is or includes closing the first well using a valve apparatus, and draining a lubricator, according to one or more embodiments.
Figure 7A:
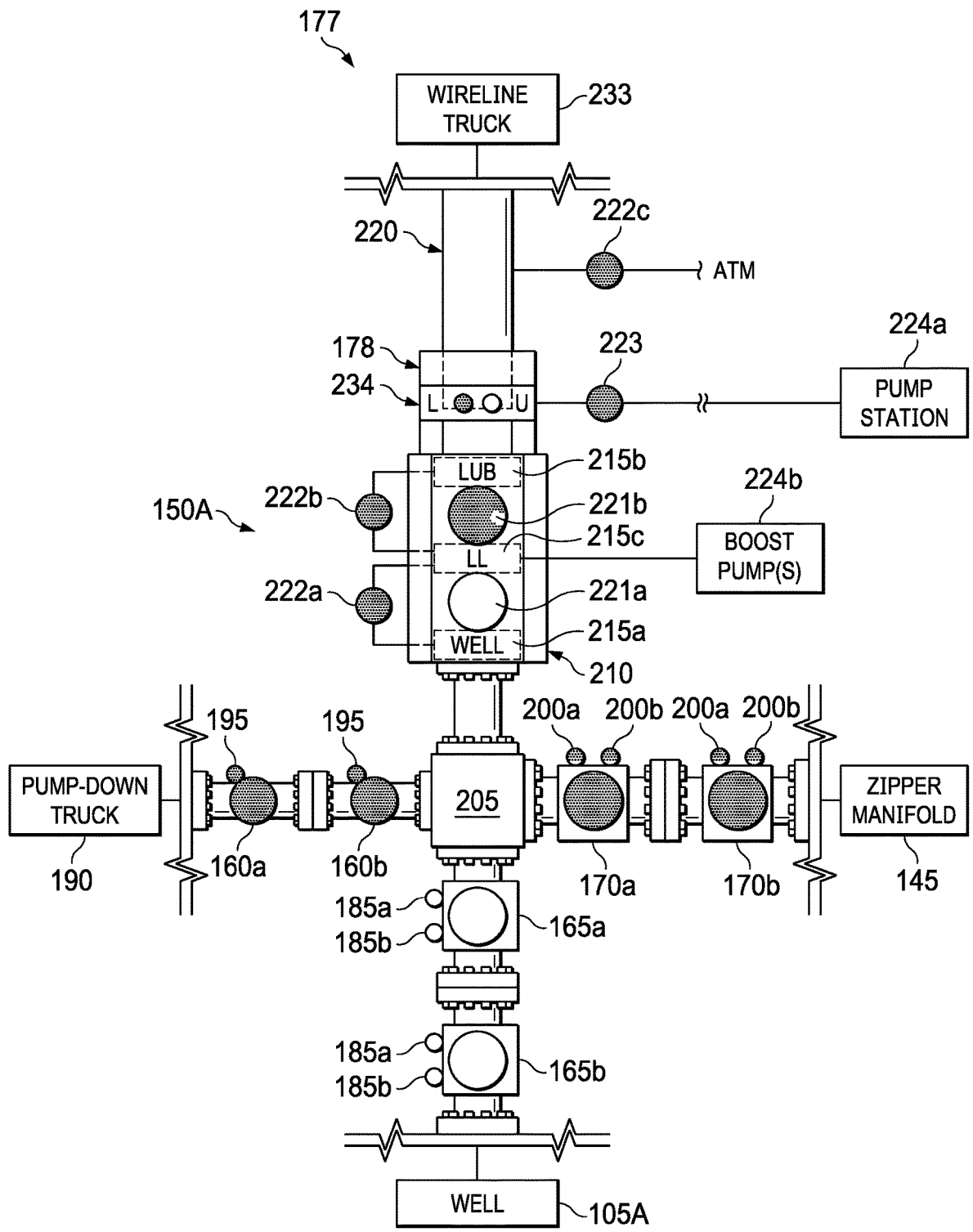
FIG. 7A schematically illustrates execution of one or more sub-step(s) of the third step of the method illustrated in FIG. 1B, according to one or more embodiments.
Figure 7B:
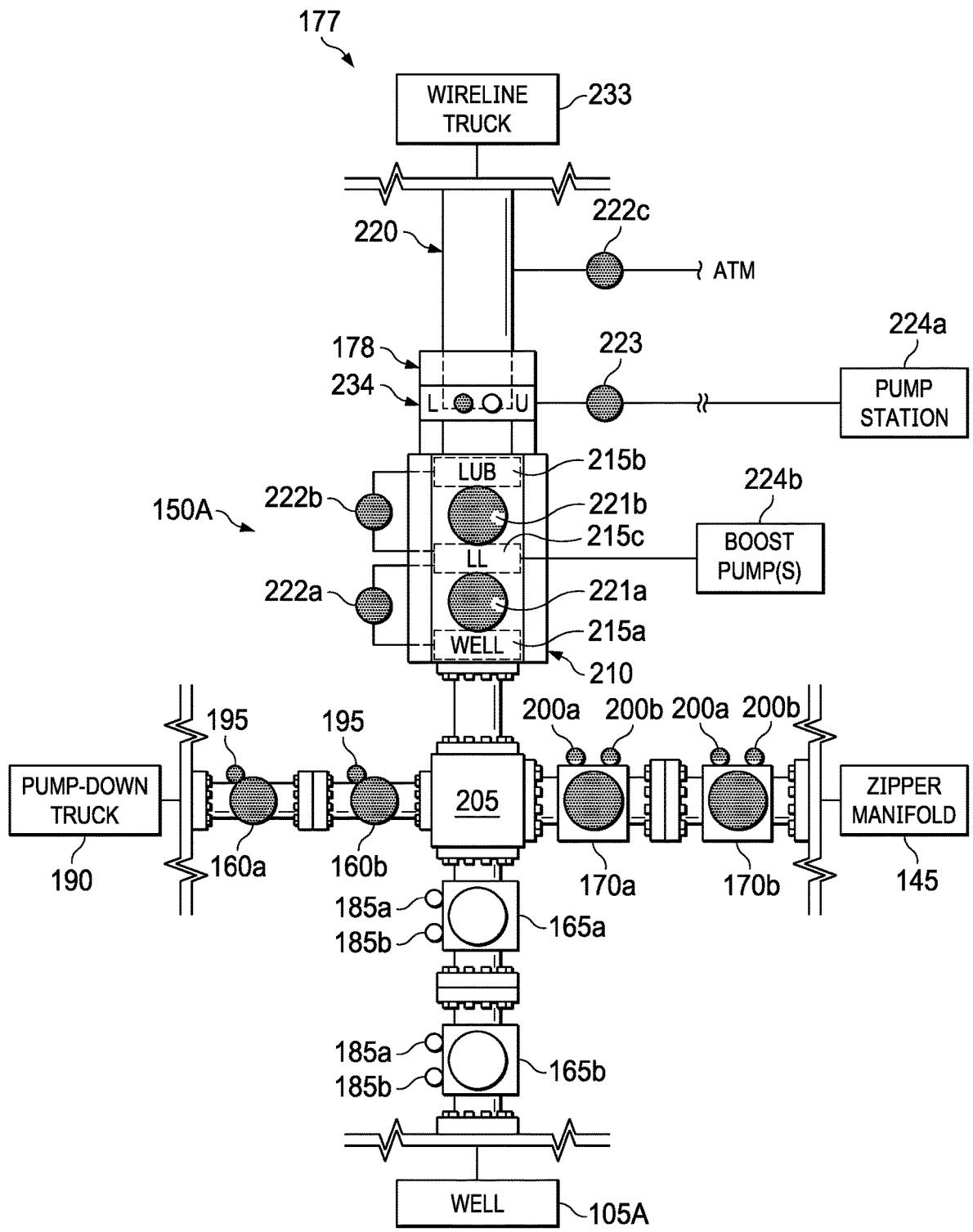
FIG. 7B schematically illustrates execution of one or more additional sub-step(s) of the third step of the method illustrated in FIG. 1B, according to one or more embodiments.
Figure 7C:
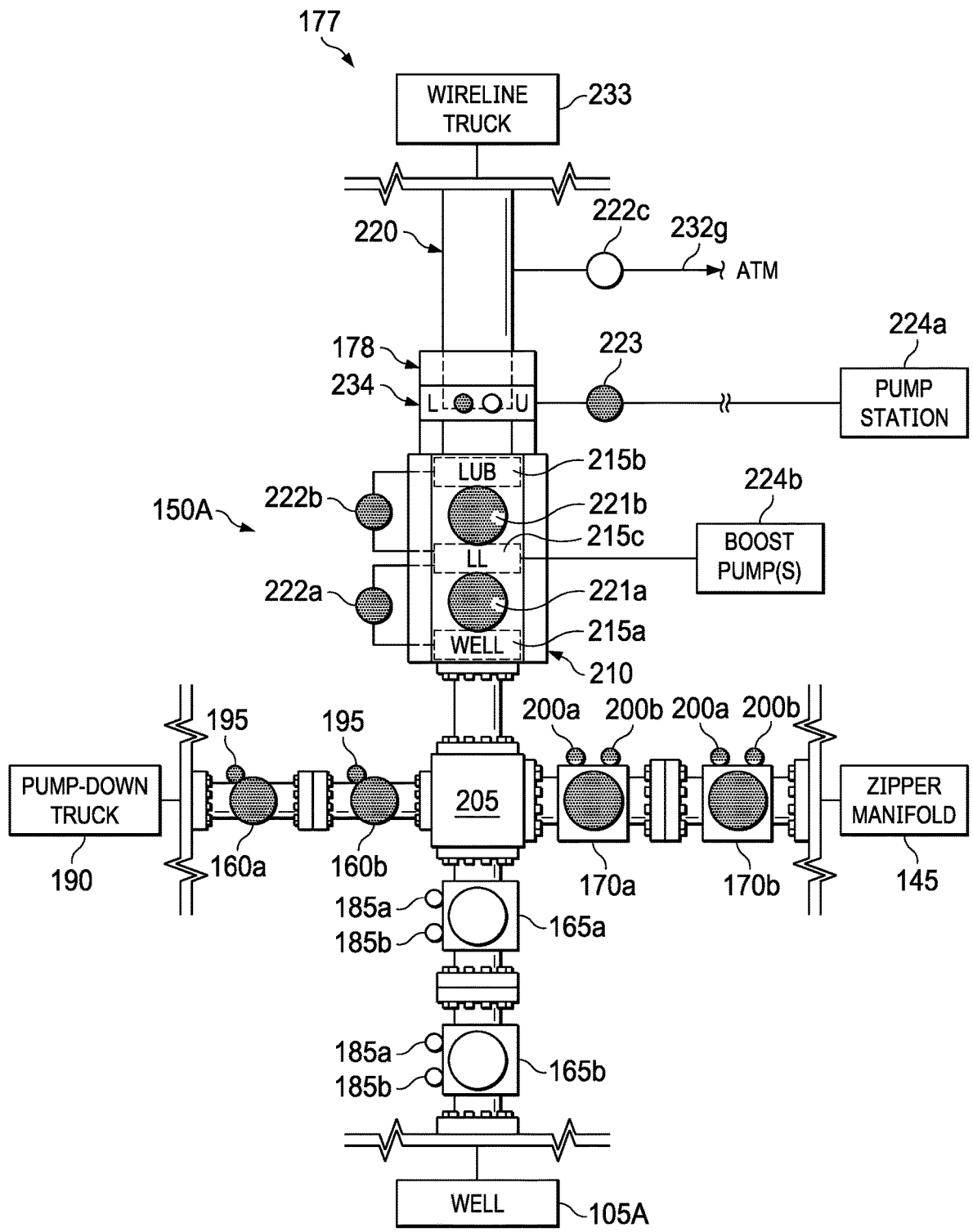
FIG. 7C schematically illustrates execution of one or more additional sub-step(s) of the third step of the method illustrated in FIG. 1B, according to one or more embodiments.
Figure 7D:
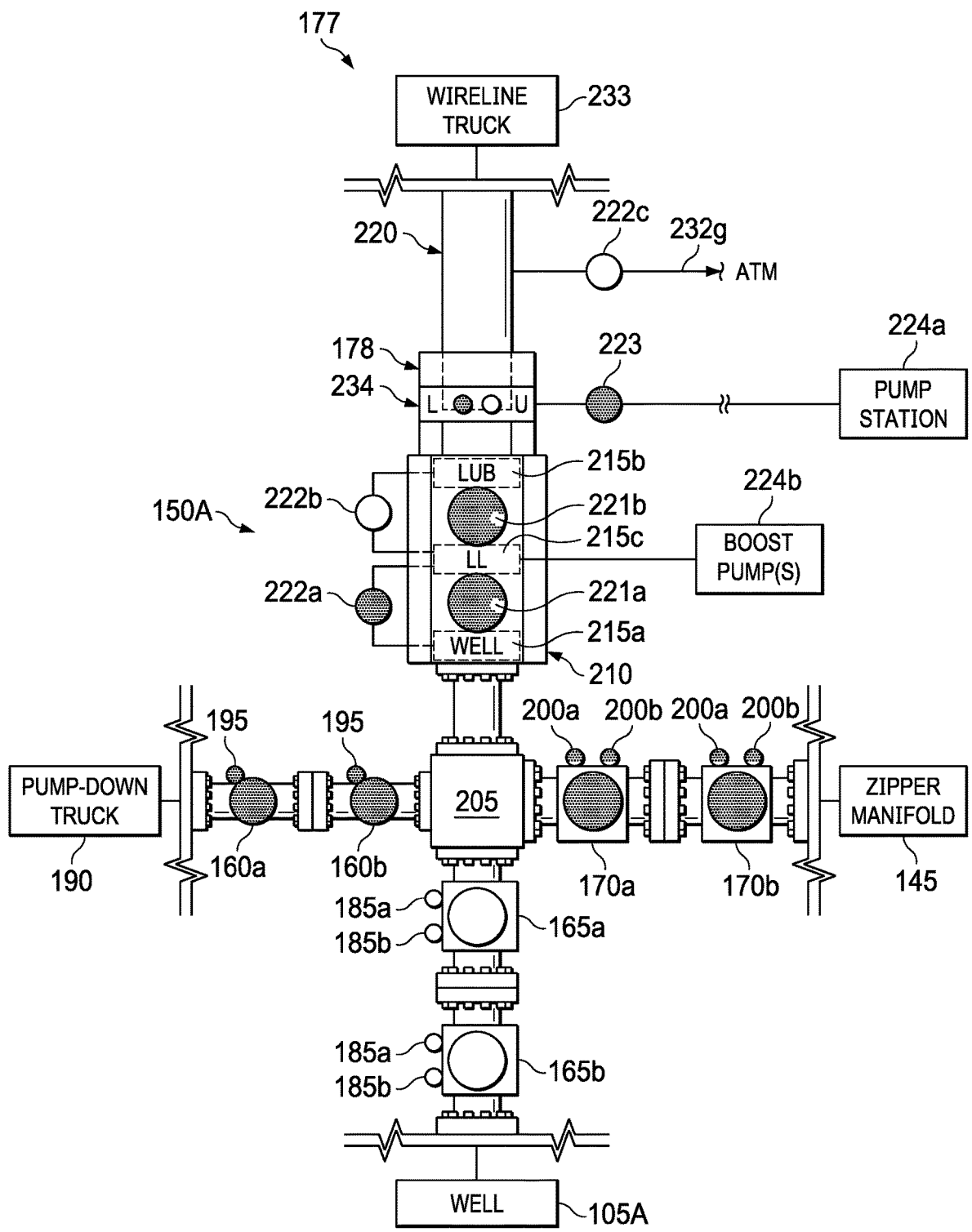
FIG. 7D schematically illustrates execution of one or more additional sub-step(s) of the third step of the method illustrated in FIG. 1B, according to one or more embodiments.
Figure 7E:
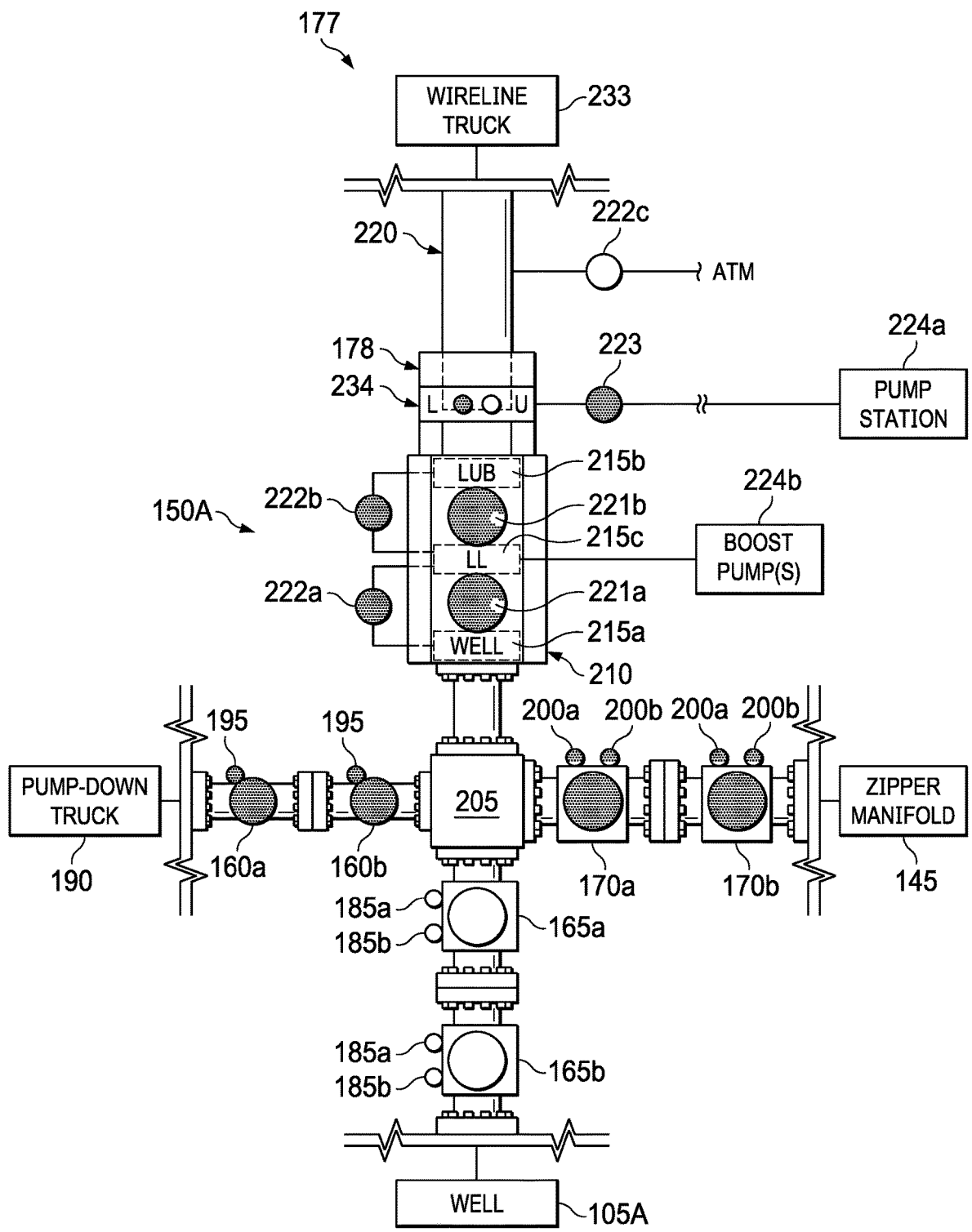
FIG. 7E schematically illustrates execution of one or more additional sub-step(s) of the third step of the method illustrated in FIG. 1B, according to one or more embodiments.

At the sub-step 236b, once the bump up of the retrieved spent perforating gun(s) within the lubricator 220 is determined and/or confirmed, the flow control device 221b is closed, as shown in FIGS. 6 and 7A. At the sub-step 236c, the flow control device 221a is closed, as shown in FIGS. 6 and 7B. At the sub-step 236d, the EQ valve 222c is opened, as shown in FIGS. 6 and 7C, to bleed down a fluid pressure in the lubricator 220 (indicated by arrow 232g in FIG. 7C). At the sub-step 236e, the EQ valve 222b is opened, as shown in FIGS. 6 and 7D. At the sub-step 236f, the lubricator 220 is checked to determine whether the fluid pressure in the lubricator 220 has dropped (or "bled down") to below a threshold value (e.g., a bleed PSI limit), as shown in FIG. 6. At the sub-step 236g, once it has been determined that the fluid pressure in the lubricator 220 has dropped to below the threshold value, the EQ valve 222b is closed, as shown in FIGS. 6 and 7E.

Figure 7F:
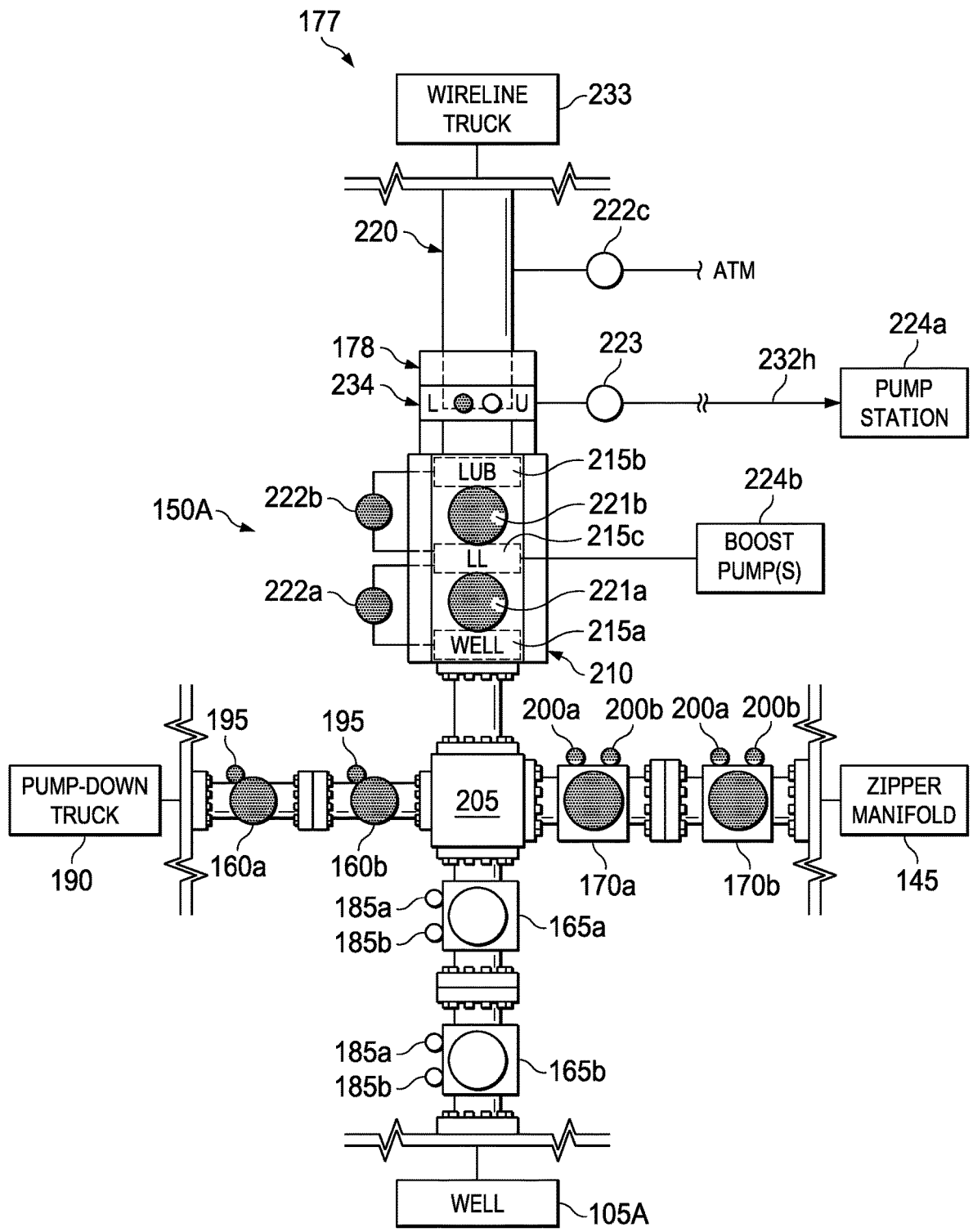
FIG. 7F schematically illustrates execution of one or more additional sub-step(s) of the third step of the method illustrated in FIG. 1B, according to one or more embodiments.
Figure 7G:
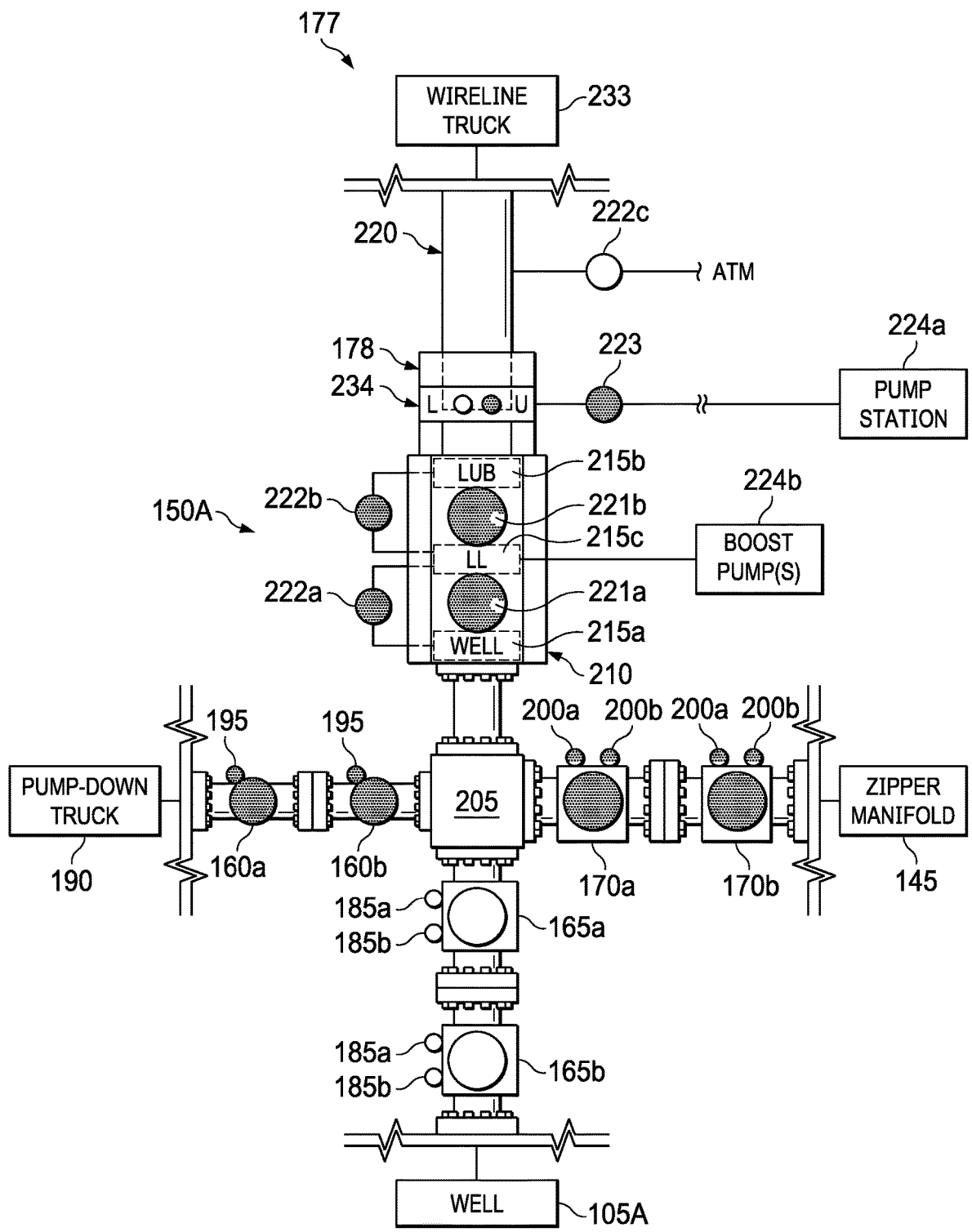
FIG. 7G schematically illustrates execution of one or more additional sub-step(s) of the third step of the method illustrated in FIG. 1B, according to one or more embodiments.
Figure 7H:
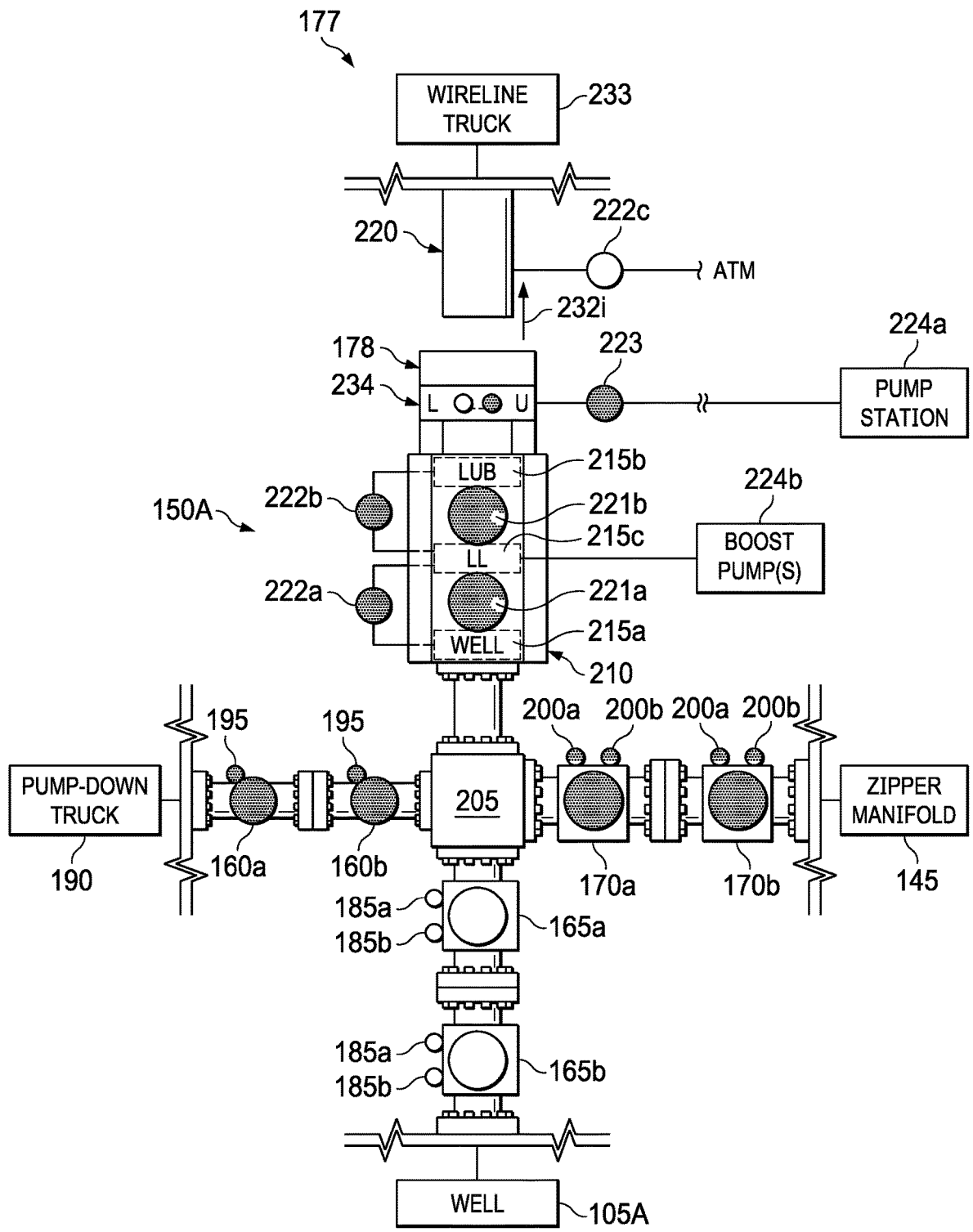
FIG. 7H schematically illustrates execution of one or more additional sub-step(s) of the third step of the method illustrated in FIG. 1B, according to one or more embodiments.
Figure 7I:
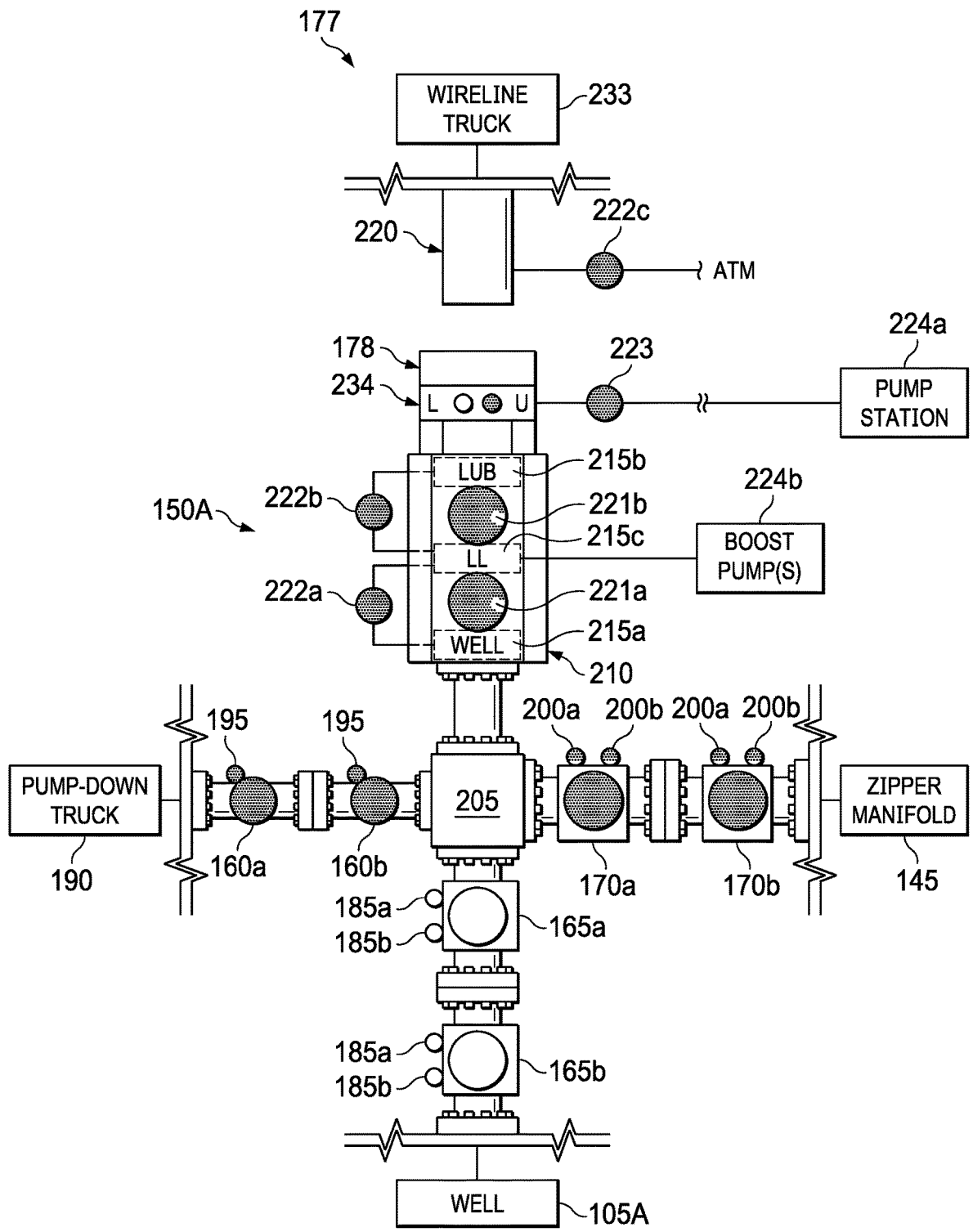
FIG. 7I schematically illustrates execution of one or more additional sub-step(s) of the third step of the method illustrated in FIG. 1B, according to one or more embodiments.

At the sub-step 236h, the drain 223 is opened, as shown in FIGS. 6 and 7F. At the sub-step 236i, the auto-drain pump of the pump station 224a is turned on to drain fluid from the lubricator 220 via the drain 223, as shown in FIGS. 6 and 7F (indicated by arrow 232h in FIG. 7F). At the sub-step 236j, the auto-drain pump is allowed to finish auto-draining the lubricator 220 before the drain 223 is closed, as shown in FIGS. 6 and 7G. At the sub-step 236k, the latch 234 is unlatched, as shown in FIGS. 6 and 7G. At the sub-step 236l, the lubricator 220 is removed, as shown in FIGS. 6 and 7H (indicated by arrow 232i in FIG. 7H). At the sub-step 236m, the EQ valve 222c is closed, as shown in FIG. 7I. Finally, at the sub-step 236n, an object drop (e.g., from the launcher 178) and/or a pressure test is/are enabled, as shown in FIG. 6. More particularly, once the sub-steps 236a-n are executed, the well 105A is ready for execution of the step 240, namely isolating a stage of the well 105A in preparation for a hydraulic fracturing operation. The step 240 will be described in further detail below (in connection with FIGS. 8 and 9A through 9G) as executed on the frac leg 150B to isolate a stage of the well 105B; however, the description below also applies to the execution of the step 240 on the frac leg 150A to isolate a stage of the well 105A.

Figure 8:
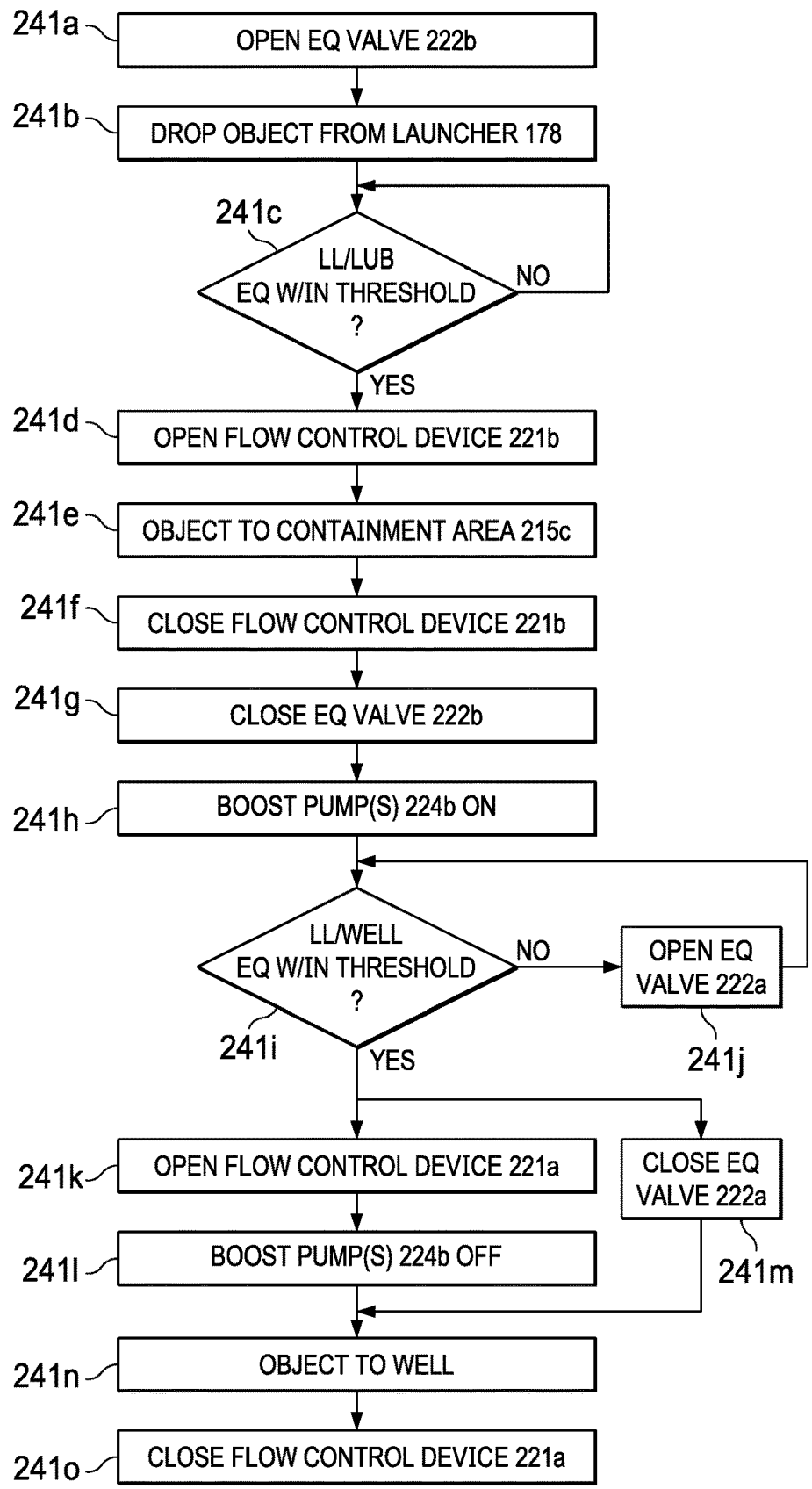
FIG. 8 is a flow diagram illustrating various sub-steps of a fourth step of the method illustrated in FIG. 1B, which fourth step is or includes isolating a stage of a second well in preparation for a hydraulic fracturing operation, according to one or more embodiments.
Figure 9A:
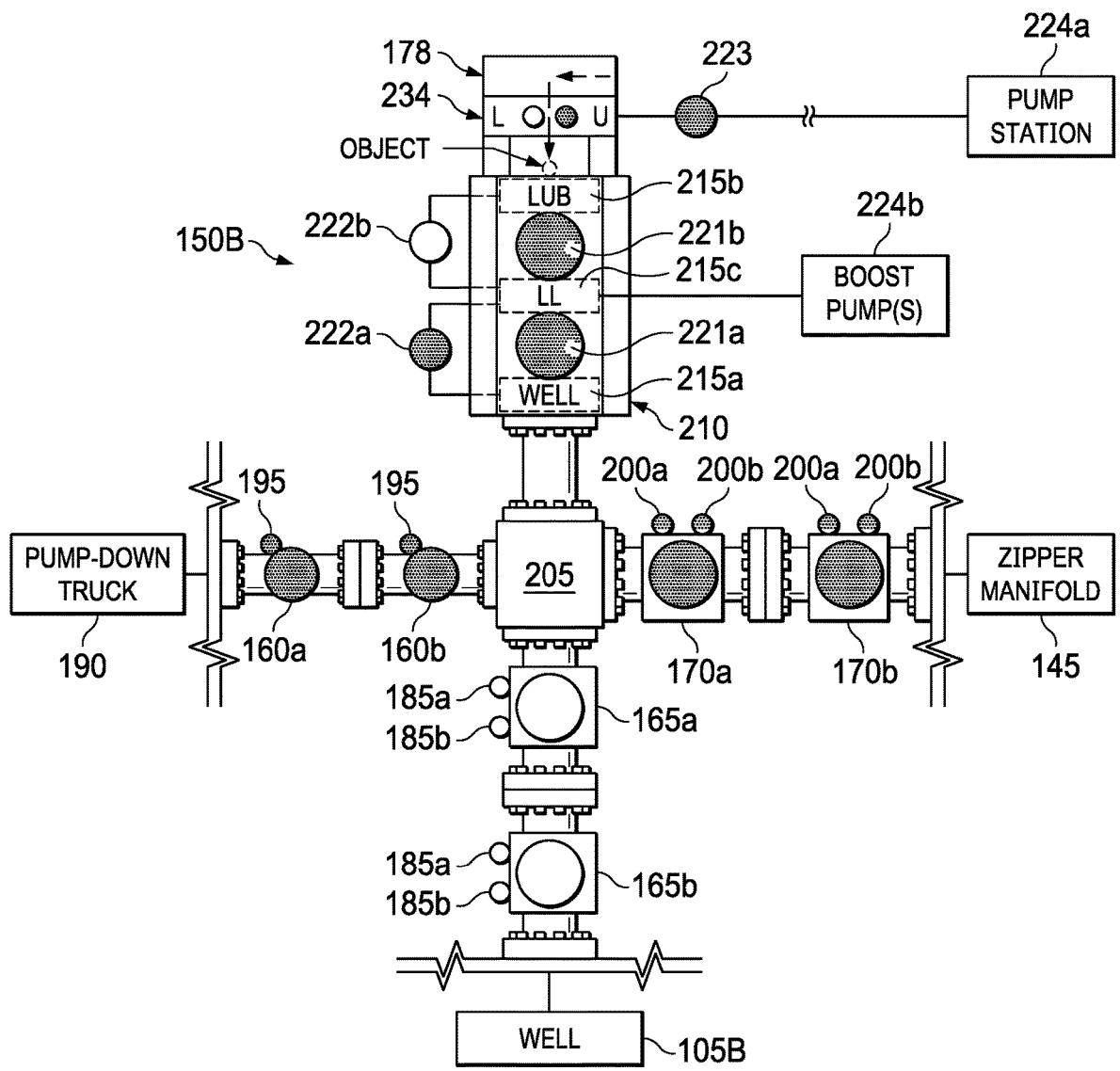
FIG. 9A schematically illustrates execution of one or more sub-step(s) of the fourth step of the method illustrated in FIG. 1B, according to one or more embodiments.
Figure 9B:
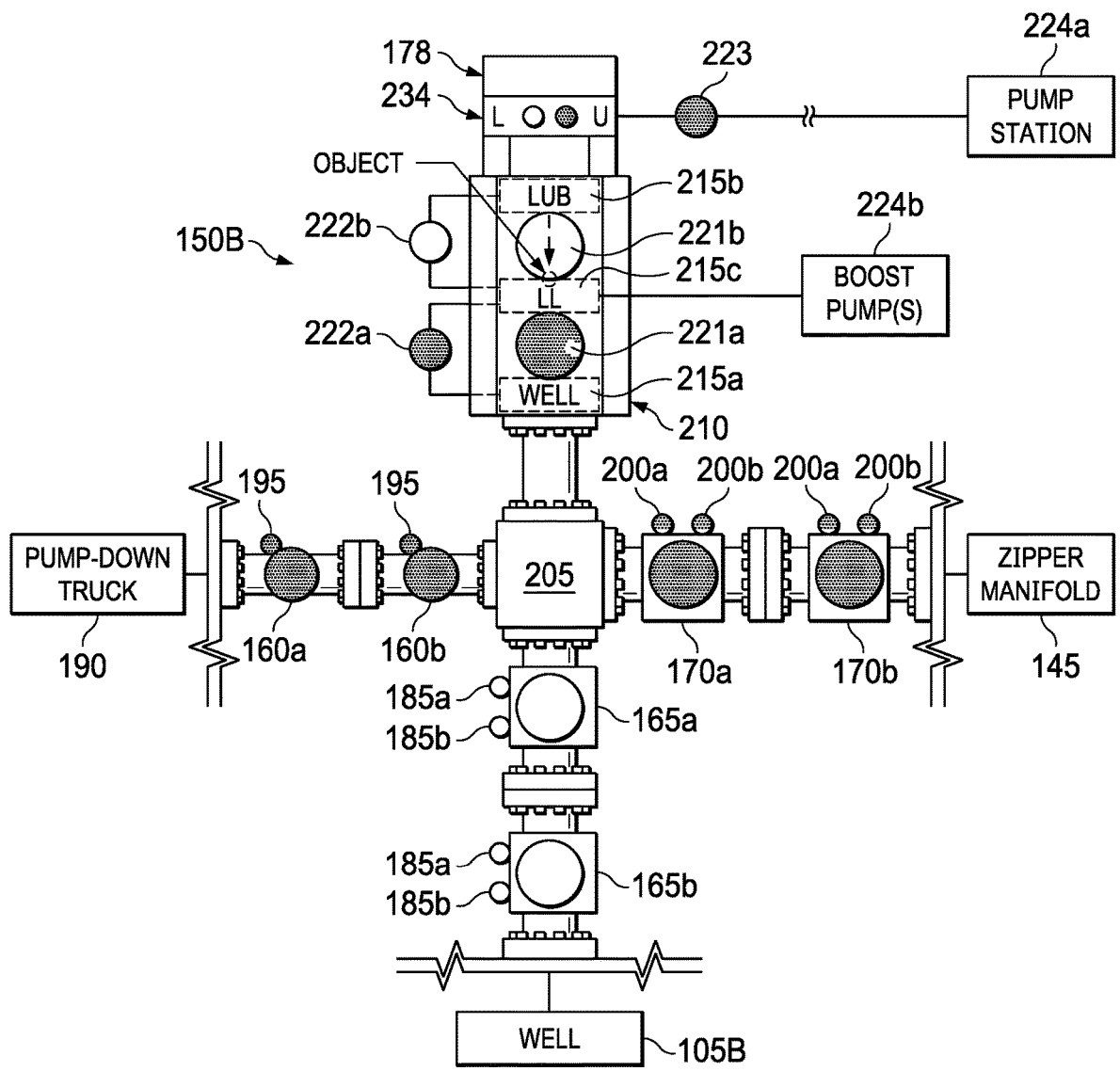
FIG. 9B schematically illustrates execution of one or more additional sub-step(s) of the fourth step of the method illustrated in FIG. 1B, according to one or more embodiments.
Figure 9C:
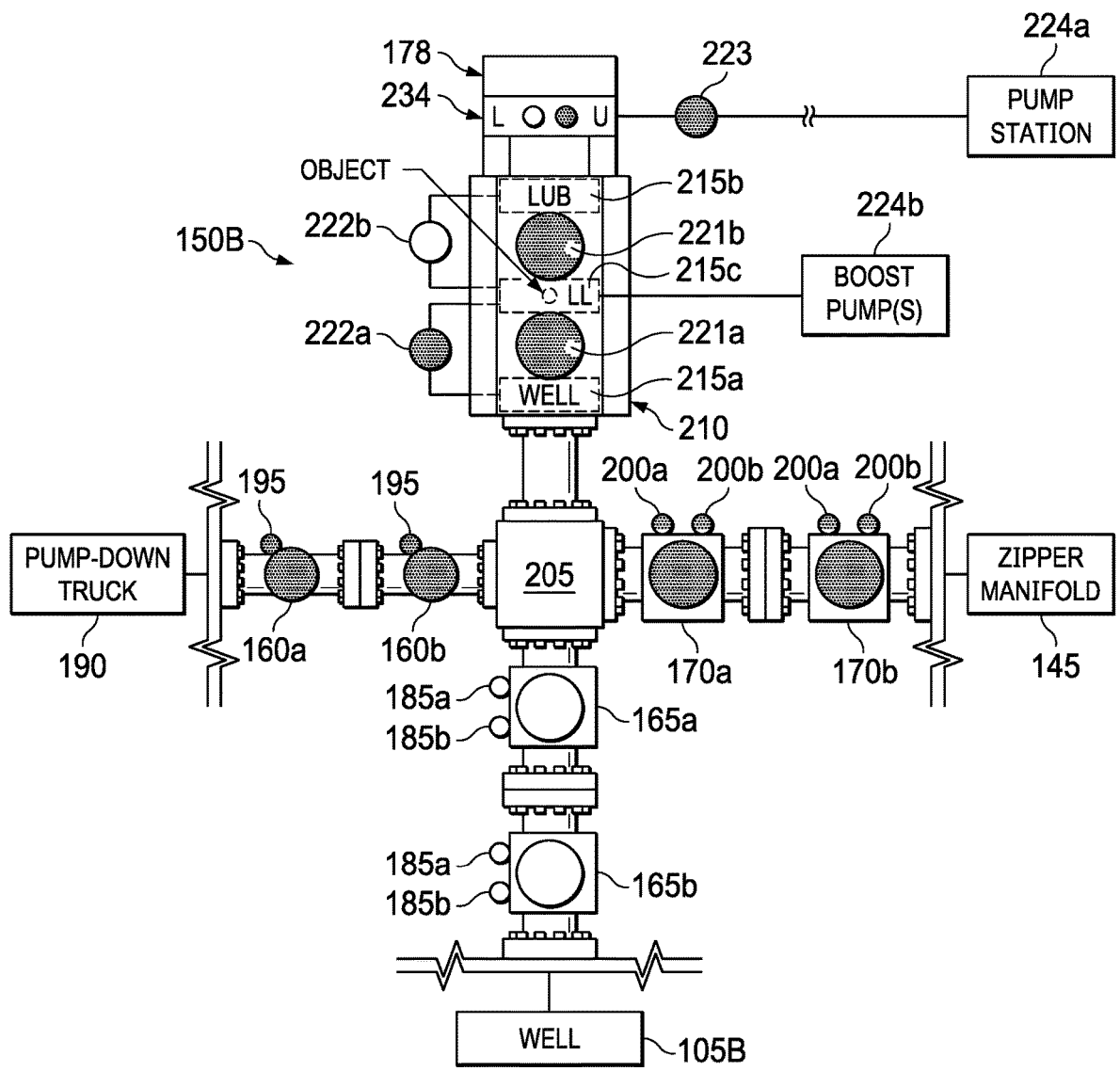
FIG. 9C schematically illustrates execution of one or more additional sub-step(s) of the fourth step of the method illustrated in FIG. 1B, according to one or more embodiments.
Figure 9D:
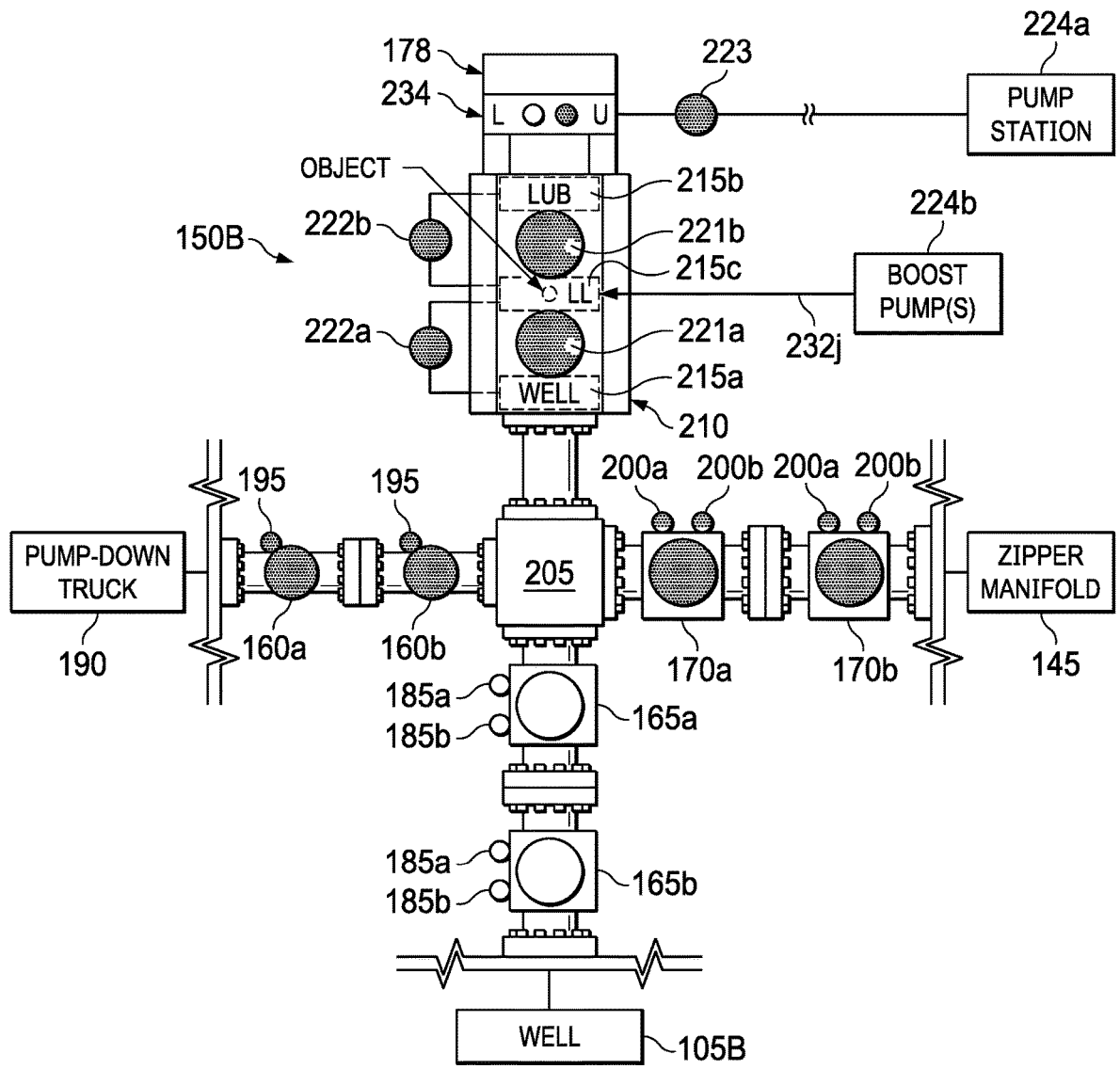
FIG. 9D schematically illustrates execution of one or more additional sub-step(s) of the fourth step of the method illustrated in FIG. 1B, according to one or more embodiments.

Referring to FIGS. 8 and 9A through 9G, in an embodiment, various sub-steps 241a-o of the step 240 of the method 175 illustrated in FIG. 1B are shown in detail, which step 240 is or includes isolating a stage of the well 105B in preparation for a hydraulic fracturing operation. In one or more embodiments, the step 240 that is or includes isolating the stage of the well 105B includes or is part of a hydraulic fracturing operation. At the sub-step 241a, the EQ valve 222b is opened to facilitate pressure equalization between the containment areas 215b and 215c, as shown in FIGS. 8 and 9A. At the sub-step 241b, an object is dropped from the launcher 178, as shown in FIGS. 8 and 9A. At the sub-step 241c, respective fluid pressures within the containment areas 215b and 215c are checked to determine whether the containment areas 215b and 215c have been pressure equalized to within a threshold amount, as shown in FIG. 8. At the sub-step 241d, once it is determined that the containment areas 215b and 215c have been pressure equalized to within the threshold amount, the flow control device 221b is opened, as shown in FIGS. 8 and 9B. At the sub-step 241e, the object passes into the containment area 215c, as shown in FIGS. 8 and 9C. At the sub-step 241f, the flow control device 221b is closed, as shown in FIGS. 8 and 9C. At the sub-step 241g, the EQ valve 222b is closed, as shown in FIGS. 8 and 9D.

Figure 9E:
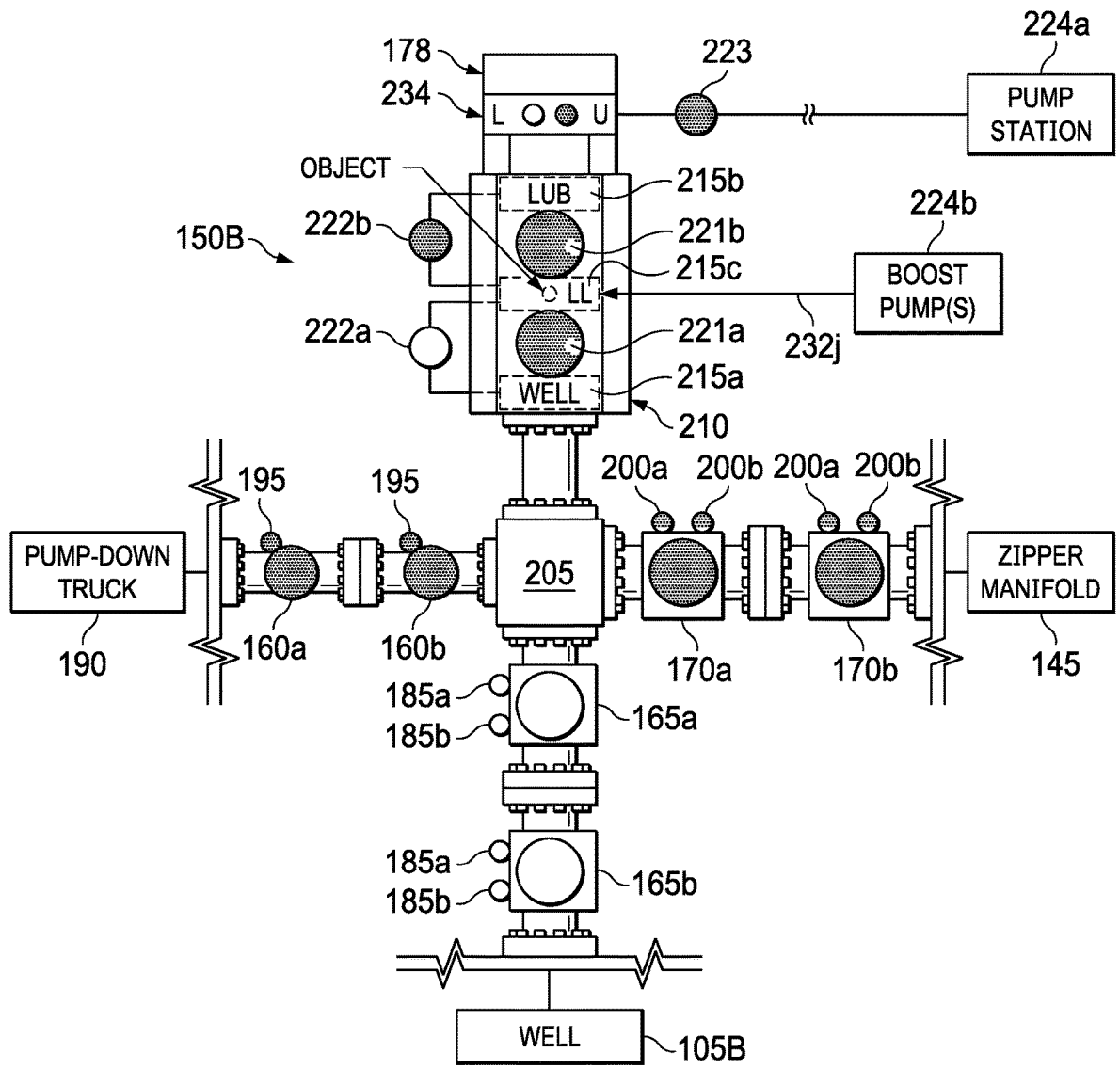
FIG. 9E schematically illustrates execution of one or more additional sub-step(s) of the fourth step of the method illustrated in FIG. 1B, according to one or more embodiments.

At the sub-step 241h, the boost pump(s) 224b is/are turned on to increase a fluid pressure in the containment area 215c, thereby aiding in pressure equalization between the containment areas 215a and 215c, as shown in FIGS. 8 and 9D (indicated by arrow 232j in FIG. 9D). At the sub-step 241i, respective fluid pressures within the containment areas 215a and 215c are compared to determine whether the fluid pressure in the containment area 215c has been equalized to within a threshold amount of the fluid pressure in the well 105B. If it is determined that the fluid pressure in the containment area 215c has not been equalized to within the threshold amount of the fluid pressure in the well 105B, the EQ valve 222a is opened at the sub-step 241j to further encourage such pressure equalization between said containment area 215c and the well 105B, as shown in FIGS. 8 and 9E. Alternatively, the order in which the sub-steps 241h and 241j are executed may be reversed, or one of the sub-steps 241h and 241j may be omitted altogether.

Figure 9F:
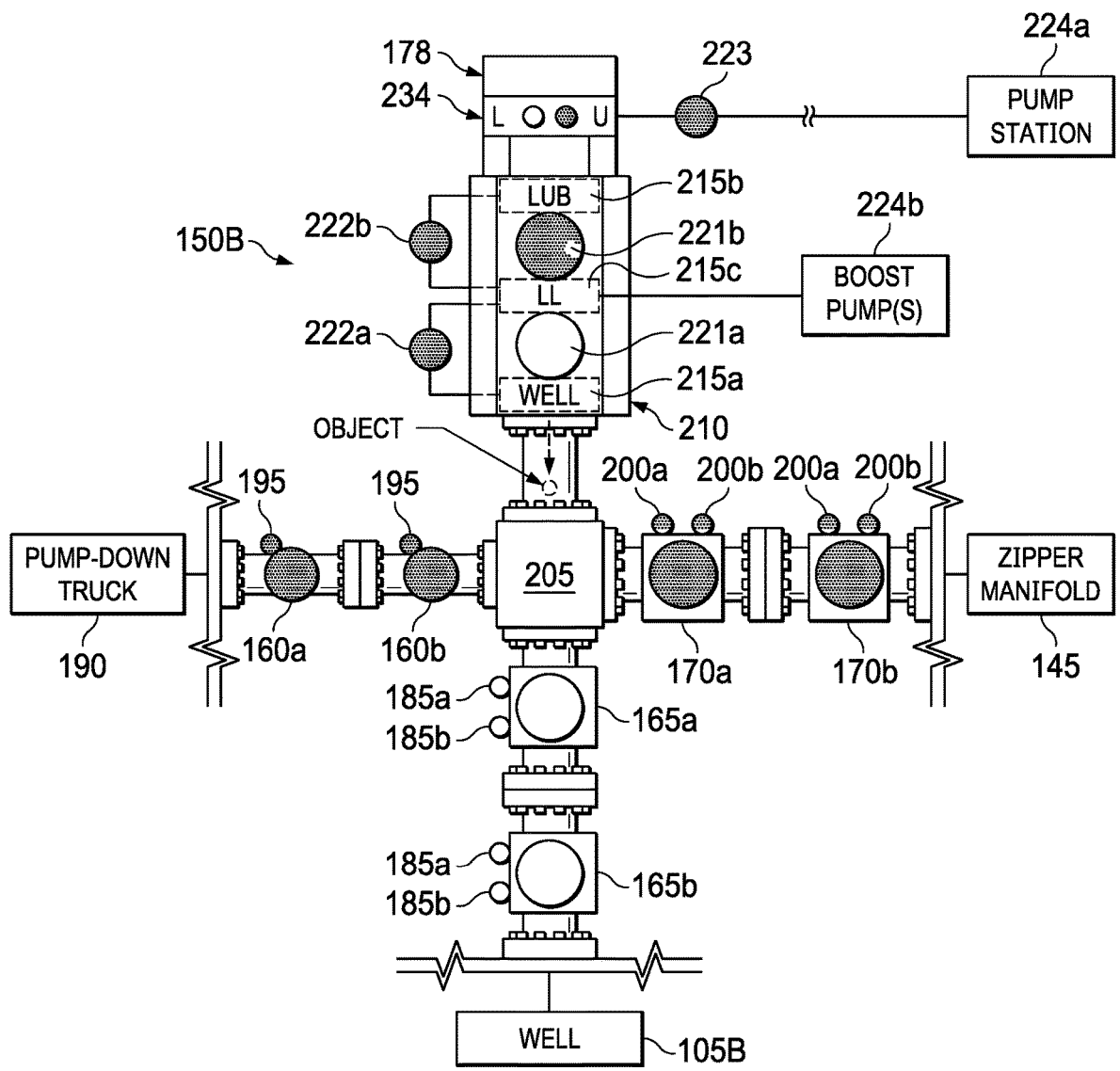
FIG. 9F schematically illustrates execution of one or more additional sub-step(s) of the fourth step of the method illustrated in FIG. 1B, according to one or more embodiments.

At the sub-step 241k, once it is determined that the fluid pressure in the containment area 215c has been equalized to within the threshold amount of the fluid pressure in the well 105B, the flow control device 221a is opened, as shown in FIGS. 8 and 9F. At the sub-step 241l, the boost pump(s) 224b is/are turned off, as shown in FIGS. 8 and 9F. At the sub-step 241m, the EQ valve 222a is closed, as shown in FIGS. 8 and 9F. However, in those embodiments in which the sub-step 241j of opening the EQ valve 222a is omitted, the sub-step 241m of closing the EQ valve 222a is also omitted. Additionally, the sub-step 241m may be executed to close the EQ valve 222a at any time before, during, or after, execution of the sub-steps 241k or 241l. At the sub-step

Figure 9G:
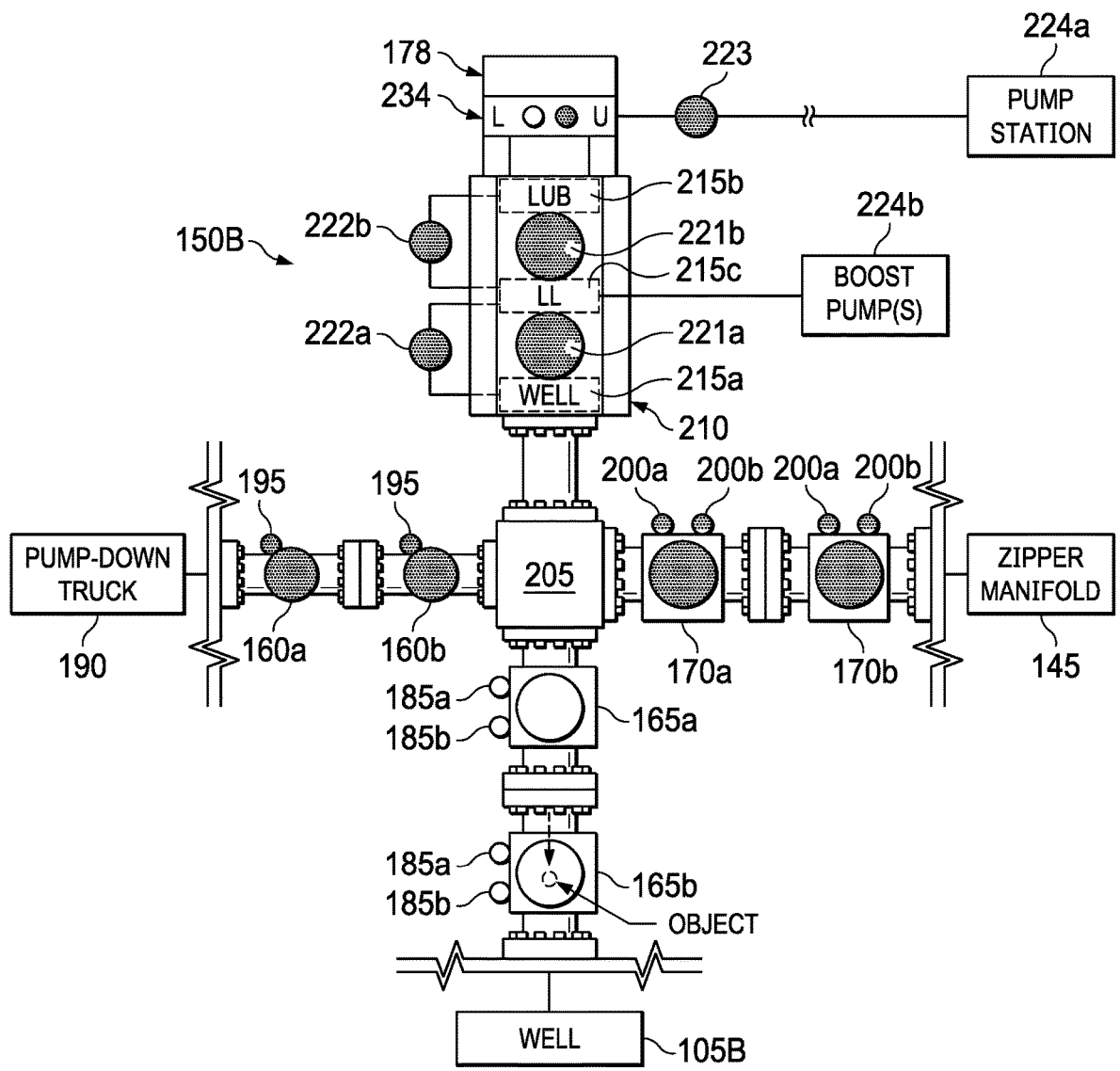
FIG. 9G schematically illustrates execution of one or more additional sub-step(s) of the fourth step of the method illustrated in FIG. 1B, according to one or more embodiments.

241n, the object is permitted passage to the well 105B, as shown in FIGS. 8 and 9G. Finally, at the sub-step 241o, the flow control device 221a is closed, as shown in FIGS. 8 and 9G. Once the sub-steps 241a-o are executed, the well 105B is ready for execution of the step 245, namely detecting or otherwise determining that a fracturing stage of the well 105D has ended, as will be described in detail below in connection with FIGS. 10 and 11.

Figure 10:
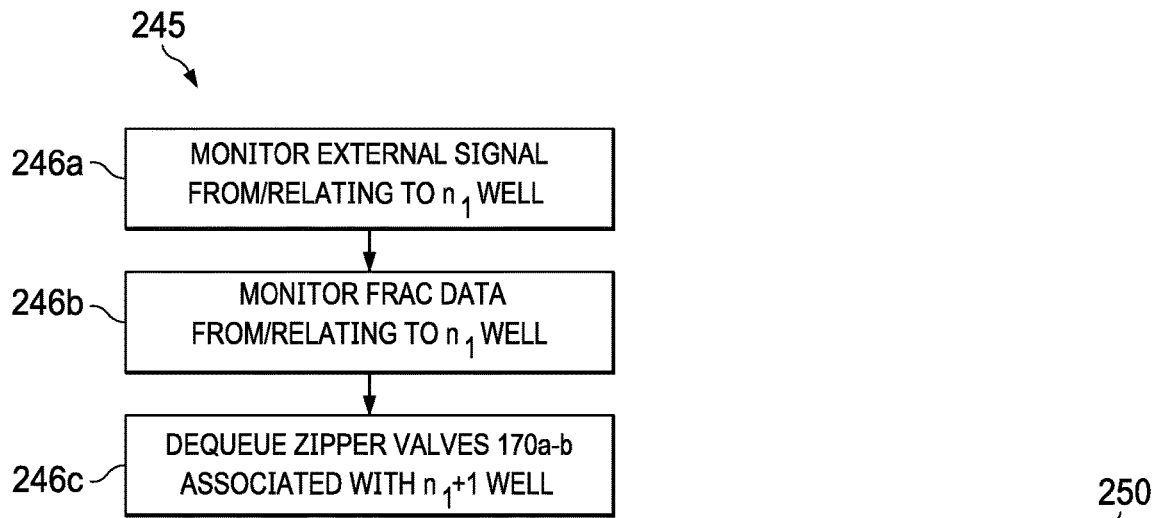
FIG. 10 is a flow diagram illustrating various sub-steps of a fifth step of the method illustrated in FIG. 1B, which fifth step is or includes detecting or otherwise determining that a fracturing stage of a third well has ended, according to one or more embodiments.
Figure 11:
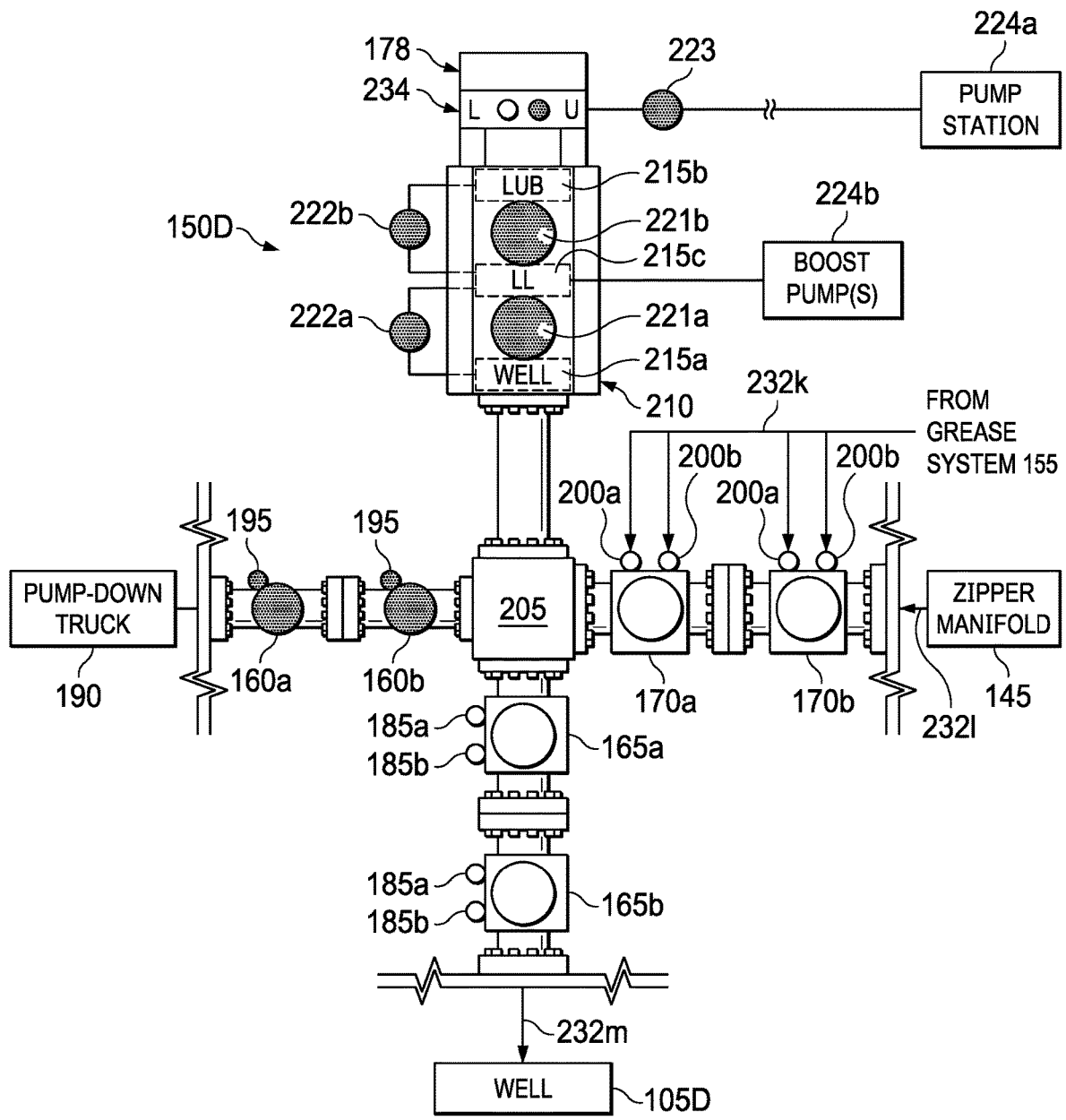
FIG. 11 schematically illustrates execution of one or more subs-step(s) of the fifth step of the method illustrated in FIG. 1B, according to one or more embodiments.

Referring to FIGS. 10 and 11, in an embodiment, various sub-steps 246a-c of the step 245 of the method 175 illustrated in FIG. 1B are shown in detail, which step 245 is or includes detecting or otherwise determining that a fracturing stage of the well 105D has ended. At the sub-step 246a, the $n_1$ well (e.g., well 105D) is monitored for an external signal indicating the fracturing stage has ended, as shown in FIG. 10. At the sub-step 246b, the $n_1$ well's frac data is monitored to determine whether the fracturing stage has ended, as shown in FIG. 10. Finally, at the sub-step 246c, the zipper valves 170a-b associated with the $n_1+1$ well (e.g., well 105B) are dequeued and compared against the frac order (if available). During execution of the sub-steps 246a-c: grease from the grease system 155 is communicated to the corresponding GPs 200a-b of the zipper valves 170a-b, respectively, as shown in FIG. 11 (indicated by arrows 232k in FIG. 5B); and hydraulic fracturing fluid is communicated from the zipper manifold 145 to the well 105D, as shown in FIG. 11 (indicated by arrows 232l and 232m in FIG. 11).

Figure 12:
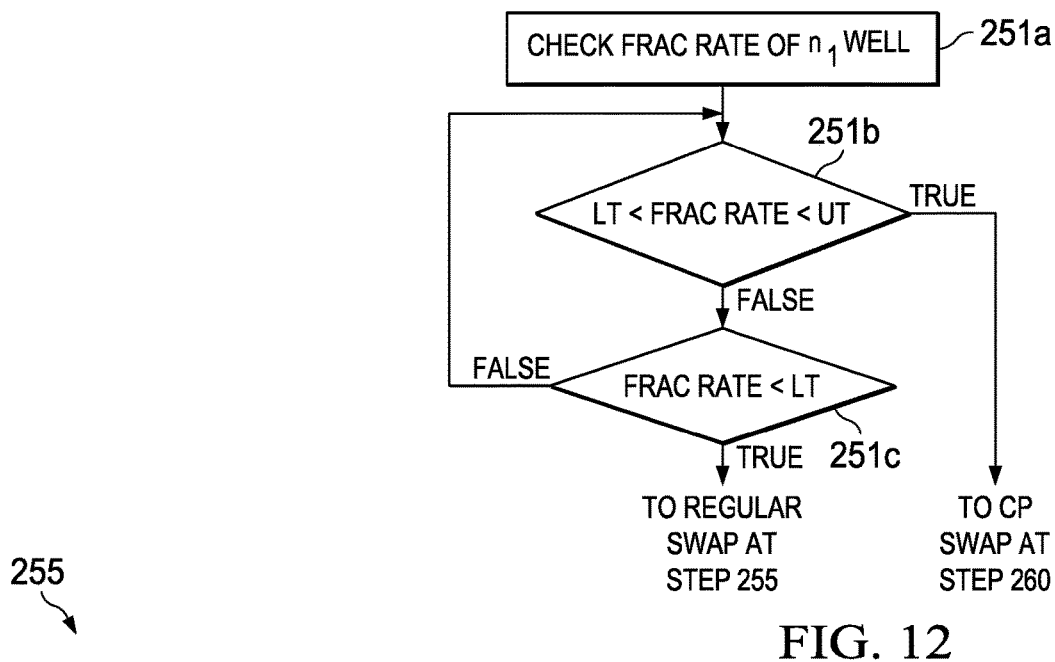
FIG. 12 is a flow diagram illustrating various sub-steps of a sixth step of the method illustrated in FIG. 1B, which sixth step is or includes determining whether to permit a regular swap or a continuous pumping swap (or "CP swap"), according to one or more embodiments.

Referring to FIG. 12, in an embodiment, various sub-steps 251a-c of the step 250 of the method 175 illustrated in FIG. 1B are shown in detail, which step 250 is or includes determining whether to permit a regular swap or a CP swap from hydraulically fracturing (at a step 262) the well 105D to hydraulically fracturing (at the step 262) the well 105B, by, for example: checking an idle rate of the hydraulic fracturing system 100 at the sub-step 251a; and detecting or otherwise determining that an idle rate of the hydraulic fracturing system 100 is below an upper threshold and above a lower threshold at the sub-step 251b, or, at the sub-step 251c, detecting or otherwise determining that the idle rate of the hydraulic fracturing system 100 is below the lower threshold. More particularly, as shown in FIG. 12: at the sub-step 251a, a frac rate of the $n_1$ well (e.g., well 105D) is checked; and, at the sub-step 251b, if the frac rate of the $n_1$ well is below the upper threshold rate (e.g., 10 bbl) and above the lower threshold rate (e.g., 0 bbl) for a threshold amount of time (e.g., 10 s), a CP swap from hydraulically fracturing the $n_1$ well to hydraulically fracturing the $n_1+1$ well is permitted at step 260, but, at the sub-step 251c, if the frac rate of the $n_1$ well is below the lower threshold rate for a threshold amount of time, only a regular swap from hydraulically fracturing the $n_1$ well to hydraulically fracturing the $n_1+1$ well is permitted at step 255.

Figure 13:
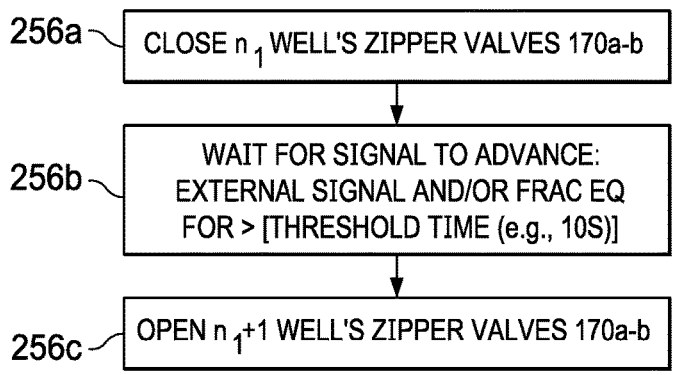
FIG. 13 is a flow diagram illustrating various sub-steps of a seventh step of the method illustrated in FIG. 1B, which seventh step is or includes the regular swap from hydraulically fracturing the third well to hydraulically fracturing the second well, according to one or more embodiments.
Figure 14A:
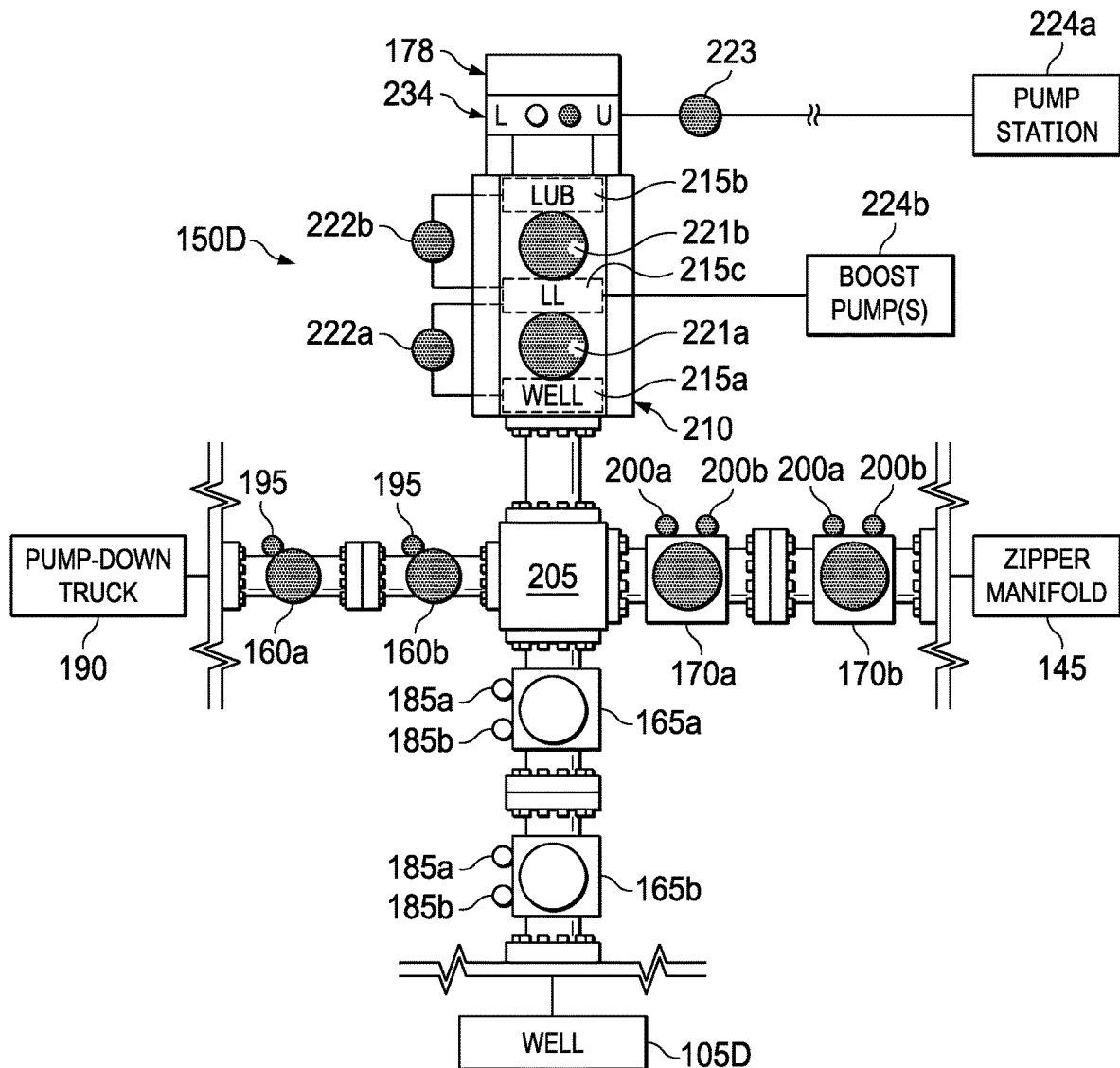
FIG. 14A schematically illustrates execution of one or more sub-step(s) of the seventh step of the method illustrated in FIG. 1B, according to one or more embodiments.
Figure 14B:
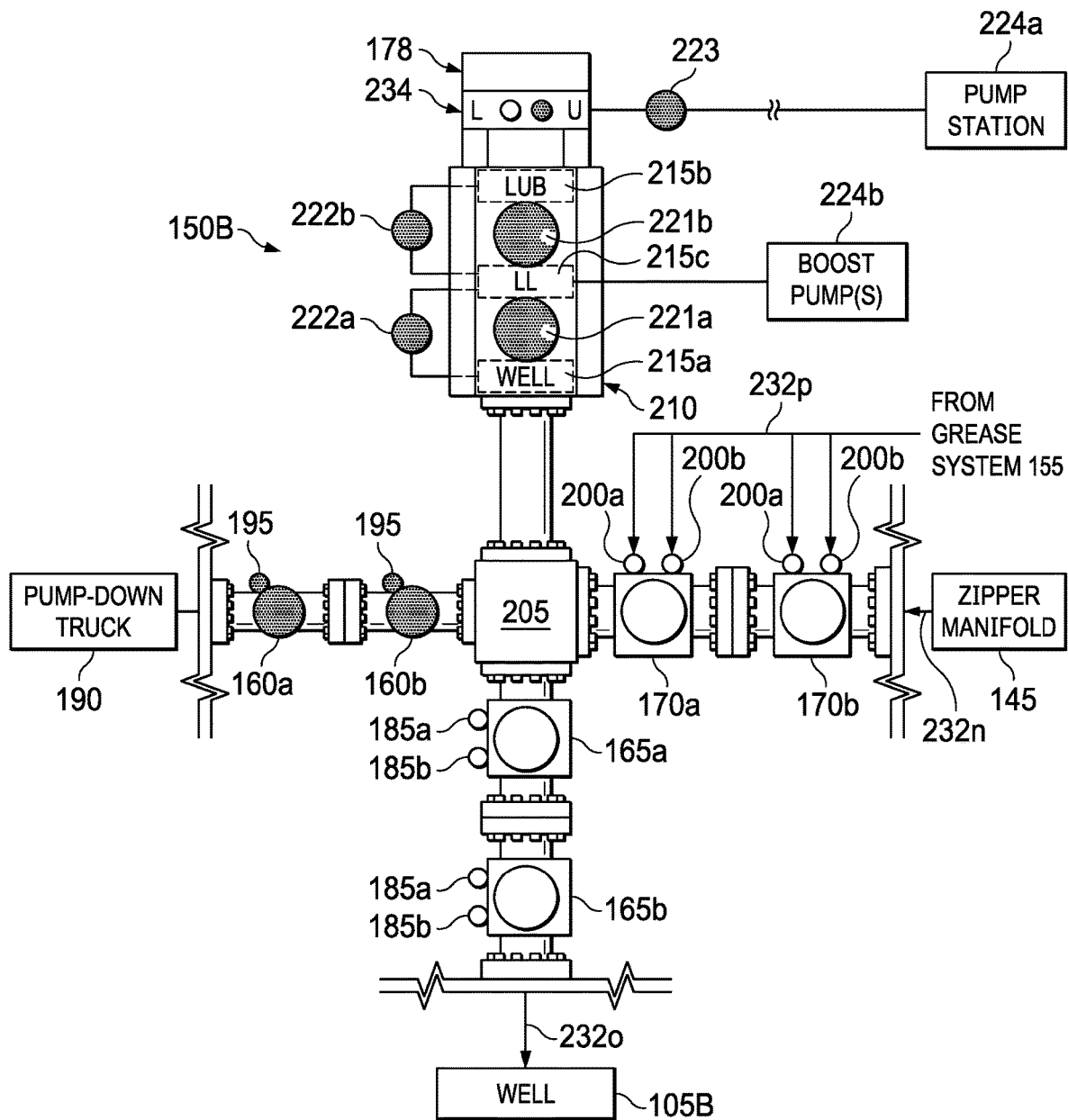
FIG. 14B schematically illustrates execution of one or more additional sub-step(s) of the seventh step of the method illustrated in FIG. 1B, according to one or more embodiments.

Referring to FIGS. 13 and 14A through 14B, in an embodiment, various sub-steps 256a-c of the step 255 of the method 175 illustrated in FIG. 1B are shown in detail, which step 255 is or includes executing the regular swap from hydraulically fracturing (at the step 262) the $n_1$ well (e.g., well 105D) to hydraulically fracturing (at the step 262) the $n_1+1$ well (e.g., well 105B). At the sub-step 256a, the $n_1$ well's (e.g., well 105D) zipper valves 170a-b are closed, and grease from the grease system 155 is withheld from the corresponding GPs 200a-b, as shown in FIGS. 13 and 14A. At the sub-step 256b, a signal to advance is received, as shown in FIG. 13. For example, a user input such as a screen click may be received at the sub-step 256b. In addition, or instead, an external signal, such as an external signal from the frac operator, may be received at the sub-step 256b. In addition, or instead, a signal to advance may be generated by detecting or otherwise determining that pressure equalization has been achieved to within a threshold amount between the hydraulic fracturing pressure in the zipper manifold 145 and the fluid pressure in the $n_1+1$ well (e.g., well 105B) for a threshold amount of time. At the sub-step 256c, the $n_1+1$ well's zipper valves 170a-b are opened, as shown in FIGS. 13 and 14B, so that hydraulic fracturing fluid is communicated from the zipper manifold 145 to the $n_1+1$ well (indicated by arrows 232n and 232o in FIG. 14B), and grease from the grease system 155 is communicated to the corresponding GPs 200a-b (indicated by arrow 232p in FIG. 14B).

Figure 15:
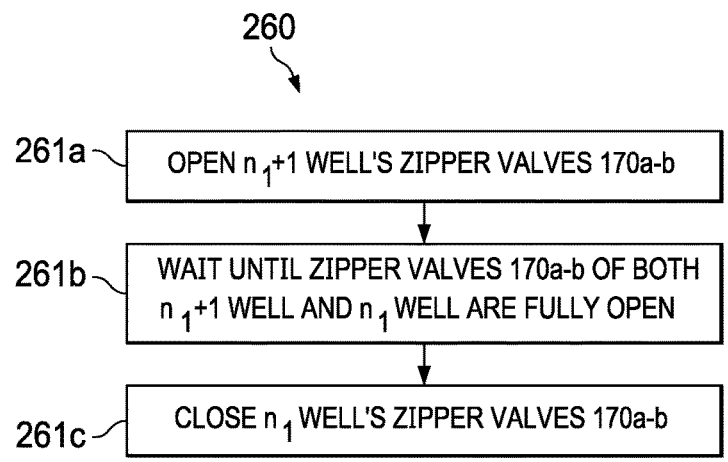
FIG. 15 is a flow diagram illustrating various sub-steps of an eighth step of the method illustrated in FIG. 1B, which eighth step is or includes the CP swap from hydraulically fracturing the third well to hydraulically fracturing the second well, according to one or more embodiments.
Figure 16D:
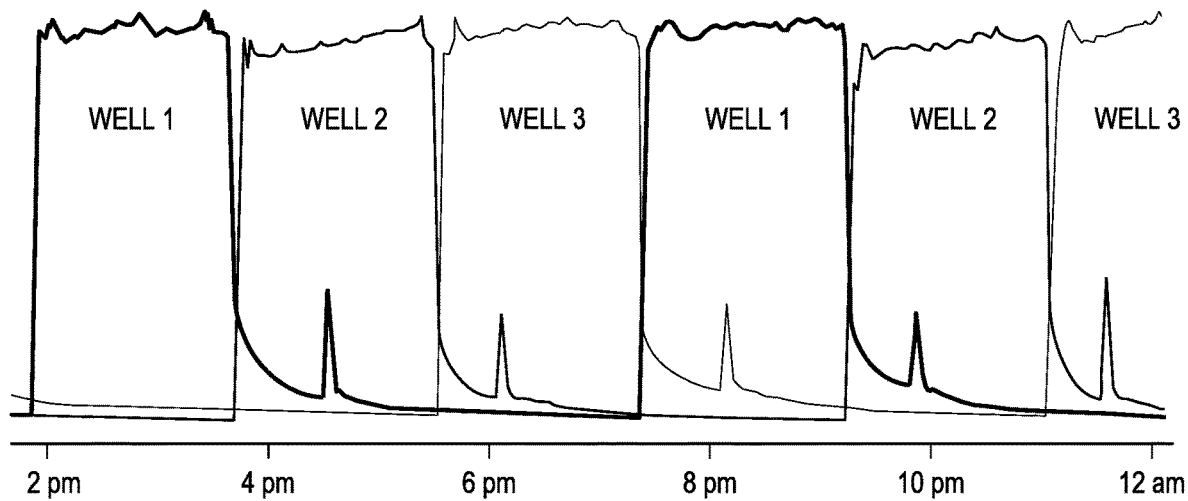
FIG. 16D is a chart illustrating execution of one or more of the various sub-steps, schematically illustrated in FIGS. 16A through 16C, of the eighth step of the method illustrated in FIG. 1B, according to one or more embodiments.
Figure 16A:
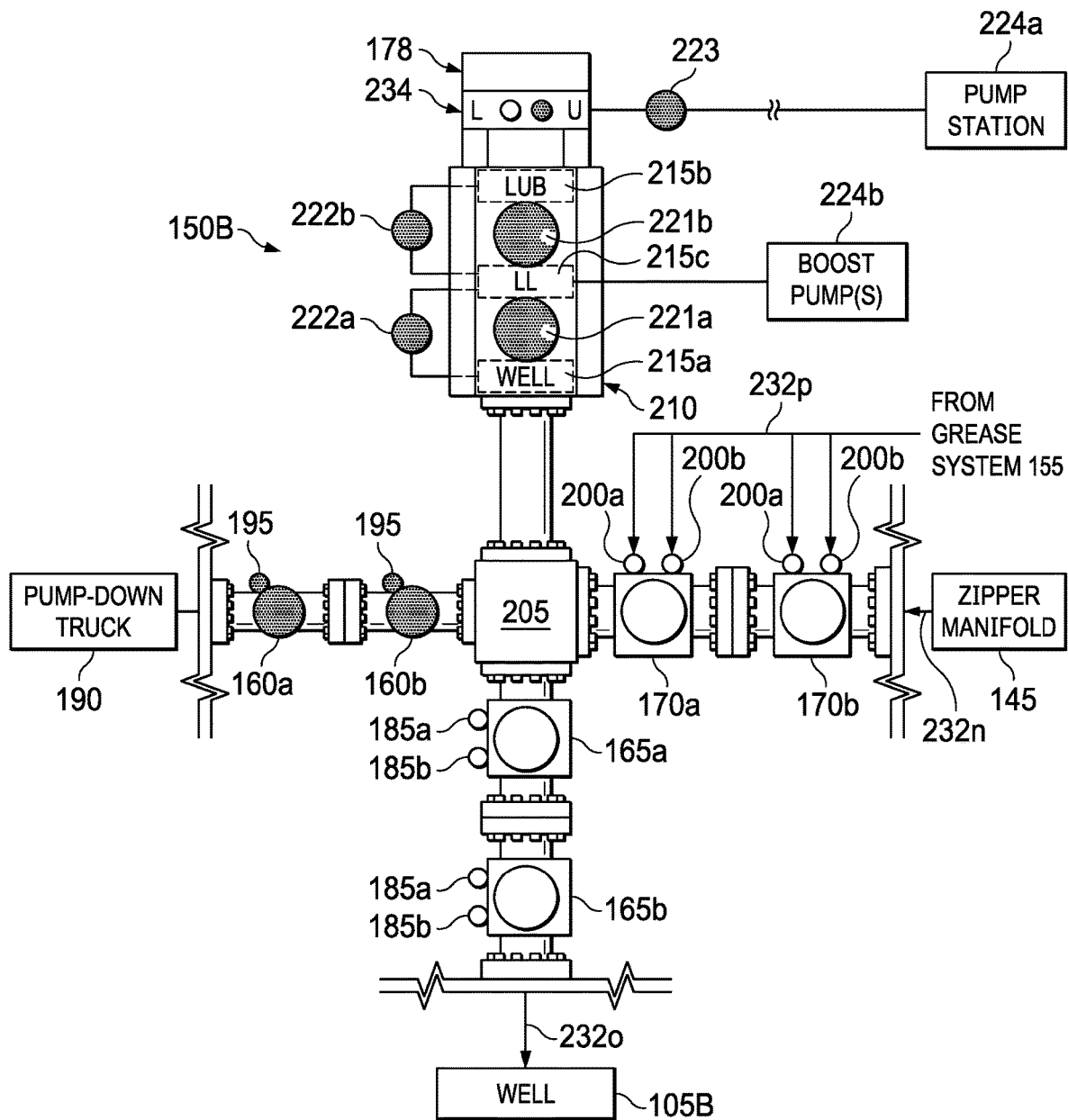
FIG. 16A schematically illustrates execution of one or more sub-step(s) of the eighth step of the method illustrated in FIG. 1B, according to one or more embodiments.
Figure 16B:
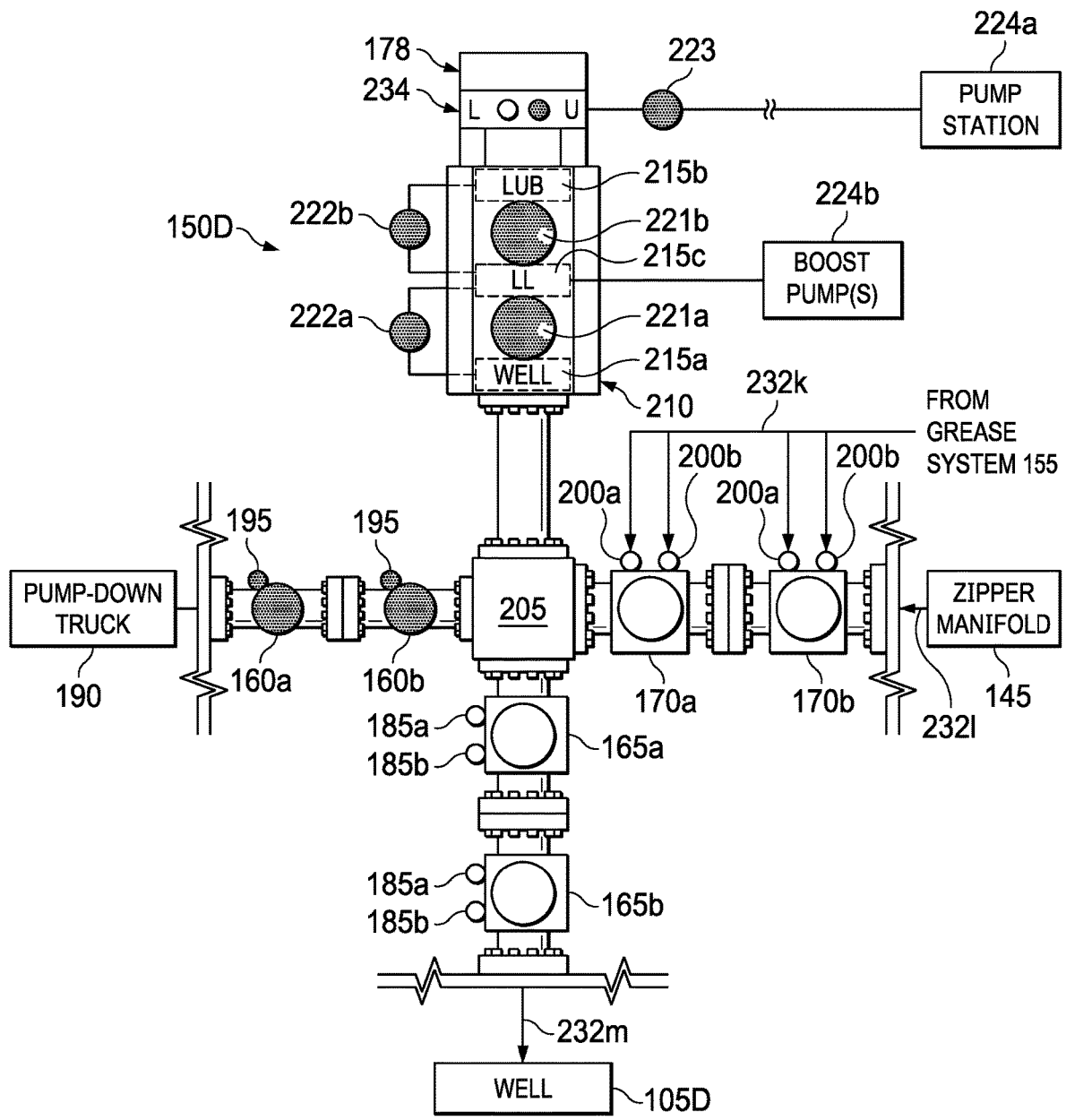
FIG. 16B schematically illustrates execution of one or more additional sub-step(s) of the eighth step of the method illustrated in FIG. 1B, according to one or more embodiments.
Figure 16C:
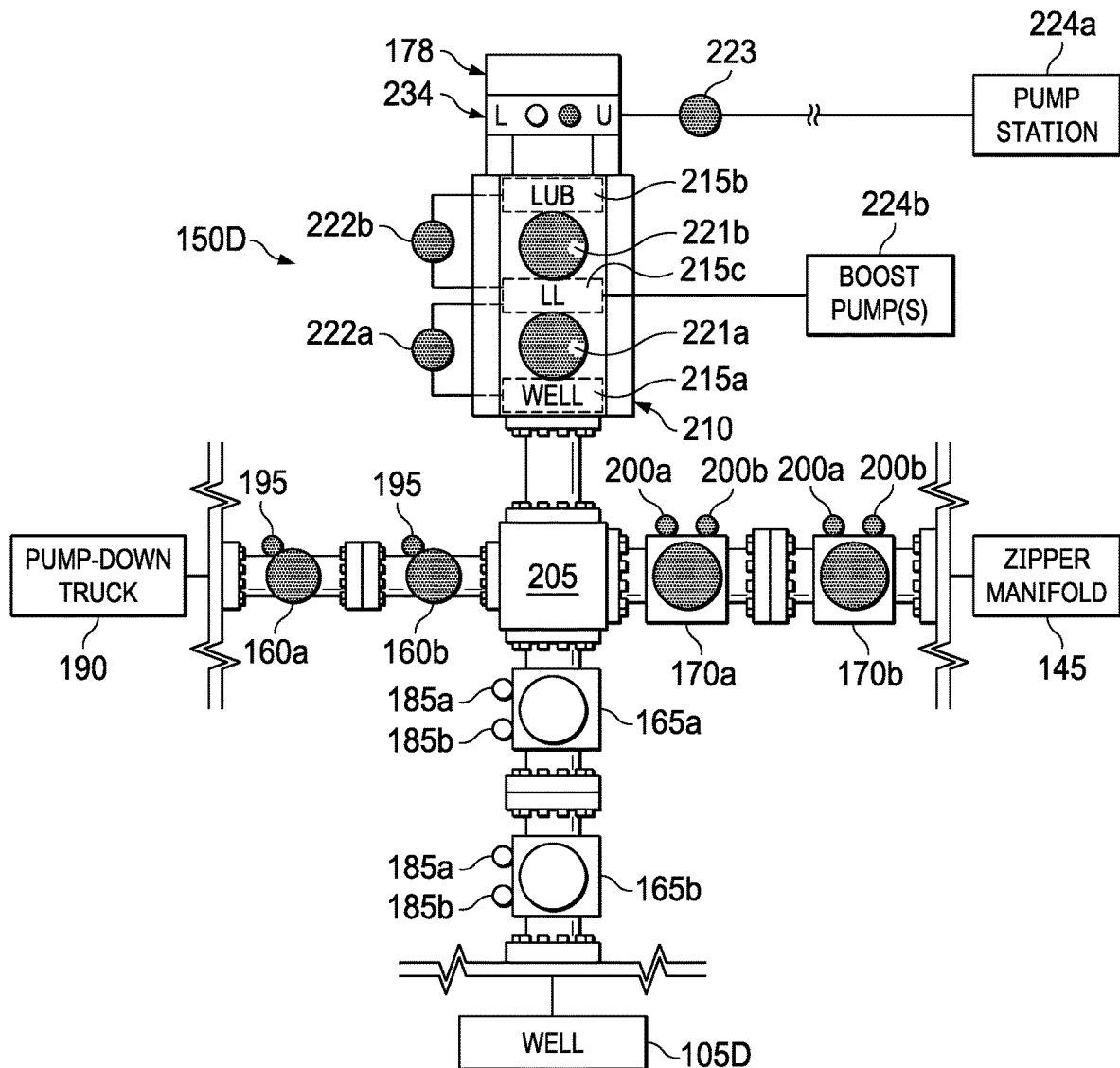
FIG. 16C schematically illustrates execution of one or more additional sub-step(s) of the eighth step of the method illustrated in FIG. 1B, according to one or more embodiments.

Referring to FIGS. 15 and 16A through 16E, in an embodiment, various sub-steps 261a-c of the step 260 of the method 175 illustrated in FIG. 1B are shown in detail, which step 260 is or includes executing the CP swap from hydraulically fracturing (at the step 262) the $n_1$ well (e.g., well 105D) to hydraulically fracturing (at the step 262) the $n_1+1$ well (e.g., well 105B). At the sub-step 261a, the $n_1+1$ well's (e.g., well 105B) zipper valves 170a-b are opened, as shown in FIGS. 15 and 16A, hydraulic fracturing fluid is communicated from the zipper manifold 145 to the $n_{1+1}$ well (indicated by arrows 232n and 232o in FIG. 16A), and grease from the grease system 155 is communicated to the corresponding GPs 200a-b (indicated by arrow 232p in FIG. 16A). At the sub-step 261b, both the $n_1+1$ well's (e.g., well 105B) zipper valves 170a-b and the $n_1$ well's (e.g., well D) zipper valves 170a-b are allowed to fully open, as shown in FIGS. 15, 16A and 16B, so that: hydraulic fracturing fluid is communicated from the zipper manifold 145 to the $n_1$ well (indicated by arrows 232l and 232m in FIG. 16B) and the $n_1+1$ well (indicated by arrows 232n and 232o in FIG. 14A); and grease from the grease system 155 is communicated to the corresponding GPs 200a-b (indicated by arrows 232p and 232k in FIGS. 16A and 16B, respectively). Finally, at the sub-step 261c, the $n_1$ well's (e.g., well 105D) zipper valves 170a-b are closed, as shown in FIGS. 15 and 16C, and grease from the grease system 155 is withheld from the corresponding GPs 200a-b.

As shown in FIGS. 16D and 16E, executing the CP swap from hydraulically fracturing (at the step 262) the $n_1$ well (e.g., well 105D) to hydraulically fracturing (at the step 262) the $n_1+1$ well (e.g., well 105B) transitions the zipper valves from one well to the other, opening the second well and subsequently shutting-in the first well, all while pumping. The transition is instantaneous and the total time between stages measured at treatment pressure is less than 20 seconds (as fast as 19 seconds in some instances).

Figure 17:
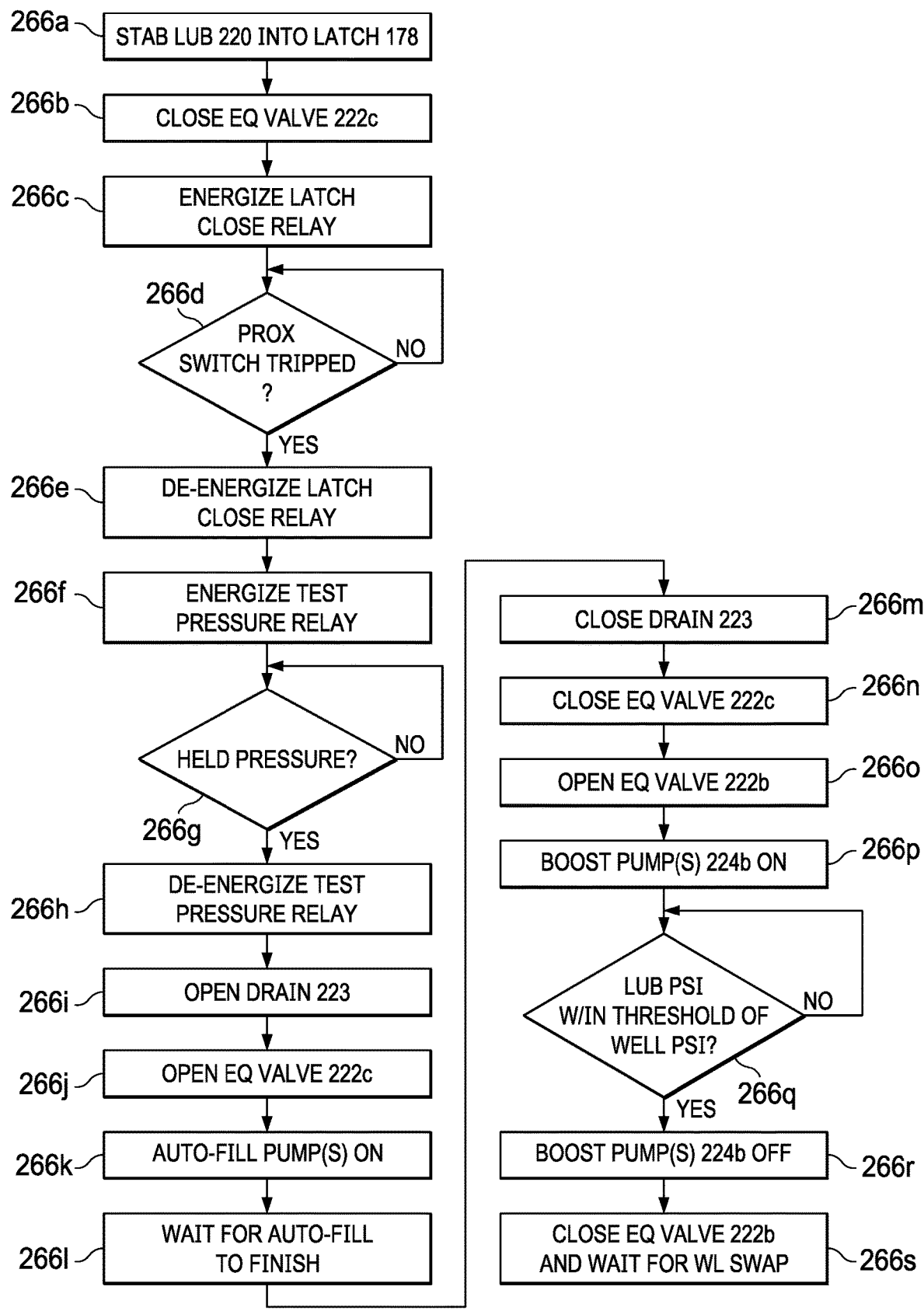
FIG. 17 is a flow diagram illustrating various sub-steps of a ninth step of the method illustrated in FIG. 1B, which ninth step is or includes latching, filling, and pressure testing a frac leg associated with a fourth well in preparation for perforating a stage of the fourth well using the wireline perforating system, according to one or more embodiments.
Figure 18A:
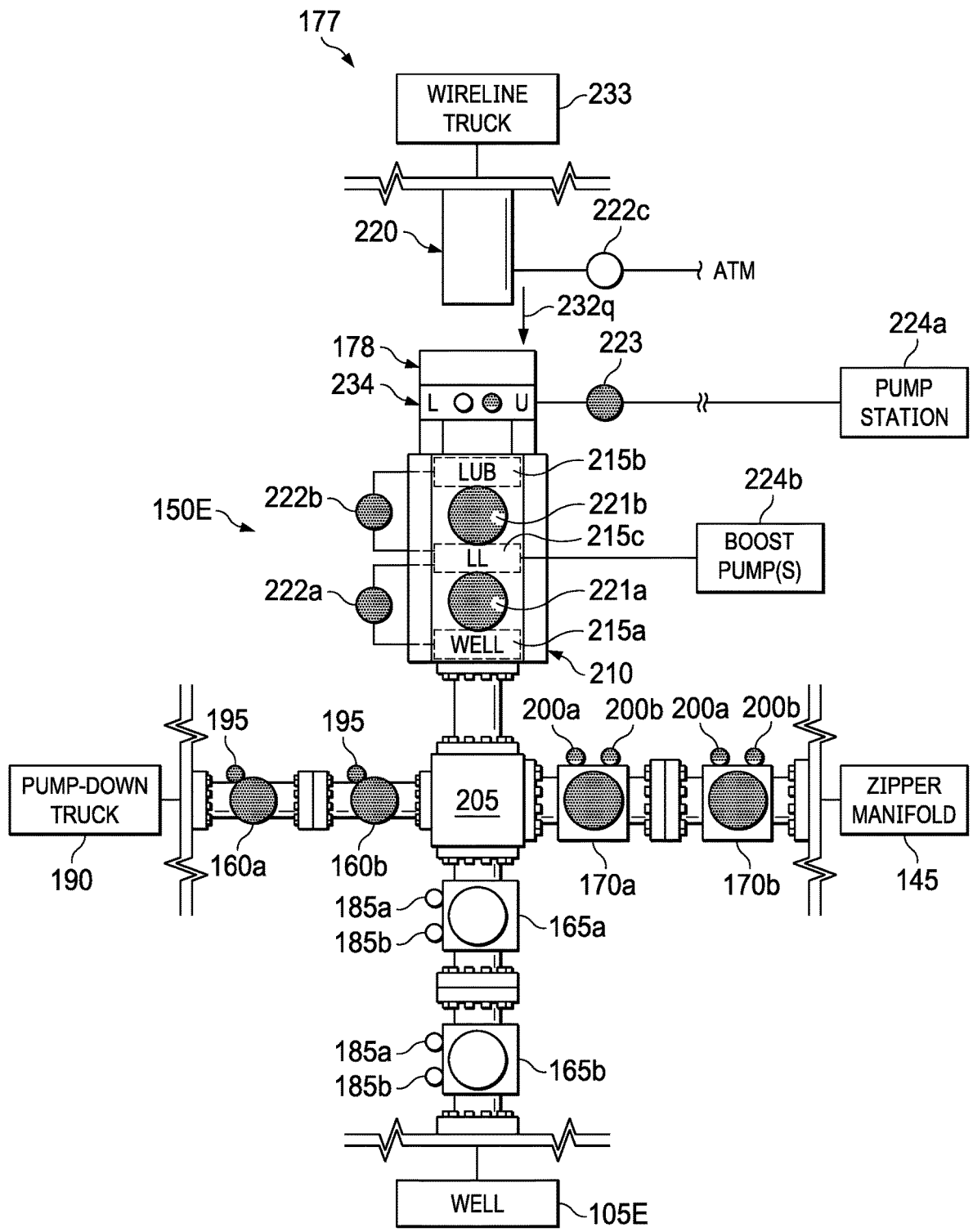
FIG. 18A schematically illustrates execution of one or more sub-step(s) of the ninth step of the method illustrated in FIG. 1B, according to one or more embodiments.
Figure 18B:
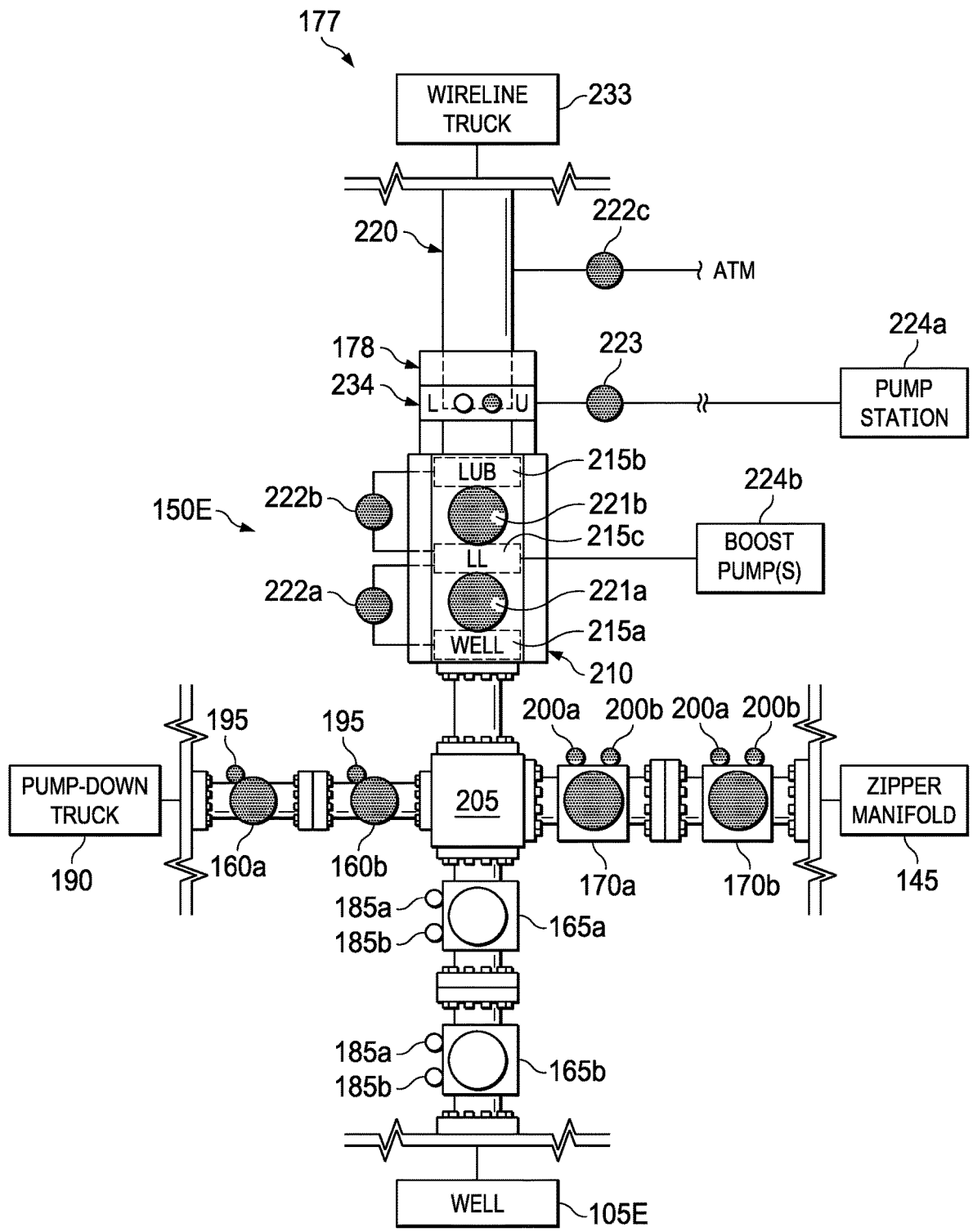
FIG. 18B schematically illustrates execution of one or more additional sub-step(s) of the ninth step of the method illustrated in FIG. 1B, according to one or more embodiments.
Figure 18C:
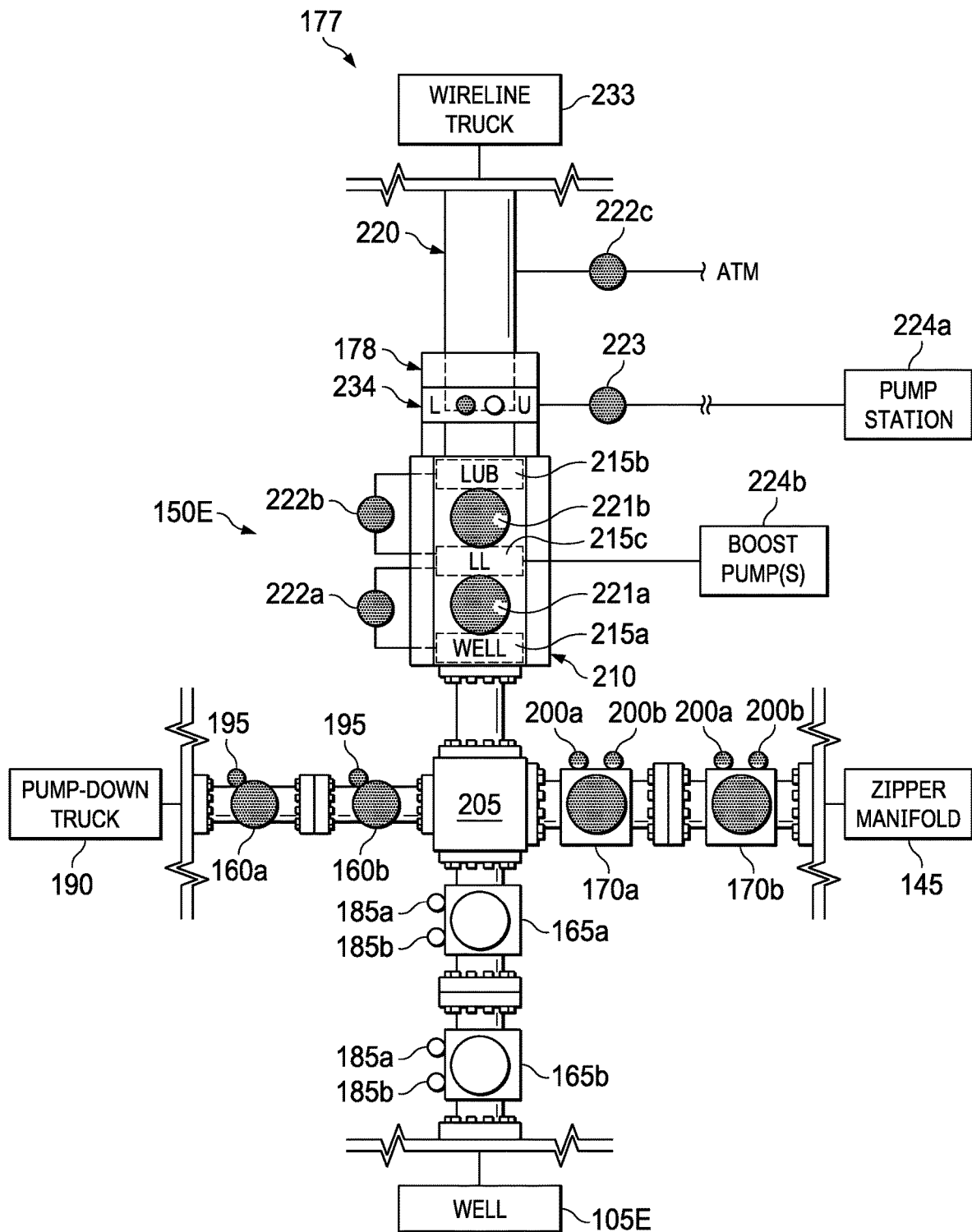
FIG. 18C schematically illustrates execution of one or more additional sub-step(s) of the ninth step of the method illustrated in FIG. 1B, according to one or more embodiments.

Referring to FIGS. 17 and 18A through 18G, in an embodiment, various sub-steps 266a-s of the step 265 of the method 175 illustrated in FIG. 1B are shown in detail, which step 265 is or includes latching, filling, and pressure testing the frac leg 150E associated with the well 105E in preparation for perforating a stage of the well 105E using the wireline perforating system 177 (in a manner similar to that described above in connection with the well 105A and shown in FIGS. 5A through 5C). At the sub-step 266a, the lubricator 220 is stabbed into the latch 234, as shown in FIGS. 17 and 18A (indicated by arrow 232q in FIG. 18A). At the sub-step 266b, the EQ valve 222c is closed, as shown in FIGS. 17 and 18B. At the sub-step 266c, the latch close relay is energized to close the latch 234, thereby connecting the lubricator 220 to the valve apparatus 210, as shown in FIGS. 17 and 18C. At the sub-step 266d, a latch close proximity switch is checked to determine whether the latch 234 has successfully latched the lubricator 220 to the valve apparatus 210. At the sub-step 266e, once it is determined that the latch 234 has successfully latched the lubricator 220 to the valve apparatus 210, the latch close relay is de-energized, as shown in FIG. 17. At the sub-step 266f, a test pressure relay is energized, as shown in FIG. 17. At the sub-step 266g, a determination is made as to whether the connection of the lubricator 220 to the valve apparatus 210 via the latch 234 is or is not capable of holding pressure, as shown in FIG. 17. At the sub-step 266h, once the determination is made that the connection of the lubricator 220 to the valve apparatus 210 via the latch 234 is capable of holding pressure, the test pressure relay is de-energized, as shown in FIG. 17.

Figure 18D:
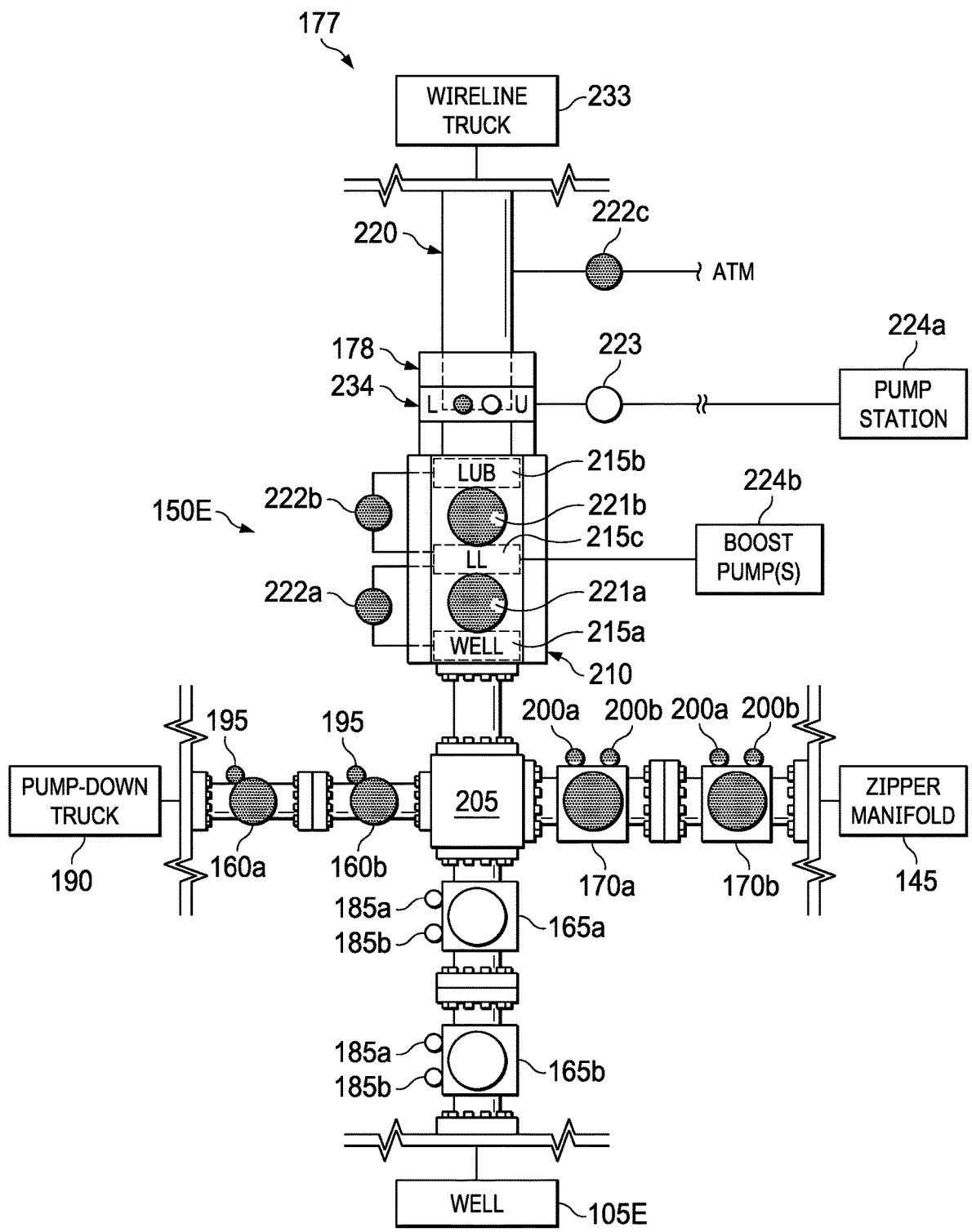
FIG. 18D schematically illustrates execution of one or more additional sub-step(s) of the ninth step of the method illustrated in FIG. 1B, according to one or more embodiments.
Figure 18E:
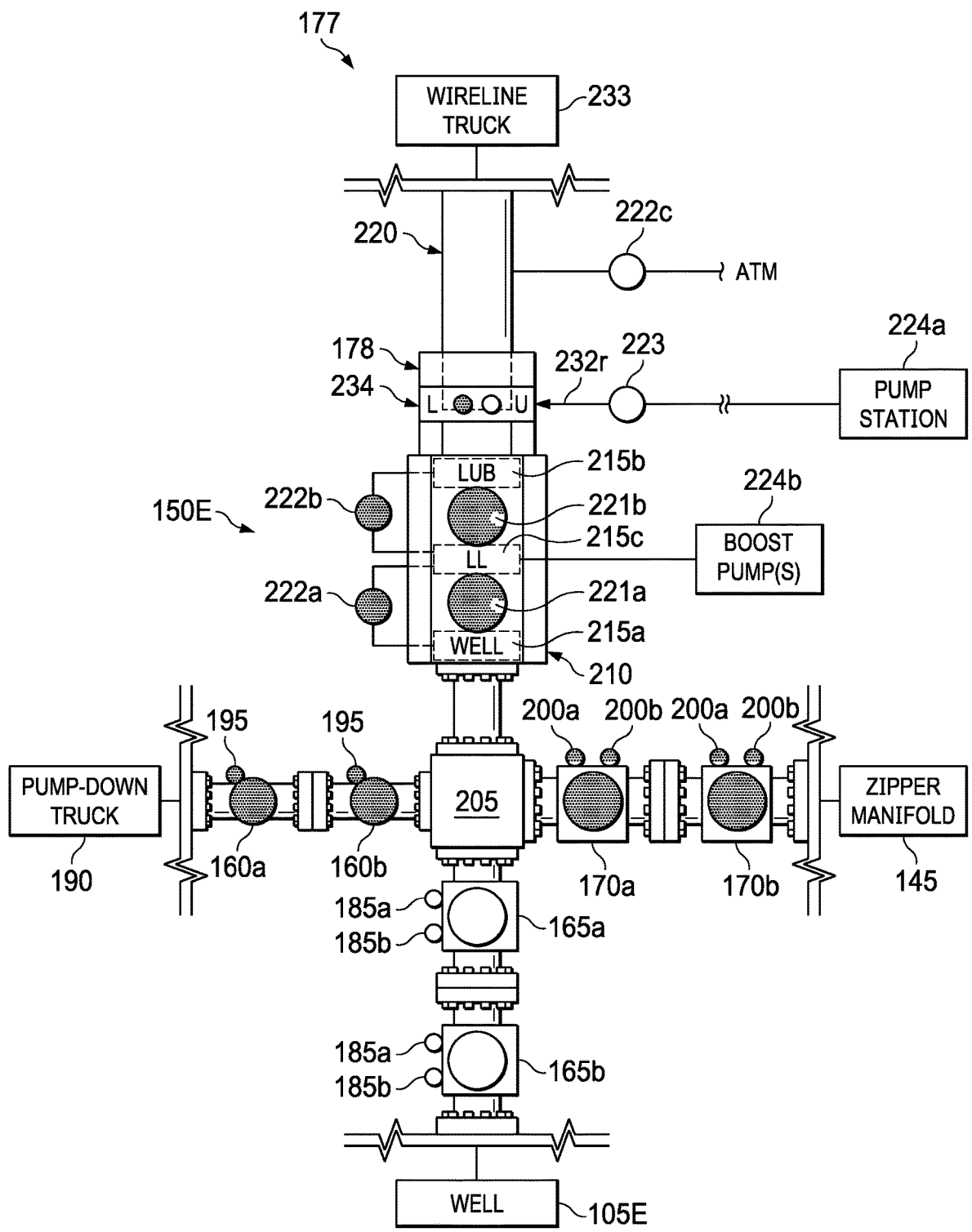
FIG. 18E schematically illustrates execution of one or more additional sub-step(s) of the ninth step of the method illustrated in FIG. 1B, according to one or more embodiments.
Figure 18F:
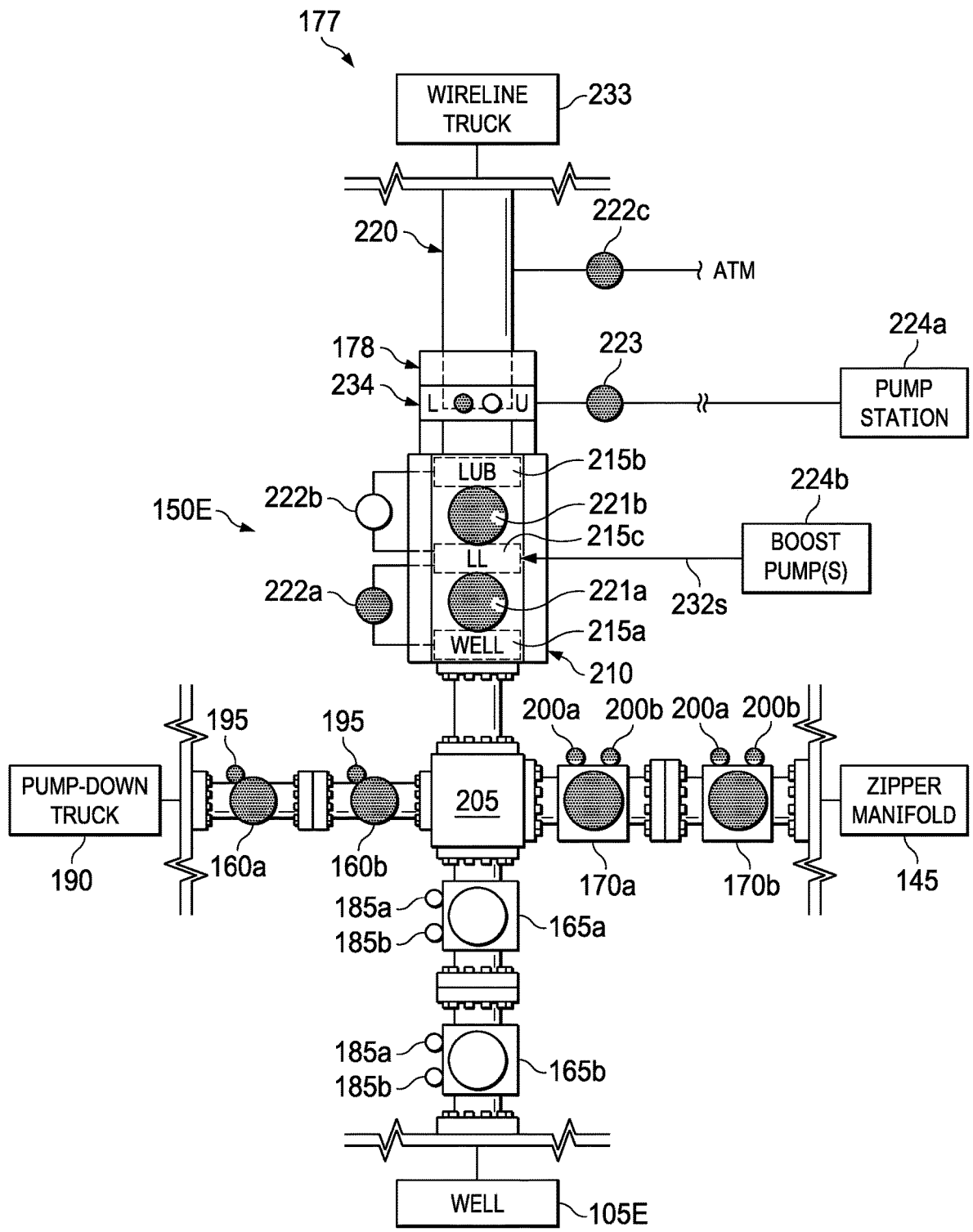
FIG. 18F schematically illustrates execution of one or more additional sub-step(s) of the ninth step of the method illustrated in FIG. 1B, according to one or more embodiments.
Figure 18G:
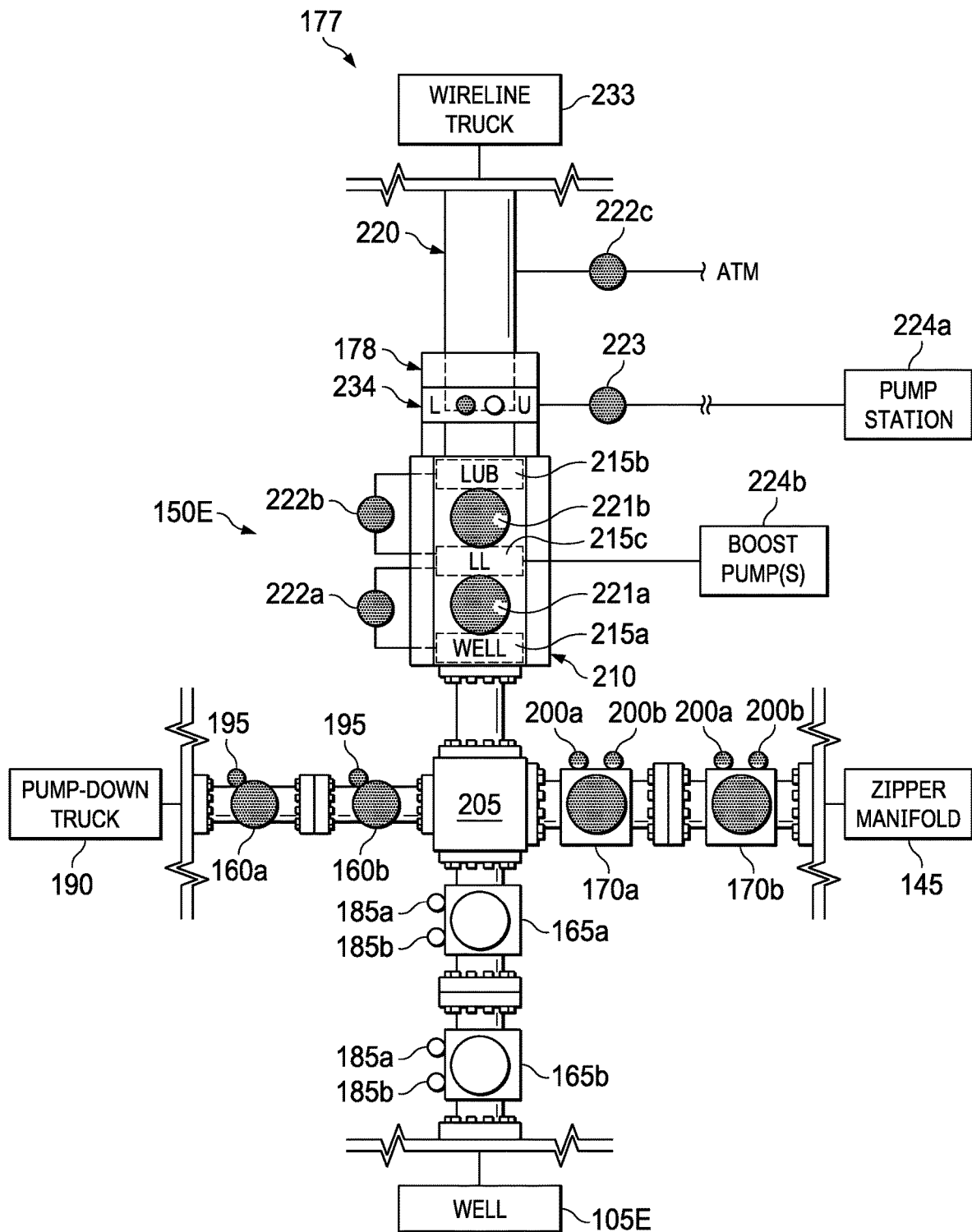
FIG. 18G schematically illustrates execution of one or more additional sub-step(s) of the ninth step of the method illustrated in FIG. 1B, according to one or more embodiments.

At the sub-step 266i, the drain 223 is opened, as shown in FIGS. 17 and 18D. At the sub-step 266j, the EQ valve 222c is opened, as shown in FIGS. 17 and 18E. At the sub-step 266k, the auto-fill pump of the pump station 224a is turned on to fill the lubricator 220 via the open drain 223, as shown in FIGS. 17 and 18E (indicated by arrow 232r in FIG. 18E). At the sub-step 266l, the auto-fill pump is allowed to finish auto-filling the lubricator 220, as shown in FIG. 17. At the sub-step 266m, the drain 223 is closed, as shown in FIGS. 17 and 18F. At the sub-step 266n, the EQ valve 222c is closed, as shown in FIGS. 17 and 18F. At the sub-step 266o, the EQ valve 222b is opened, as shown in FIGS. 17 and 18F. At the sub-step 266p, the boost pump(s) 224b is/are turned on to increase the fluid pressure within the lubricator 220, as shown in FIGS. 17 and 18F (indicated by arrow 232s in FIG. 18F). At the sub-step 266q, a determination is made as to whether the pressure in the lubricator 220 comes to within the pressure in the well 105E by a threshold amount (e.g., 500 PSI), as shown in FIG. 17. Once the determination is made that the pressure in the lubricator 220 comes to within the pressure in the well 105E by the threshold amount, the boost pump(s) 224b is/are turned off at the sub-step 266r, and the EQ valve 222b is closed at the sub-step 266s in preparation for the next wireline swap (e.g., to the well 105E), as shown in FIGS. 17 and 18G.

Figure 19A:
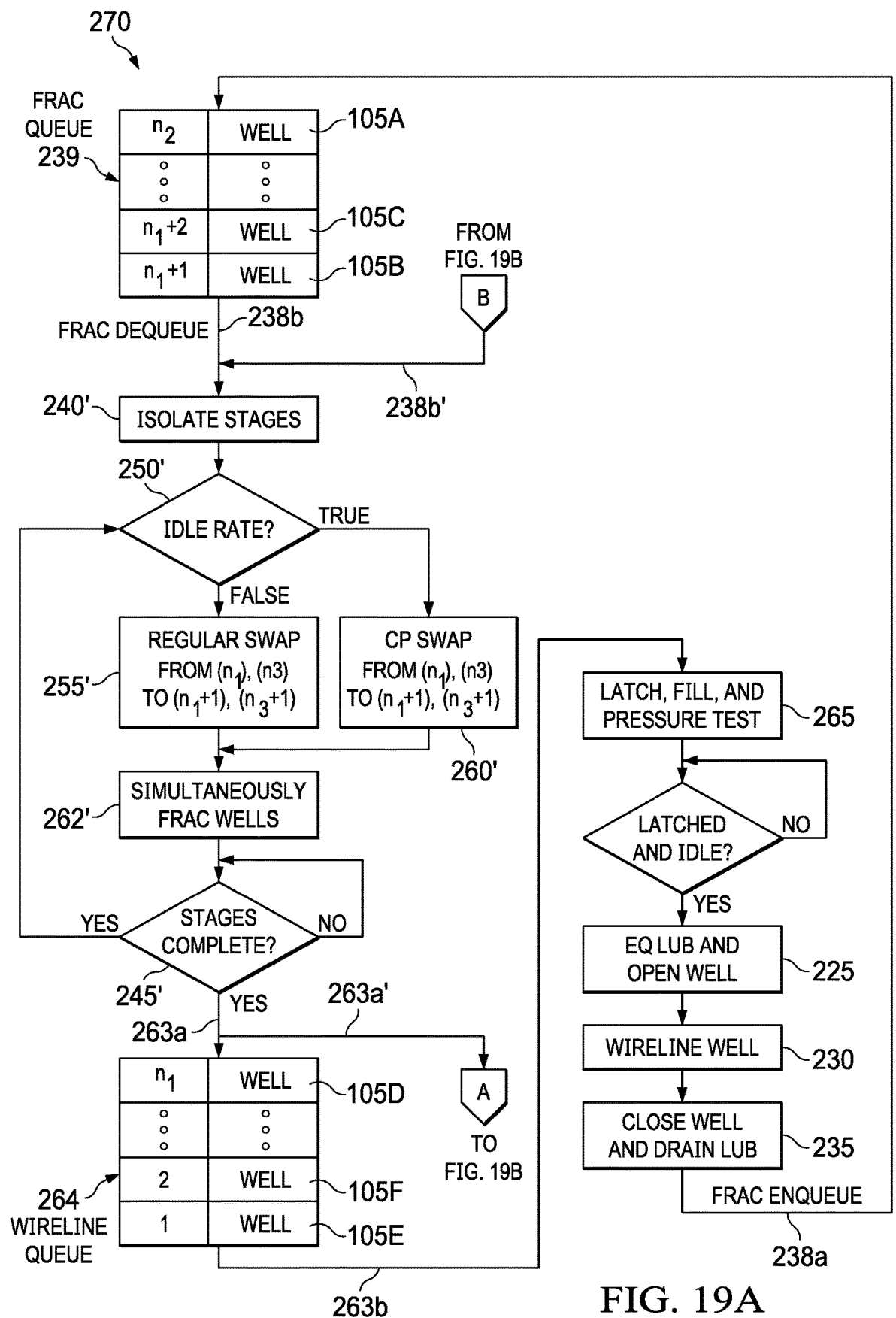
FIG. 19A is a flow diagram illustrating a portion of another method for fracturing wells using the fracturing system of FIG. 1A, which another method includes swapping from simultaneously fracturing first and second wells to simultaneously fracturing third and fourth wells, according to one or more embodiments.
Figure 19B:
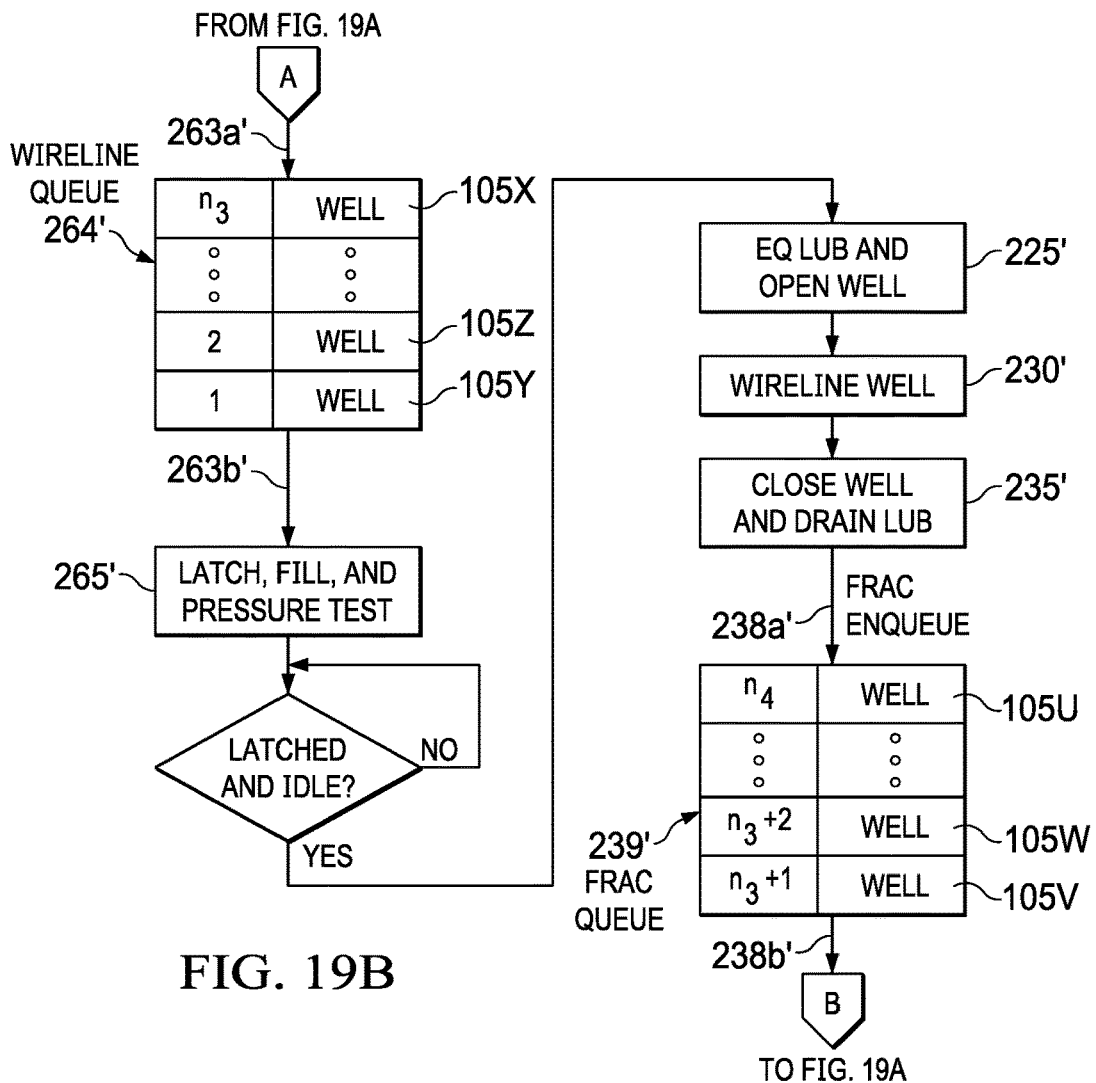
FIG. 19B is a flow diagram illustrating another portion of the another method of FIG. 20A, according to one or more embodiments.

Referring to FIGS. 19A and 19B, in an embodiment, a method 270 for fracturing the wells 105A through 105C+n using the hydraulic fracturing system 100 of FIG. 1A is illustrated, which method 270 includes swapping from simultaneously fracturing the wells $n_1$ and $n_3$ (e.g., wells 105D and 105X) to simultaneously fracturing the wells $n_1+1$ and $n_3+1$ (e.g., wells 105B and 105V). More particularly, the method 270 includes steps substantially identical to corresponding steps of the method 175 described above, which steps are given the same reference numerals. In addition, the method 270 includes additional steps executable to simultaneously fracture the $n_1$ and $n_3$ wells (e.g., wells 105D and 105X), and to swap from simultaneously fracturing the $n_1$ and $n_3$ wells to simultaneously fracturing the $n_1+1$ and $n_3+1$ wells (e.g., wells 105B and 105V), which additional steps are given the same reference numerals, except that the suffix "'" is added. Specifically, in some instances the suffix "'" signifies that the referenced step of the method 270 is substantially identical to the corresponding step of the method 175, except that the referenced step is instead performed on a different one of the wells than that on which the corresponding step of the method 175 is performed (i.e., the steps 225', 230', 235', 238a', 239', 238b', 263a', 264', 263b', 265', and 268' fall into this category), while, in other instances, the suffix "'" signifies that the referenced step of the method 270 is substantially similar to the corresponding step of the method 175, except that the referenced step is simultaneously performed on another one of the wells other than that on which the corresponding step of the method 175 is performed (i.e., the steps 240', 245', 250', 255', 260', and 262' fall into this category). In one or more embodiments, the controller 156 is adapted to control the grease system 155, the frac legs 150A through 150C+n, or both, in order to execute the method 270 described herein.

Figure 20:
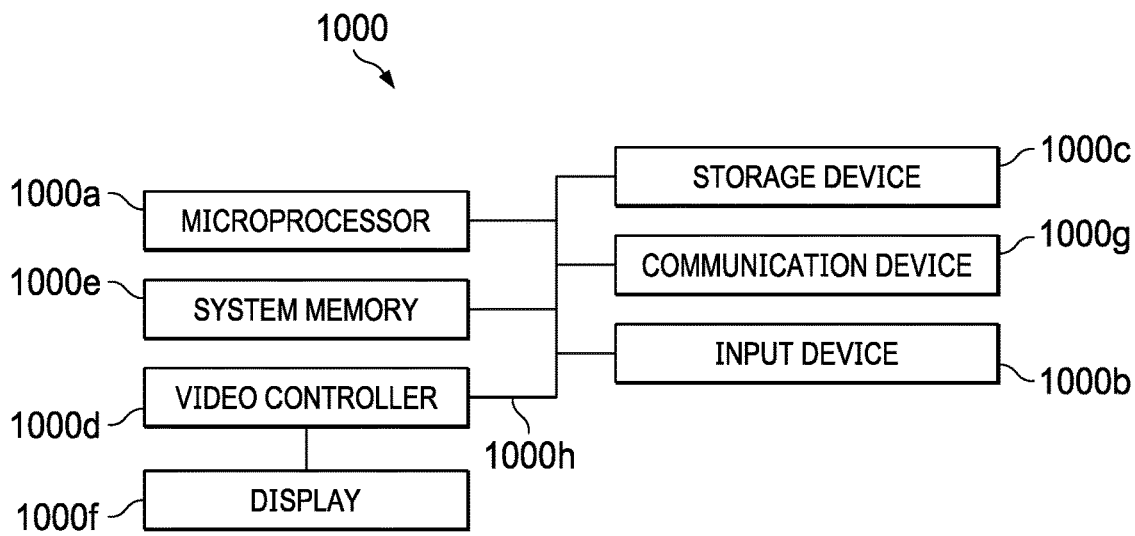
FIG. 20 is a diagrammatic illustration of a computing node for implementing one or more embodiments of the present disclosure.

Referring to FIG. 20, with continuing reference to FIGS. 1A through 19B, an illustrative node 1000 for implementing one or more of the embodiments of one or more of the controller(s) (e.g., the controller 156), element(s), apparatus, system(s) (e.g., the hydraulic fracturing system 100), method(s) (e.g., the method 175, the method 270, or both), step(s), and/or sub-step(s), or any combination thereof, described above and/or illustrated in FIGS. 1A through 19B is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In one or more embodiments, the storage device 1000c may include a hard drive, CD-ROM, optical drive, any other form of storage device and/or any combination thereof. In one or more embodiments, the storage device 1000c may include, and/or be capable of receiving, a CD-ROM, DVD-ROM, or any other form of non-transitory computer-readable medium that may contain executable instructions. In one or more embodiments, the communication device 1000g may include a modem, network card, or any other device to enable the node 1000 to communicate with other node(s). In one or more embodiments, the node and the other node(s) represent a plurality of interconnected (whether by intranet or Internet) computer systems, including without limitation, personal computers, mainframes, PDAs, smartphones and cell phones.

In one or more embodiments, one or more of the embodiments described above and/or illustrated in FIGS. 1A through 19B include at least the node 1000 and/or components thereof, and/or one or more nodes that are substantially similar to the node 1000 and/or components thereof. In one or more embodiments, one or more of the above-described components of the node 1000 and/or the embodiments described above and/or illustrated in FIGS. 1A through 19B include respective pluralities of same components.

In one or more embodiments, one or more of the embodiments described above and/or illustrated in FIGS. 1A through 19B include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in one or more embodiments pulls real-time information from one or more servers, automatically refreshing with latest information at a predetermined time increment; or any combination thereof.

In one or more embodiments, a computer system typically includes at least hardware capable of executing machine readable instructions, as well as the software for executing acts (typically machine-readable instructions) that produce a desired result. In one or more embodiments, a computer system may include hybrids of hardware and software, as well as computer sub-systems.

In one or more embodiments, hardware generally includes at least processor-capable platforms, such as client-machines (also known as personal computers or servers), and hand-held processing devices (such as smart phones, tablet computers, or personal computing devices (PCDs), for example). In one or more embodiments, hardware may include any physical device that is capable of storing machine-readable instructions, such as memory or other data storage devices. In one or more embodiments, other forms of hardware include hardware sub-systems, including transfer devices such as modems, modem cards, ports, and port cards, for example.

In one or more embodiments, software includes any machine code stored in any memory medium, such as RAM or ROM, and machine code stored on other devices (such as floppy disks, flash memory, or a CD-ROM, for example). In one or more embodiments, software may include source or object code. In one or more embodiments, software encompasses any set of instructions capable of being executed on a node such as, for example, on a client machine or server.

In one or more embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In one or more embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In one or more embodiments, data structures are defined organizations of data that may enable an embodiment of the present disclosure. In an embodiment, a data structure may provide an organization of data, or an organization of executable code.

In one or more embodiments, any networks and/or one or more portions thereof may be designed to work on any specific architecture. In an embodiment, one or more portions of any networks may be executed on a single computer, local area networks, client-server networks, wide area networks, internets, hand-held and other portable and wireless devices and networks.

In one or more embodiments, a database may be any standard or proprietary database software. In one or more embodiments, the database may have fields, records, data, and other database elements that may be associated through database specific software. In one or more embodiments, data may be mapped. In one or more embodiments, mapping is the process of associating one data entry with another data entry. In an embodiment, the data contained in the location of a character file can be mapped to a field in a second table. In one or more embodiments, the physical location of the database is not limiting, and the database may be distributed. In an embodiment, the database may exist remotely from the server, and run on a separate platform. In an embodiment, the database may be accessible across the Internet. In one or more embodiments, more than one database may be implemented.

In one or more embodiments, a plurality of instructions stored on a computer readable medium may be executed by one or more processors to cause the one or more processors to carry out or implement in whole or in part one or more of the embodiments of one or more of the controller(s) (e.g., the controller 156), element(s), apparatus, system(s) (e.g., the hydraulic fracturing system 100), method(s) (e.g., the method 175, the method 270, or both), step(s), and/or sub-step(s), or any combination thereof, described above and/or illustrated in FIGS. 1A through 19B. In one or more embodiments, such a processor may include one or more of the microprocessor 1000a, any processor(s) that are part of the components of the hydraulic fracturing system 100, such as, for example, the controller 156, and/or any combination thereof, and such a computer readable medium may be distributed among one or more components of the system. In one or more embodiments, such a processor may execute the plurality of instructions in connection with a virtual computer system. In one or more embodiments, such a plurality of instructions may communicate directly with the one or more processors, and/or ay interact with one or more operating systems, middleware, firmware, other applications, and/or any combination thereof, to cause the one or more processors to execute the instructions.

A first method has been disclosed. The first method generally includes: (a) permitting performance of a first hydraulic fracturing operation on a first well, which first hydraulic fracturing operation includes pumping fluid into the first well via a first valve associated with the first well, and measuring a flow rate of the fluid being pumped into the first well; (b) determining that the flow rate of the fluid being pumped into the first well is below a flow rate threshold and has been below the flow rate threshold for a threshold amount of time; (c) during pumping of the fluid into the first well via the first valve, opening a second valve associated with a second well; (d) permitting performance of a second hydraulic fracturing operation on the second well, which second hydraulic fracturing operation includes pumping fluid into the second well via the second valve; and (e) during pumping of the fluid into the second well via the second valve, closing the first valve associated with the first well; wherein, during each of steps (a), (b), (c), (d), and (e), fluid is continuously pumped to the first valve, the second valve, or both the first valve and the second valve. In one or more embodiments, each of the first and second valves is in fluid communication with a hydraulic manifold from which fluid is pumped to the first valve and/or the second valve; and, during each of steps (a), (b), (c), (d), and (e), fluid is continuously pumped from the hydraulic manifold to the first valve, the second valve, or both the first valve and the second valve. In one or more embodiments, the second valve is opened after step (b). In one or more embodiments, the first valve includes a grease port; and the method further includes withholding grease from the grease port after step (e). In one or more embodiments, the second valve includes a grease port; and the method further includes: during and/or after opening the second valve, communicating grease to the grease port of the second valve. In one or more embodiments, each of the first and second valves is a zipper valve. In one or more embodiments, step (d): further includes measuring a flow rate of the fluid being pumped into the second well; and is, or is part of, a hydraulic fracturing stage of the second well; and the method further includes: determining that the hydraulic fracturing stage of the second well has ended; determining that the flow rate of the fluid being pumped into the second well is above the flow rate threshold; closing the second valve associated with the second well; withholding grease from a grease port of the second valve; receiving a signal to advance; opening a third valve associated with a third well; and during and/or after opening the third valve, communicating grease to a grease port of the third valve.

A first apparatus has also been disclosed. The first apparatus generally includes: a non-transitory computer readable medium; and a plurality of instructions stored on the non-transitory computer readable medium and executable by one or more processors, wherein, when the instructions are executed by the one or more processors, the following steps are executed: (a) permitting performance of a first hydraulic fracturing operation on a first well, which first hydraulic fracturing operation includes pumping fluid into the first well via a first valve associated with the first well, and measuring a flow rate of the fluid being pumped into the first well; (b) determining that the flow rate of the fluid being pumped into the first well is below a flow rate threshold and has been below the flow rate threshold for a threshold amount of time; (c) during pumping of the fluid into the first well via the first valve, opening a second valve associated with a second well; (d) permitting performance of a second hydraulic fracturing operation on the second well, which second hydraulic fracturing operation includes pumping fluid into the second well via the second valve; and (e) during pumping of the fluid into the second well via the second valve, closing the first valve associated with the first well; wherein, during each of steps (a), (b), (c), (d), and (e), fluid is continuously pumped to the first valve, the second valve, or both the first valve and the second valve. In one or more embodiments, each of the first and second valves is in fluid communication with a hydraulic manifold from which fluid is pumped to the first valve and/or the second valve; wherein, during each of steps (a), (b), (c), (d), and (e), fluid is continuously pumped from the hydraulic manifold to the first valve, the second valve, or both the first valve and the second valve. In one or more embodiments, the second valve is opened after step (b). In one or more embodiments, the first valve includes a grease port; and, when the instructions are executed by the one or more processors, the following step is also executed: withholding grease from the grease port after step (e). In one or more embodiments, the second valve includes a grease port; and, when the instructions are executed by the one or more processors, the following step is also executed: during and/or after opening the second valve, communicating grease to the grease port of the second valve. In one or more embodiments, each of the first and second valves is a zipper valve. In one or more embodiments, step (d): further includes measuring a flow rate of the fluid being pumped into the second well; and is, or is part of, a hydraulic fracturing stage of the second well; and, when the instructions are executed by the one or more processors, the following steps are also executed: determining that the hydraulic fracturing stage of the second well has ended; determining that the flow rate of the fluid being pumped into the second well is above the flow rate threshold; closing the second valve associated with the second well; withholding grease from a grease port of the second valve; receiving a signal to advance; opening a third valve associated with a third well; and during and/or after opening the third valve, communicating grease to a grease port of the third valve.

A second method has also been disclosed. The second method generally includes: (a) queuing, using a controller, a first well in a first hydraulic fracturing queue, which first hydraulic fracturing queue is associated with a first plurality of wells standing by for hydraulic fracturing, including at least the first well and a second well; (b) dequeuing, using the controller, the second well from the first hydraulic fracturing queue; (c) permitting hydraulic fracturing of the second well; (d) dequeuing, using the controller, the first well from the first hydraulic fracturing queue; and (e) swapping from permitting hydraulic fracturing of the second well to permitting hydraulic fracturing of the first well. In one or more embodiments, step (c) includes opening a second valve associated with the second well to permit pumping of fluid into the second well via the second valve; and step (e) includes: opening a first valve associated with the first well to permit pumping of fluid into the first well via the first valve; and closing the second valve associated with the second well. In one or more embodiments, step (c) further includes measuring a flow rate of the fluid being pumped into the second well. In one or more embodiments, step (e) further includes, in response to determining that the flow rate of the fluid being pumped into the second well is below a flow rate threshold and has been below the flow rate threshold for a threshold amount of time, the first valve associated with the first well is opened at step (e) before the second valve associated with the second well is closed at step (e). In one or more embodiments, the step (e) further includes, in response to determining that the flow rate of the fluid being pumped into the second well is above a flow rate threshold, the first valve associated with the first well is opened at step (e) after the second valve associated with the second well is closed at step (e). In one or more embodiments, the method further includes: (f) queuing, using the controller, a third well in a second hydraulic fracturing queue, which second hydraulic fracturing queue is associated with a second plurality of wells standing by for hydraulic fracturing, including at least the third well and a fourth well; (g) dequeuing, using the controller, the fourth well from the second hydraulic fracturing queue; (h) permitting hydraulic fracturing of the fourth well; (i) dequeuing, using the controller, the third well from the second hydraulic fracturing queue; and (j) swapping from permitting hydraulic fracturing of the fourth well to permitting hydraulic fracturing of the third well. In one or more embodiments, steps (c) and (h) are executed simultaneously using hydraulic fracturing fluid from a hydraulic manifold; and steps (e) and (j) are executed simultaneously using hydraulic fracturing fluid from the hydraulic manifold. In one or more embodiments, step (c) includes opening a second valve associated with the second well to permit pumping of fluid into the second well via the second valve; step (e) includes: opening a first valve associated with the first well to permit pumping of fluid into the first well via the first valve; and closing the second valve associated with the second well; step (h) includes opening a fourth valve associated with the fourth well to permit pumping of fluid into the fourth well via the fourth valve; and step (j) includes: opening a third valve associated with the third well to permit pumping of fluid into the third well via the third valve; and closing the fourth valve associated with the fourth well.

A second apparatus has also been disclosed. The second apparatus generally includes: a non-transitory computer readable medium; and a plurality of instructions stored on the non-transitory computer readable medium and executable by one or more processors, wherein, when the instructions are executed by the one or more processors, the following steps are executed: (a) queuing a first well in a first hydraulic fracturing queue, which first hydraulic fracturing queue includes a first plurality of wells standing by for hydraulic fracturing, including at least the first well and a second well; (b) dequeuing the second well from the first hydraulic fracturing queue; (c) permitting hydraulic fracturing of the second well; (d) dequeuing the first well from the first hydraulic fracturing queue; and (e) swapping from permitting hydraulic fracturing of the second well to permitting hydraulic fracturing of the first well. In one or more embodiments, step (c) includes opening a second valve associated with the second well to permit pumping of fluid into the second well via the second valve; and step (e)

includes: opening a first valve associated with the first well to permit pumping of fluid into the first well via the first valve; and closing the second valve associated with the second well. In one or more embodiments, step (c) further includes measuring a flow rate of the fluid being pumped into the second well. In one or more embodiments, in response to determining that the flow rate of the fluid being pumped into the second well is below a flow rate threshold and has been below the flow rate threshold for a threshold amount of time, the first valve associated with the first well is opened at step (e) before the second valve associated with the second well is closed at step (e). In one or more embodiments, in response to determining that the flow rate of the fluid being pumped into the second well is above a flow rate threshold, the first valve associated with the first well is opened at step (e) after the second valve associated with the second well is closed at step (e). In one or more embodiments, when the instructions are executed by the one or more processors, the following steps are also executed: (f) queuing a third well in a second hydraulic fracturing queue, which second hydraulic fracturing queue includes a second plurality of wells standing by for hydraulic fracturing, including at least the third well and a fourth well; (g) dequeuing the fourth well from the second hydraulic fracturing queue; (h) permitting hydraulic fracturing of the fourth well; (i) dequeuing the third well from the second hydraulic fracturing queue; and (j) swapping from permitting hydraulic fracturing of the fourth well to permitting hydraulic fracturing of the third well. In one or more embodiments, steps (c) and (h) are executed simultaneously using hydraulic fracturing fluid from a hydraulic manifold; and steps (e) and (j) are executed simultaneously using hydraulic fracturing fluid from the hydraulic manifold. In one or more embodiments, step (c) includes opening a second valve associated with the second well to permit pumping of fluid into the second well via the second valve; step (e) includes: opening a first valve associated with the first well to permit pumping of fluid into the first well via the first valve; and closing the second valve associated with the second well; step (h) includes opening a fourth valve associated with the fourth well to permit pumping of fluid into the fourth well via the fourth valve; and step (j) includes: opening a third valve associated with the third well to permit pumping of fluid into the third well via the third valve; and closing the fourth valve associated with the fourth well.

It is understood that variations may be made in the foregoing without departing from the scope of the present disclosure.

In several embodiments, the elements and teachings of the various embodiments may be combined in whole or in part in some (or all) of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method, comprising:
   (a) permitting performance of a first hydraulic fracturing operation on a first well, which first hydraulic fracturing operation comprises pumping fluid into the first well via a first valve associated with the first well, and measuring a flow rate of the fluid being pumped into the first well;
   (b) determining that the flow rate of the fluid being pumped into the first well is below a flow rate threshold and has been below the flow rate threshold for a threshold amount of time;
   (c) during pumping of the fluid into the first well via the first valve, opening a second valve associated with a second well;
   (d) permitting performance of a second hydraulic fracturing operation on the second well, which second hydraulic fracturing operation comprises pumping fluid into the second well via the second valve; and
   (e) during pumping of the fluid into the second well via the second valve, closing the first valve associated with the first well;
   wherein, during each of steps (a), (b), (c), (d), and (e), fluid is continuously pumped to the first valve, the second valve, or both the first valve and the second valve.

2. The method of claim 1,
   wherein each of the first and second valves is in fluid communication with a hydraulic manifold from which fluid is pumped to the first valve and/or the second valve; and
   wherein, during each of steps (a), (b), (c), (d), and (e), fluid is continuously pumped from the hydraulic manifold to the first valve, the second valve, or both the first valve and the second valve.

3. The method of claim 1, wherein the second valve is opened after step (b).

4. The method of claim 1,
wherein the first valve comprises a grease port; and
wherein the method further comprises:
  communicating grease to the grease port of the first valve; and
  withholding grease from the grease port of the first valve after step (e).

5. The method of claim 1,
wherein the second valve comprises a grease port; and
wherein the method further comprises:
  during and/or after opening the second valve, communicating grease to the grease port of the second valve.

6. The method of claim 1, wherein each of the first and second valves is a zipper valve.

7. The method of claim 1,
wherein step (d):
  further comprises measuring a flow rate of the fluid being pumped into the second well; and
  is, or is part of, a hydraulic fracturing stage of the second well; and
wherein the method further comprises:
  determining that the hydraulic fracturing stage of the second well has ended;
  determining that the flow rate of the fluid being pumped into the second well is above the flow rate threshold;
  communicating grease to a grease port of the second valve associated with the second well;
  closing the second valve associated with the second well;
  after closing the second valve associated with the second well, withholding grease from the grease port of the second valve;
  receiving a signal to advance;
  opening a third valve associated with a third well; and
  during and/or after opening the third valve, communicating grease to a grease port of the third valve.

8. An apparatus, comprising:
a non-transitory computer readable medium; and
a plurality of instructions stored on the non-transitory computer readable medium and executable by one or more processors, wherein, when the instructions are executed by the one or more processors, the following steps are executed:
  (a) permitting performance of a first hydraulic fracturing operation on a first well, which first hydraulic fracturing operation comprises pumping fluid into the first well via a first valve associated with the first well, and measuring a flow rate of the fluid being pumped into the first well;
  (b) determining that the flow rate of the fluid being pumped into the first well is below a flow rate threshold and has been below the flow rate threshold for a threshold amount of time;
  (c) during pumping of the fluid into the first well via the first valve, opening a second valve associated with a second well;
  (d) permitting performance of a second hydraulic fracturing operation on the second well, which second hydraulic fracturing operation comprises pumping fluid into the second well via the second valve; and
  (e) during pumping of the fluid into the second well via the second valve, closing the first valve associated with the first well;
wherein, during each of steps (a), (b), (c), (d), and (e), fluid is continuously pumped to the first valve, the second valve, or both the first valve and the second valve.

9. The apparatus of claim 8,
wherein each of the first and second valves is in fluid communication with a hydraulic manifold from which fluid is pumped to the first valve and/or the second valve;
wherein, during each of steps (a), (b), (c), (d), and (e), fluid is continuously pumped from the hydraulic manifold to the first valve, the second valve, or both the first valve and the second valve.

10. The apparatus of claim 8, wherein the second valve is opened after step (b).

11. The apparatus of claim 8,
wherein the first valve comprises a grease port; and
wherein, when the instructions are executed by the one or more processors, the following steps are also executed:
  communicating grease to the grease port of the first valve; and
  withholding grease from the grease port of the first valve after step (e).

12. The apparatus of claim 8,
wherein the second valve comprises a grease port; and
wherein, when the instructions are executed by the one or more processors, the following step is also executed:
  during and/or after opening the second valve, communicating grease to the grease port of the second valve.

13. The apparatus of claim 8, wherein each of the first and second valves is a zipper valve.

14. The apparatus of claim 8,
wherein step (d):
  further comprises measuring a flow rate of the fluid being pumped into the second well; and
  is, or is part of, a hydraulic fracturing stage of the second well; and
wherein, when the instructions are executed by the one or more processors, the following steps are also executed:
  determining that the hydraulic fracturing stage of the second well has ended;
  determining that the flow rate of the fluid being pumped into the second well is above the flow rate threshold;
  communicating grease to a grease port of the second valve associated with the second well;
  closing the second valve associated with the second well;
  after closing the second valve associated with the second well, withholding grease from the grease port of the second valve;
  receiving a signal to advance;
  opening a third valve associated with a third well; and
  during and/or after opening the third valve, communicating grease to a grease port of the third valve.

15. A method of hydraulically fracturing at least first and second wells of a plurality of wells, the first and second wells being associated with first and second valves, respectively, the method comprising:
  (a) permitting hydraulic fracturing of the second well, comprising: opening the second valve associated with the second well to permit pumping of fluid into the second well via the second valve; and measuring a flow rate of the fluid being pumped into the second well;
  (b) swapping from permitting hydraulic fracturing of the second well to permitting hydraulic fracturing of the first well, comprising: opening the first valve associated with the first well to permit pumping of fluid into the first well via the first valve; and closing the second valve associated with the second well; wherein, during step (b), hydraulic fracturing fluid is continuously pumped to the first and second valves via a hydraulic manifold; and wherein: in response to determining that the flow rate measured at step (a) has satisfied one or more flow rate conditions, the first valve associated with the first well is opened at step (b) before the second valve associated with the second well is closed at step (b); or in response to determining that the flow rate measured at step (a) has not satisfied one or more flow rate conditions, the first valve associated with the first well is opened at step (b) during or after the second valve associated with the second well is closed at step (b).

16. The method of claim 15, wherein the plurality of wells further comprises third and fourth wells, the third and fourth wells being associated with third and fourth valves, respectively; and wherein the method further comprises:

(c) permitting hydraulic fracturing of the fourth well; and (d) swapping from permitting hydraulic fracturing of the fourth well to permitting hydraulic fracturing of the third well.

17. The method of claim 16, wherein steps (a) and (c) are executed simultaneously using hydraulic fracturing fluid from the hydraulic manifold; and wherein steps (b) and (d) are executed simultaneously using hydraulic fracturing fluid from the hydraulic manifold.

18. The method of claim 16, wherein, during step (d), hydraulic fracturing fluid is continuously pumped to the third and fourth valves via the hydraulic manifold;

wherein step (c) comprises opening the fourth valve associated with the fourth well to permit pumping of fluid into the fourth well via the fourth valve; and wherein step (d) comprises:

opening the third valve associated with the third well to permit pumping of fluid into the third well via the third valve; and closing the fourth valve associated with the fourth well.

19. The method of claim 16, wherein step (a) further comprises:

dequeuing, using a controller, the second well from a first hydraulic fracturing queue; and wherein step (c) further comprises:

dequeuing, using the controller, the fourth well from a second hydraulic fracturing queue.

20. The method of claim 19, wherein step (b) further comprises:

queuing, using a controller, the first well in the first hydraulic fracturing queue; and dequeuing, using the controller, the first well from the first hydraulic fracturing queue; and wherein step (d) further comprises:

queuing, using the controller, the third well in the second hydraulic fracturing queue; and dequeuing, using the controller, the third well from the second hydraulic fracturing queue.

21. The method of claim 15, wherein step (a) further comprises:

dequeuing, using a controller, the second well from a first hydraulic fracturing queue.

22. The method of claim 21, wherein step (b) further comprises:

queuing, using a controller, the first well in the first hydraulic fracturing queue; and dequeuing, using the controller, the first well from the first hydraulic fracturing queue.

23. A method, comprising:

(a) queuing, using a controller, a first well in a first hydraulic fracturing queue, which first hydraulic fracturing queue is associated with a first plurality of wells standing by for hydraulic fracturing, including at least the first well and a second well;

(b) dequeuing, using the controller, the second well from the first hydraulic fracturing queue;

(c) permitting hydraulic fracturing of the second well, comprising:

opening a second valve associated with the second well to permit pumping of fluid into the second well via the second valve; and measuring a flow rate of the fluid being pumped into the second well;

(d) dequeuing, using the controller, the first well from the first hydraulic fracturing queue; and (e) swapping from permitting hydraulic fracturing of the second well to permitting hydraulic fracturing of the first well, comprising:

opening a first valve associated with the first well to permit pumping of fluid into the first well via the first valve; and closing the second valve associated with the second well;

wherein, in response to determining that the flow rate of the fluid being pumped into the second well is below a flow rate threshold and has been below the flow rate threshold for a threshold amount of time, the first valve associated with the first well is opened at step (e) before the second valve associated with the second well is closed at step (e).

24. A method, comprising:

(a) queuing, using a controller, a first well in a first hydraulic fracturing queue, which first hydraulic fracturing queue is associated with a first plurality of wells standing by for hydraulic fracturing, including at least the first well and a second well;

(b) dequeuing, using the controller, the second well from the first hydraulic fracturing queue;

(c) permitting hydraulic fracturing of the second well, comprising:

opening a second valve associated with the second well to permit pumping of fluid into the second well via the second valve; and measuring a flow rate of the fluid being pumped into the second well;

(d) dequeuing, using the controller, the first well from the first hydraulic fracturing queue; and (e) swapping from permitting hydraulic fracturing of the second well to permitting hydraulic fracturing of the first well, comprising:

opening a first valve associated with the first well to permit pumping of fluid into the first well via the first valve; and closing the second valve associated with the second well;

wherein, in response to determining that the flow rate of the fluid being pumped into the second well is above a flow rate threshold, the first valve associated with the first well is opened at step (e) after the second valve associated with the second well is closed at step (e).

25. An apparatus adapted to hydraulically fracture first and second wells, the first and second wells being associated with first and second valves, respectively, the apparatus comprising: a non-transitory computer readable medium; and a plurality of instructions stored on the non-transitory computer readable medium and executable by one or more processors, wherein, when the instructions are executed by the one or more processors, the following steps are executed:
 (a) permitting hydraulic fracturing of the second well, comprising: opening the second valve associated with the second well to permit pumping of fluid into the second well via the second valve; and measuring a flow rate of the fluid being pumped into the second well;
 (b) swapping from permitting hydraulic fracturing of the second well to permitting hydraulic fracturing of the first well, comprising: opening the first valve associated with the first well to permit pumping of fluid into the first well via the first valve; and closing the second valve associated with the second well; wherein, during step (b), hydraulic fracturing fluid is continuously pumped to the first and second valves via a hydraulic manifold; and wherein: in response to determining that the flow rate measured at step (a) has satisfied one or more flow rate conditions, the first valve associated with the first well is opened at step (b) before the second valve associated with the second well is closed at step (b); or in response to determining that the flow rate measured at step (a) has not satisfied one or more flow rate conditions, the first valve associated with the first well is opened at step (b) during or after the second valve associated with the second well is closed at step (b).

26. The apparatus of claim 25,
 wherein the apparatus is further adapted to hydraulically fracture third and fourth wells, the third and fourth wells being associated with third and fourth valves, respectively; and
 wherein, when the instructions are executed by the one or more processors, the following steps are also executed:
 (c) permitting hydraulic fracturing of the fourth well;
 (d) swapping from permitting hydraulic fracturing of the fourth well to permitting hydraulic fracturing of the third well.

27. The apparatus of claim 26,
 wherein steps (a) and (c) are executed simultaneously using hydraulic fracturing fluid from the hydraulic manifold; and
 wherein steps (b) and (d) are executed simultaneously using hydraulic fracturing fluid from the hydraulic manifold.

28. The apparatus of claim 26,
 wherein, during step (d), hydraulic fracturing fluid is continuously pumped to the third and fourth valves via the hydraulic manifold;
 wherein step (c) comprises opening the fourth valve associated with the fourth well to permit pumping of fluid into the fourth well via the fourth valve; and
 wherein step (d) comprises:
 opening the third valve associated with the third well to permit pumping of fluid into the third well via the third valve; and
 closing the fourth valve associated with the fourth well.

29. The apparatus of claim 26,
 wherein step (a) further comprises:
 dequeuing, using a controller, the second well from a first hydraulic fracturing queue; and
 wherein step (c) further comprises:
 dequeuing, using the controller, the fourth well from a second hydraulic fracturing queue.

30. The apparatus of claim 29,
 wherein step (b) further comprises:
 queuing, using a controller, the first well in the first hydraulic fracturing queue; and
 dequeuing, using the controller, the first well from the first hydraulic fracturing queue; and
 wherein step (d) further comprises:
 queuing, using the controller, the third well in the second hydraulic fracturing queue; and
 dequeuing, using the controller, the third well from the second hydraulic fracturing queue.

31. The method of claim 25,
 wherein the flow rate measured at step (a) has satisfied the one or more flow rate conditions when the flow rate measured at step (a) is below an upper flow rate threshold, above a lower flow rate threshold, or both; and
 wherein the flow rate measured at step (a) has not satisfied the one or more flow rate conditions when the flow rate measured at step (a) is above the upper flow rate threshold or below the lower flow rate threshold.

32. The apparatus of claim 25,
 wherein step (a) further comprises:
 dequeuing, using a controller, the second well from a first hydraulic fracturing queue.

33. The apparatus of claim 32,
 wherein step (b) further comprises:
 queuing, using a controller, the first well in the first hydraulic fracturing queue; and
 dequeuing, using the controller, the first well from the first hydraulic fracturing queue.

34. An apparatus, comprising:
 a non-transitory computer readable medium; and
 a plurality of instructions stored on the non-transitory computer readable medium and executable by one or more processors, wherein, when the instructions are executed by the one or more processors, the following steps are executed:
 (a) queuing a first well in a first hydraulic fracturing queue, which first hydraulic fracturing queue includes a first plurality of wells standing by for hydraulic fracturing, including at least the first well and a second well;
 (b) dequeuing the second well from the first hydraulic fracturing queue;
 (c) permitting hydraulic fracturing of the second well, comprising:
 opening a second valve associated with the second well to permit pumping of fluid into the second well via the second valve; and
 measuring a flow rate of the fluid being pumped into the second well;
 (d) dequeuing the first well from the first hydraulic fracturing queue; and
 (e) swapping from permitting hydraulic fracturing of the second well to permitting hydraulic fracturing of the first well, comprising:
 opening a first valve associated with the first well to permit pumping of fluid into the first well via the first valve; and
 closing the second valve associated with the second well;
 wherein, in response to determining that the flow rate of the fluid being pumped into the second well is below a flow rate threshold and has been below the flow rate threshold for a threshold amount of time, the first valve associated with the first well is opened at step (e) before the second valve associated with the second well is closed at step (e).

35. An apparatus, comprising:

a non-transitory computer readable medium; and a plurality of instructions stored on the non-transitory computer readable medium and executable by one or more processors, wherein, when the instructions are executed by the one or more processors, the following steps are executed:

(a) queuing a first well in a first hydraulic fracturing queue, which first hydraulic fracturing queue includes a first plurality of wells standing by for hydraulic fracturing, including at least the first well and a second well;

(b) dequeuing the second well from the first hydraulic fracturing queue;

(c) permitting hydraulic fracturing of the second well, comprising:

opening a second valve associated with the second well to permit pumping of fluid into the second well via the second valve; and measuring a flow rate of the fluid being pumped into the second well;

(d) dequeuing the first well from the first hydraulic fracturing queue; and (e) swapping from permitting hydraulic fracturing of the second well to permitting hydraulic fracturing of the first well, comprising:

opening a first valve associated with the first well to permit pumping of fluid into the first well via the first valve; and closing the second valve associated with the second well;

wherein, in response to determining that the flow rate of the fluid being pumped into the second well is above a flow rate threshold, the first valve associated with the first well is opened at step (e) after the second valve associated with the second well is closed at step (e).

36. The method of claim 15, wherein the flow rate measured at step (a) has satisfied the one or more flow rate conditions when the flow rate measured at step (a) is below an upper flow rate threshold, above a lower flow rate threshold, or both; and wherein the flow rate measured at step (a) has not satisfied the one or more flow rate conditions when the flow rate measured at step (a) is above the upper flow rate threshold or below the lower flow rate threshold.

* * * * *